(12) United States Patent
Kim et al.

(10) Patent No.: US 10,317,771 B2
(45) Date of Patent: Jun. 11, 2019

(54) DRIVER ASSISTANCE APPARATUS AND VEHICLE

(71) Applicant: LG ELECTRONICS INC., Seoul (KR)

(72) Inventors: Jooyoung Kim, Seoul (KR); Hun Kim, Seoul (KR); Wonsuk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 15/481,105

(22) Filed: Apr. 6, 2017

(65) Prior Publication Data

US 2017/0293199 A1 Oct. 12, 2017

(30) Foreign Application Priority Data

Apr. 7, 2016 (KR) .................. 10-2016-0042973

(51) Int. Cl.
*H04N 5/225* (2006.01)
*G02F 1/29* (2006.01)
(Continued)

(52) U.S. Cl.
CPC ............. *G02F 1/29* (2013.01); *B60Q 9/00* (2013.01); *B60R 1/00* (2013.01); *G03B 17/12* (2013.01); *H04N 5/2252* (2013.01); *H04N 5/2254* (2013.01); *H04N 7/183* (2013.01); *B60K 2350/106* (2013.01);
(Continued)

(58) Field of Classification Search
CPC ........ G02F 1/29; G03B 17/12; H04N 5/2254; H04N 5/2252; H04N 7/183; H04N 13/0239; B60Q 9/00; B60R 1/00; B60R 2300/207; B60R 2300/205; B60R 11/04; B60R 2300/8093; B60R 2300/8033; B60R 2300/301; B60R 2300/107; B60R 2300/105; B60R 2011/0026; B60Y 2400/902; B60K 2350/921;
(Continued)

(56) References Cited

U.S. PATENT DOCUMENTS 6,811,330 B1 * 11/2004 Tozawa .................. B60R 11/04
224/321
2004/0208497 A1 * 10/2004 Seger .................. H04N 13/239
396/326
(Continued)

FOREIGN PATENT DOCUMENTS

CN 1936625 3/2007
CN 101285938 10/2008
(Continued)

OTHER PUBLICATIONS

European Extended Search Report in European Application No. 17164525.2, dated May 7, 2018, 4 pages.
(Continued)

*Primary Examiner* — Tung T Vo
(74) *Attorney, Agent, or Firm* — Fish & Richardson P.C.

(57) ABSTRACT

A vehicle camera includes an image sensor and a variable lens. The variable lens includes a liquid crystal layer that includes liquid crystal molecules having an arrangement that depends on a voltage applied to the liquid crystal layer. The variable lens is configured to, based on the arrangement of the liquid crystal molecules in the liquid crystal layer, alter light that is introduced into the image sensor.

23 Claims, 47 Drawing Sheets

(51) Int. Cl.
*B60Q 9/00* (2006.01)
*B60R 1/00* (2006.01)
*G03B 17/12* (2006.01)
*H04N 7/18* (2006.01)
*B60R 11/04* (2006.01)
*B60R 11/00* (2006.01)

(52) U.S. Cl.
CPC ............ *B60K 2350/1028* (2013.01); *B60K 2350/1076* (2013.01); *B60K 2350/2013* (2013.01); *B60K 2350/2052* (2013.01); *B60K 2350/2095* (2013.01); *B60K 2350/921* (2013.01); *B60R 11/04* (2013.01); *B60R 2011/0026* (2013.01); *B60R 2300/105* (2013.01); *B60R 2300/107* (2013.01); *B60R 2300/205* (2013.01); *B60R 2300/207* (2013.01); *B60R 2300/301* (2013.01); *B60R 2300/8033* (2013.01); *B60R 2300/8093* (2013.01); *B60Y 2400/902* (2013.01)

(58) Field of Classification Search
CPC .... B60K 2350/2095; B60K 2350/2052; B60K 2350/2013
USPC ........................................................ 348/148
See application file for complete search history.

(56) References Cited

U.S. PATENT DOCUMENTS

| | | | | |
|---|---|---|---|---|
| 2004/0223074 | A1* | 11/2004 | Takada | G02B 7/026 348/360 |
| 2008/0002139 | A1* | 1/2008 | Hashimoto | G02F 1/134309 349/187 |
| 2009/0059101 | A1* | 3/2009 | Wang | G02B 3/14 349/2 |
| 2009/0169052 | A1* | 7/2009 | Seki | G06K 9/00805 382/103 |
| 2009/0231537 | A1 | 9/2009 | Yamamiya | |
| 2009/0268013 | A1* | 10/2009 | Katahira | G03B 35/08 348/46 |
| 2012/0026297 | A1* | 2/2012 | Sato | G03B 35/08 348/47 |
| 2012/0207461 | A1* | 8/2012 | Okuda | B60R 11/04 396/419 |
| 2013/0222091 | A1* | 8/2013 | Fullerton | H01F 7/04 335/295 |
| 2013/0265485 | A1* | 10/2013 | Kang | H04N 5/225 348/360 |
| 2014/0028924 | A1* | 1/2014 | Yamaguchi | G02F 1/29 349/1 |
| 2014/0152933 | A1 | 6/2014 | Anupongongarch et al. | |
| 2014/0247390 | A1* | 9/2014 | Ohsumi | B60R 11/04 348/373 |
| 2015/0146094 | A1* | 5/2015 | Seger | G03B 17/55 348/374 |
| 2015/0177549 | A1 | 6/2015 | An et al. | |
| 2016/0006911 | A1* | 1/2016 | Kimura | H04N 5/2252 348/47 |
| 2017/0064877 | A1* | 3/2017 | Ratcliffe | H05K 7/20272 |
| 2017/0113613 | A1* | 4/2017 | Van Dan Elzen | B60R 1/00 |
| 2017/0217382 | A1* | 8/2017 | Gunes | B60R 1/00 |
| 2017/0257536 | A1* | 9/2017 | Takama | H04N 5/2253 |

FOREIGN PATENT DOCUMENTS

| | | |
|---|---|---|
| CN | 104423116 | 3/2015 |
| CN | 105083122 | 11/2015 |
| CN | 205017412 | 2/2016 |
| EP | 1995619 | 11/2008 |
| JP | 2007248985 | 9/2007 |
| JP | 2009180951 A | 8/2009 |
| JP | 2009200646 | 9/2009 |
| JP | 2015001697 | 1/2015 |
| KR | 10-2012-0126152 | 11/2012 |

OTHER PUBLICATIONS

Extended European Search Report in European Application No. 17164525.2, dated Jul. 27, 2017, 7 pages (with English translation).
Chinese Office Action in Chinese Appln. No. 201611088692.5, dated Mar. 25, 2019, 16 pages (with English translation).

\* cited by examiner

FIG. 1
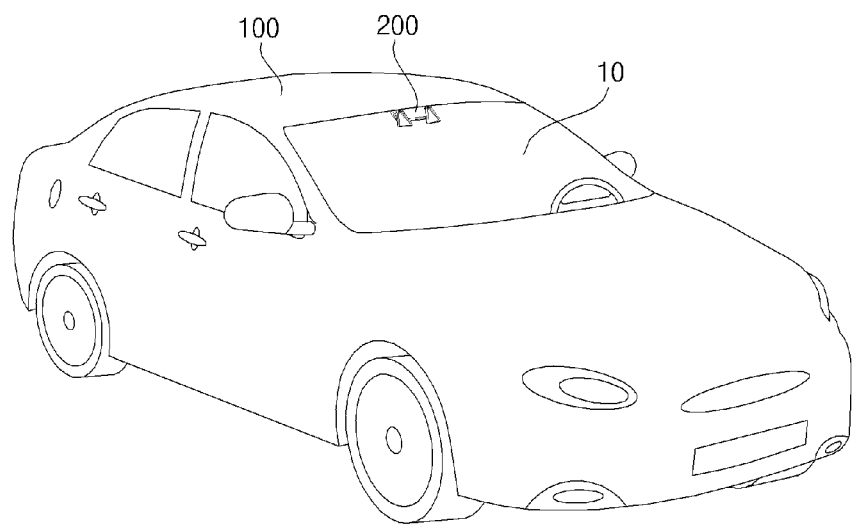
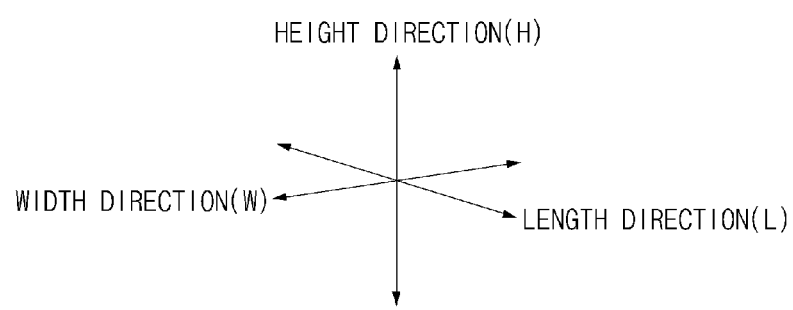

FIG. 12
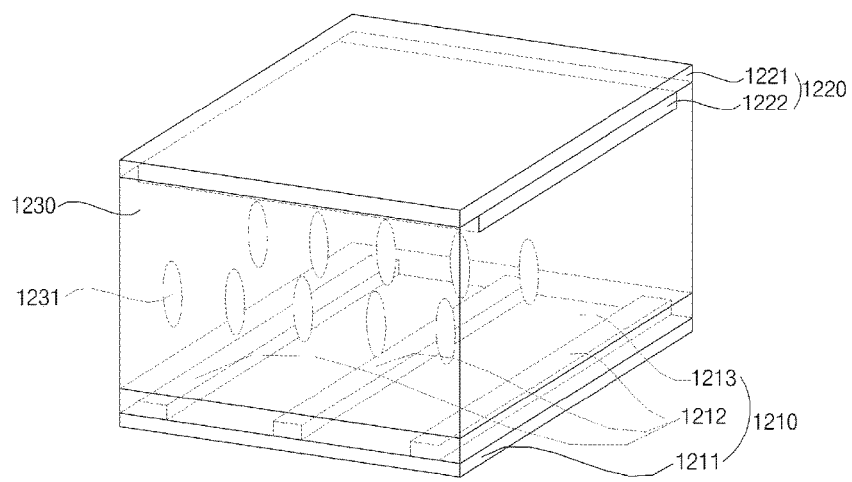
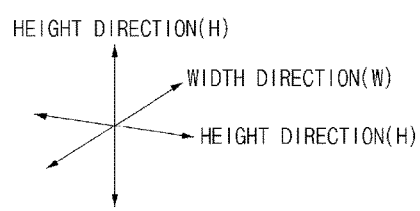

FIG. 15
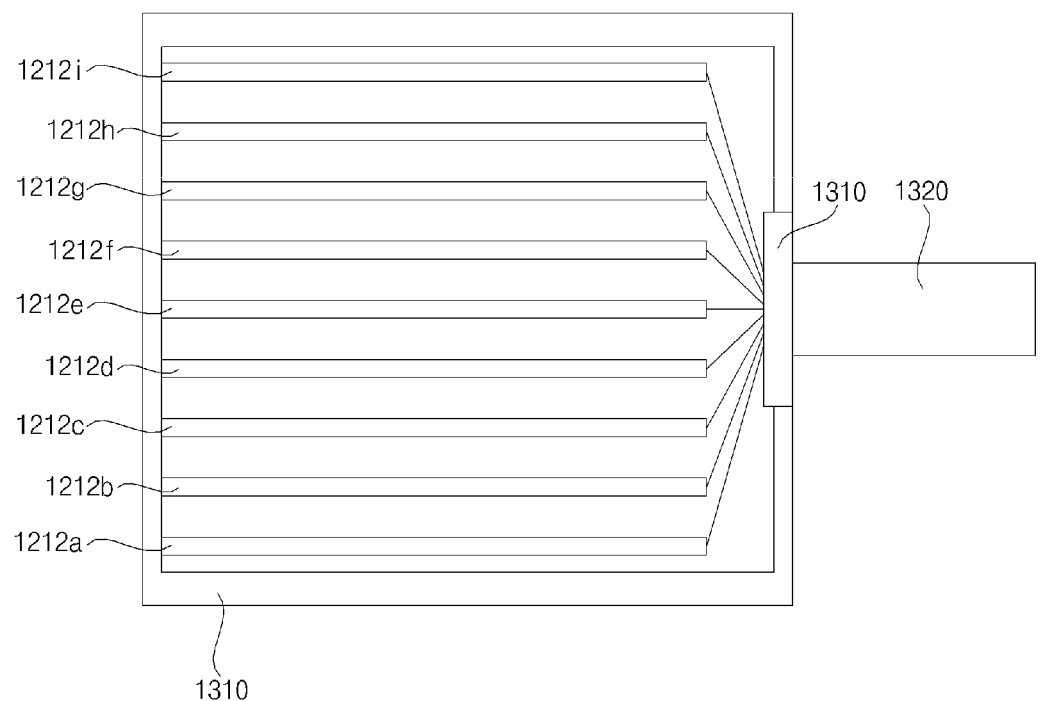
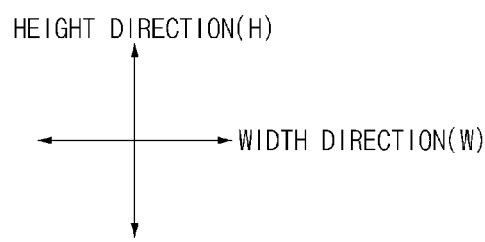

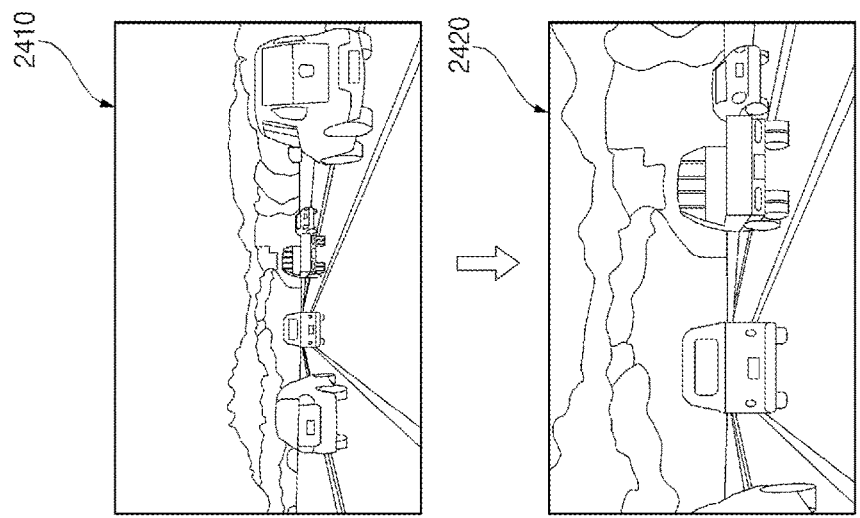
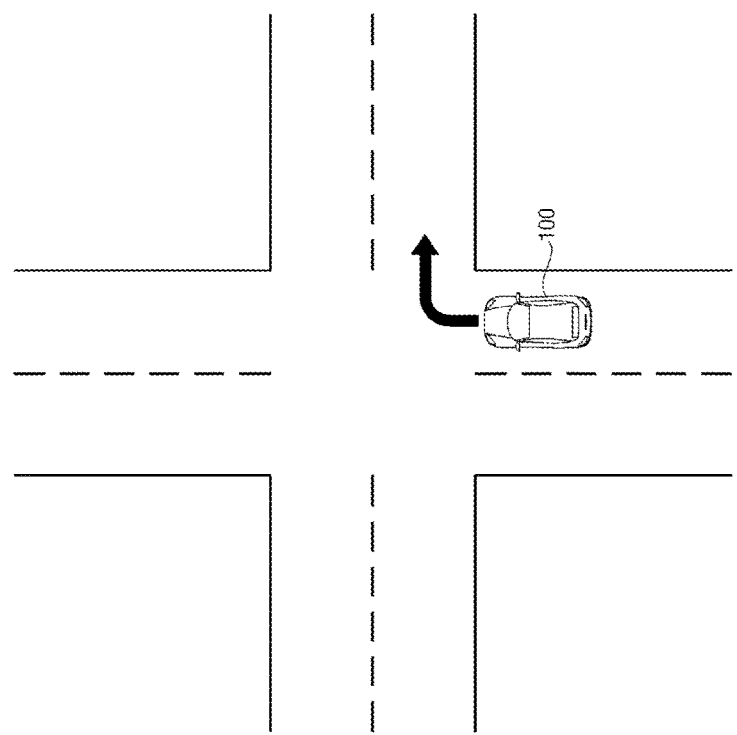
FIG. 24

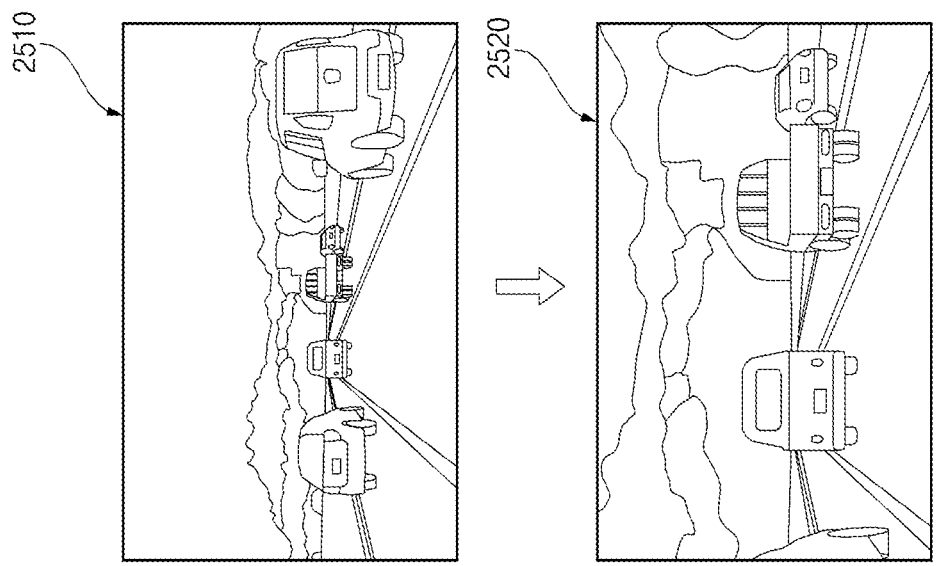
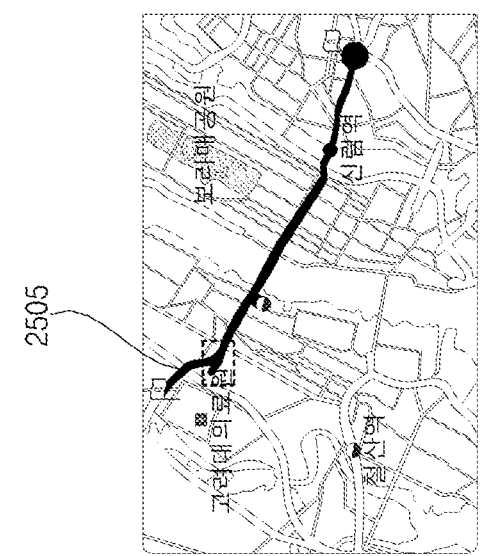
FIG. 25

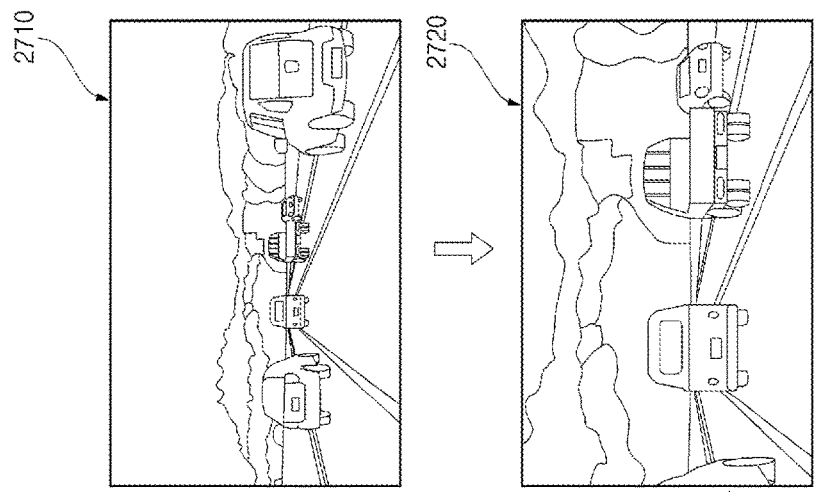
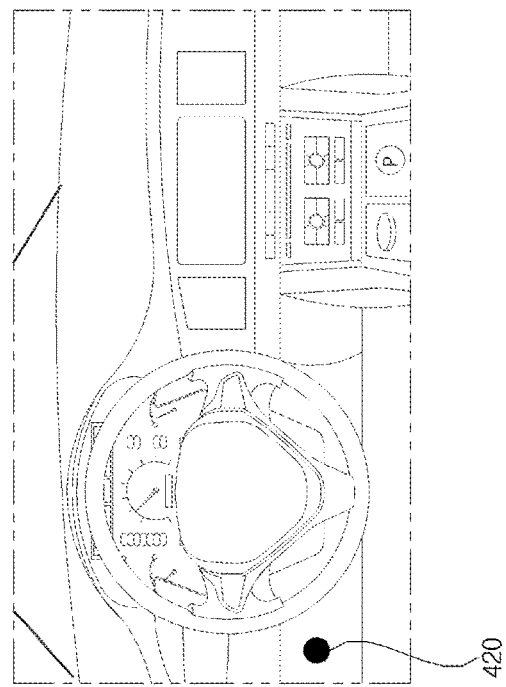
FIG. 27

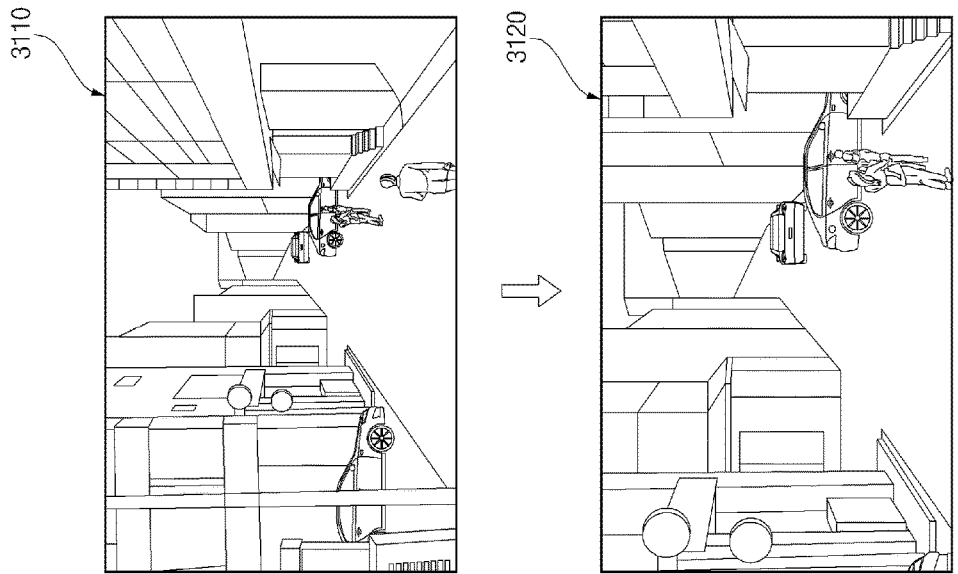
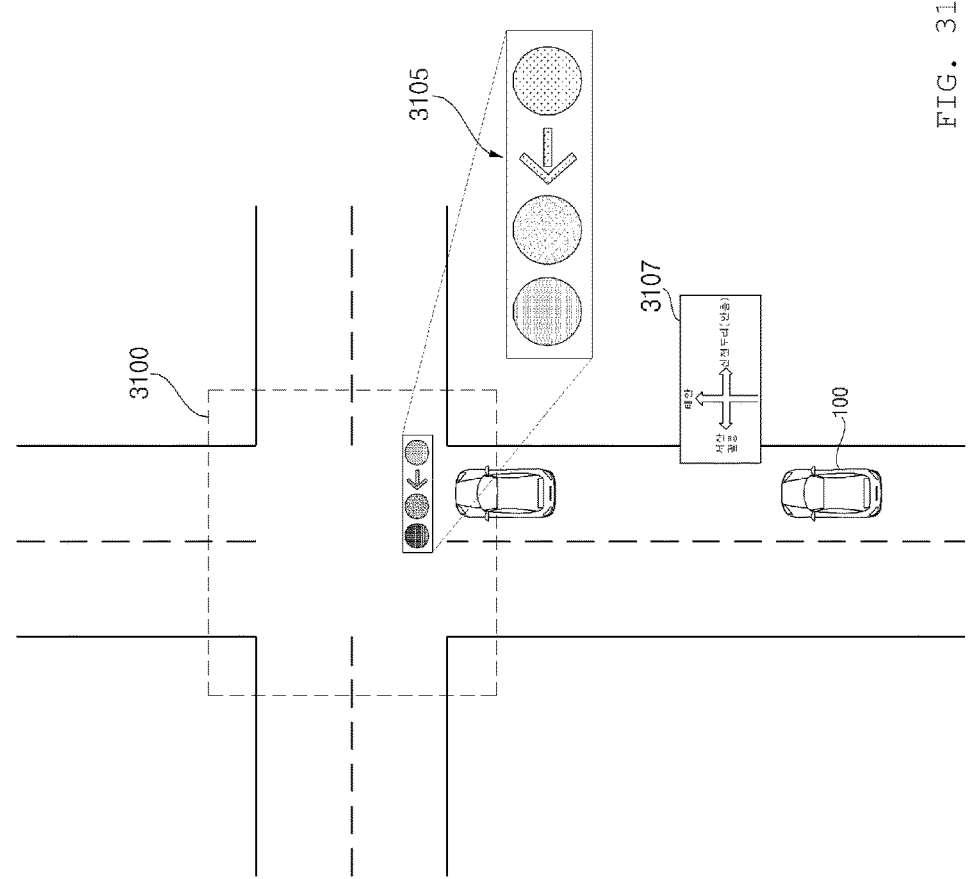
FIG. 31

DRIVER ASSISTANCE APPARATUS AND VEHICLE

CROSS-REFERENCE TO RELATED APPLICATION

This application claims the benefit of an earlier filing date and right of priority to Korean Patent Application No. 10-2016-0042973, filed on Apr. 7, 2016 in the Korean Intellectual Property Office, the disclosure of which is incorporated herein by reference.

TECHNICAL FIELD

The present disclosure relates to a driver assistance apparatus and a vehicle.

BACKGROUND

A vehicle is an apparatus that transports a user riding therein in a desired direction. An example of a vehicle is an automobile.

For the convenience of a user who uses a vehicle, a variety of sensors and electronic devices are typically mounted in vehicles. For example, some vehicles implement an Advanced Driver Assistance System (ADAS) that utilizes various sensors in the vehicle to provide convenience functions for a user of the vehicle. In addition, autonomous vehicles have actively been developed.

SUMMARY

In one aspect, a vehicle camera may include an image sensor and a variable lens. The variable lens may include a liquid crystal layer that includes liquid crystal molecules having an arrangement that depends on a voltage applied to the liquid crystal layer. The variable lens may be configured to, based on the arrangement of the liquid crystal molecules in the liquid crystal layer, alter light that is introduced into the image sensor.

In some implementations, the vehicle camera may further include at least one lens that is located between the variable lens and the image sensor and that is configured to refract light that is introduced to the image sensor.

In some implementations, the vehicle camera may further include a housing configured to receive the image sensor and the variable lens, and defining an external appearance of the vehicle camera. The housing may include a holder configured to support the variable lens.

In some implementations, the vehicle camera may further include a heating element that is formed inside the holder and that is configured to supply heat to the variable lens.

In some implementations, the holder may include a slot configured to receive at least a portion of the variable lens. The heating element may be formed inside the slot.

In some implementations, the heating element may be arranged to be spaced apart from the variable lens.

In some implementations, the heating element may be arranged to contact with at least a portion of a rim of the variable lens.

In some implementations, the holder that is configured to support the variable lens may include a first fixing portion configured to support a first surface of the variable lens; and a second fixing portion configured to support a second surface of the variable lens. The slot may be configured to receive the at least a portion of the variable lens is formed between the first fixing portion and the second fixing portion.

In some implementations, the heating element may include: a first hot wire formed between the first fixing portion and the first surface of the variable lens, the first hot wire being spaced apart from the first surface; and a second hot wire formed between the second fixing portion and the second surface of the variable lens, the second hot wire being spaced apart from the second surface.

In some implementations, the first fixing portion of the holder for the variable lens may include a first ridged portion configured to contact at least a portion of the first surface of the variable lens. The second fixing portion of the holder for the variable lens may include a second ridged portion configured to contact at least a portion of the second surface of the variable lens. The heating element may be formed on at least one of the first ridged portion or the second ridged portion.

In some implementations, the housing may have a thickness that increases with decreasing distance towards the image sensor.

In some implementations, the variable lens may be configured to be slidably movable or rotatably movable.

In some implementations, the variable lens may include a first substrate and a second substrate disposed to face the first substrate. The liquid crystal layer of the variable lens may be disposed between the first substrate and the second substrate.

In some implementations, the first substrate or the second substrate of the variable lens may include a heating element configured to supply heat to the variable lens.

In some implementations, the first substrate of the variable lens may include a plurality of electrodes spaced apart from one another, the plurality of electrodes being arranged in an up-down direction or in a left-right direction.

In some implementations, the plurality of electrodes of the first substrate of the variable lens may include a plurality of columns of electrodes extending in the up-down direction and a plurality of rows of electrodes extending in the left-right direction. At least one capacitor may be provided at each of intersections of the plurality of columns of electrodes and the plurality of rows of electrodes.

In some implementations, the vehicle camera may further include at least one processor configured to control a level of voltage applied to each of the plurality of electrodes of the first substrate of the variable lens.

In some implementations, the at least one processor may be configured to maintain a constant voltage level for each of the plurality of electrodes of the first substrate of the variable lens.

In some implementations, the at least one processor may be further configured to control a voltage level of a first electrode that is located at a central position among the plurality of electrodes to be greater than a voltage level of a second electrode that is located at an outer peripheral location among the plurality of electrodes.

In some implementations, the at least one processor may be further configured to process an image acquired via the image sensor.

In another aspect, a vehicle camera may include an image sensor, a first variable lens, and a second variable lens. The first variable lens may include a first liquid crystal layer including first liquid crystal molecules having a first arrangement that depends on a first voltage applied to the first liquid crystal layer. The first variable lens may be configured to, based on the first arrangement of the first liquid crystal molecules in the first liquid crystal layer, alter light that is introduced into the image sensor. The second variable lens may be disposed between the image sensor and the first variable lens, and may include a second liquid crystal layer including second liquid crystal molecules having a second arrangement that depends on a second voltage applied to the second liquid crystal layer. The second variable lens may be configured to, based on the second arrangement of the second liquid crystal molecules in the second liquid crystal layer, alter light that is introduced into the image sensor.

In some implementations, the first variable lens may include a first substrate on which a first plurality of electrodes is disposed to be spaced apart from one another. The second variable lens may include a third substrate on which a second plurality of electrodes is disposed to be spaced apart from one another.

In some implementations, the first plurality of electrodes in the first substrate of the first variable lens may be arranged to extend in an up-down direction. The second plurality of electrodes in the third substrate of the second variable lens may be arranged to extend in a left-right direction.

In some implementations, a number of the first plurality of the electrodes in the first substrate of the first variable lens may be greater than a number of the second plurality of electrodes in the third substrate of the second variable lens.

In some implementations, the first plurality of electrodes in the first substrate of the first variable lens may be arranged to extend in a left-right direction. The second plurality of electrodes in the third substrate of the second variable lens may be arranged to extend in an up-down direction.

In another aspect, a vehicle stereo camera includes a first image sensor, a second image sensor, a first variable lens, and a second variable lens. The first variable lens may include a first liquid crystal layer including first liquid crystal molecules having a first arrangement that depends on a first voltage applied to the first liquid crystal layer. The first variable lens may be configured to, based on the first arrangement of first liquid crystal molecules in the first liquid crystal layer, alter light that is introduced into the first image sensor. The second variable lens may include a second liquid crystal layer including second liquid crystal molecules having a second arrangement that depends on a second voltage applied to the second liquid crystal layer. The second variable lens may be configured to, based on the second arrangement of second liquid crystal molecules in the second liquid crystal layer, alter light that is introduced into the second image sensor. The vehicle stereo camera may further include at least one processor configured to process a first image acquired via the first image sensor and a second image acquired via the second image sensor.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that can include one or more processing devices and memory to store executable instructions to implement the stated functions.

Details of some implementations are included in the following description and the accompanying drawings. The description and examples below are given by way of illustration only, and various changes and modifications will be apparent.

BRIEF DESCRIPTION OF THE DRAWINGS

FIG. 1 is a diagram illustrating an example of the external appearance of a vehicle in accordance with an implementation;

FIG. 12 is a diagram illustrating an example of a variable lens in accordance with an implementation;

FIG. 15 is a diagram illustrating an example of an arrangement of the first electrodes in the left-right direction in accordance with an implementation;

FIG. 24 is a diagram illustrating an example of an operation of changing the focal distance of the variable lens based on steering information or turn-signal information in accordance with an implementation;

FIG. 25 is a diagram illustrating an example of an operation of changing the focal distance of the variable lens based on predetermined path information in accordance with an implementation;

FIG. 27 is a diagram illustrating an example of an operation of changing the focal distance of the variable lens based on an input signal in accordance with an implementation;

FIG. 31 is a diagram illustrating an example of an operation of changing the focal distance of the variable lens when an intersection is detected as the object in accordance with an implementation;

DETAILED DESCRIPTION

Figure 2:
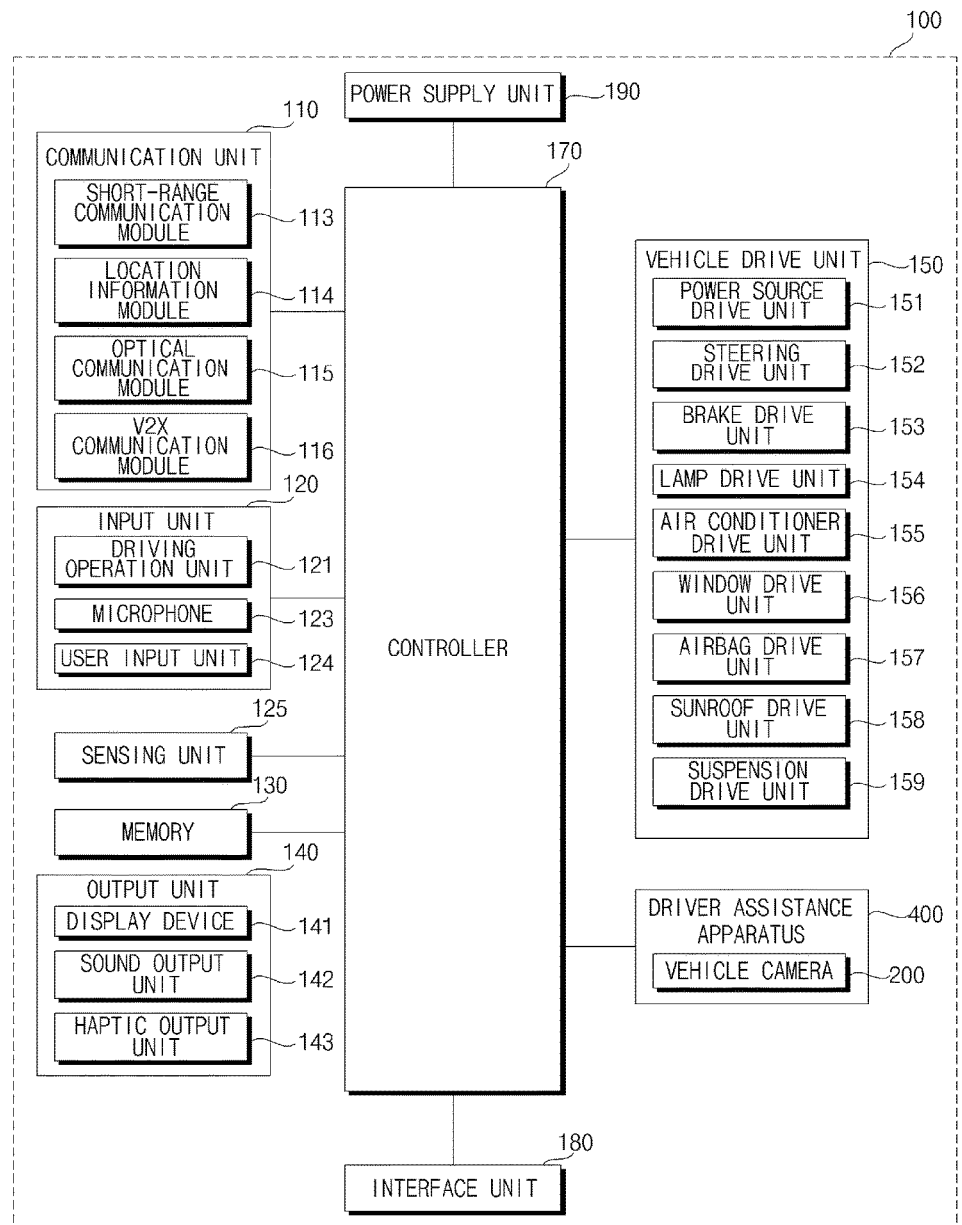
FIG. 2 is a block diagram illustrating an example of a vehicle in accordance with an implementation.

A vehicle may utilize various sensors, such as a camera, to provide convenience functions for a user. Typically, a camera used as a sensor in a vehicle has a constant focal distance and does not implement appropriate adjustment of the focal distance of the camera based on, for example, a vehicle state or a driving state of the vehicle.

Implementations described herein provide a vehicular camera with a variable lens that is configured with a focal distance that is controllable by adjusting properties of the variable lens.

In some implementations, the variable lens includes a liquid crystal layer. In such implementations, the variable lens is configured to alter light based on an arrangement of liquid crystal molecules included in the liquid crystal layer. The arrangement of the liquid crystal molecules in the liquid crystal layer is dependent on an applied voltage. As such, in some implementations, the variable lens may be implemented to control a path of light that is introduced into an image sensor of the camera, thereby controlling a focal distance of the camera.

In some implementations, one or more processors may be configured to control the liquid crystal layer of the variable lens, and thereby control the focal distance of the camera. For example, in some implementations, an ADAS may be provided in the vehicle and may include one or more processors that control the variable lens. Such control may be based on, for example, state of the vehicle or a driving state of the vehicle, including surroundings of the vehicle. As such, the vehicle ADAS may control a focal distance of the camera to provide images that are appropriate for a particular driving scenario of the vehicle.

In some scenarios, implementations described herein may provide one or more effects as follows.

In some scenarios, the focal distance of a vehicle camera may be adjusted using a variable lens.

In some scenarios, the focal distance of the camera may be adjusted to suit a vehicle state or a driving situation of the vehicle.

In some scenarios, the focal distance of the camera may be appropriately adjusted to suit the purpose for which an advanced driver assistance system is used.

In some scenarios, the focal distance of the camera may be appropriately adjusted based on detected object information.

In some scenarios, through the adjustment of the focal distance of the camera, information corresponding to the situation may be provided, thus improving safe driving of a driver of the vehicle.

Effects of the present disclosure are not limited to the aforementioned effects and other effects are possible.

A vehicle as described in this disclosure may include an automobile, a motorcycle, or any suitable vehicle. Hereinafter, a description will be given based on a car.

A vehicle as described in this specification may be powered by any suitable power source, and may be, for example an internal combustion engine vehicle including an engine as a power source, a hybrid vehicle including both an engine and an electric motor as a power source, an electric vehicle including an electric motor as a power source, or any suitably powered vehicle.

In the following description, "the left side of the vehicle" refers to the left side in the forward driving direction of the vehicle, and "the right side of the vehicle" refers to the right side in the forward driving direction of the vehicle.

FIG. 1 is a view illustrating the external appearance of a vehicle in accordance with an implementation.

Referring to FIG. 1, the vehicle 100 may include wheels that are rotated by a power source, and a steering input device for adjusting the direction of travel of the vehicle 100.

In some implementations, the vehicle 100 may be an autonomous vehicle. The autonomous vehicle enables bidirectional switching between an autonomous driving mode and a manual mode in response to user input. When switched to the manual mode, the autonomous vehicle 100 may receive driver input for driving via a driving operation device (e.g., driving operation device 121 in FIG. 2).

The vehicle 100 may include a driver assistance apparatus 400. The driver assistance apparatus 400 is an apparatus that assists a driver based on information acquired from various sensors. The driver assistance apparatus 400 may be referred to as an Advanced Driver Assistance System (ADAS).

The following description will be given based on a vehicle camera 200 that serves as a sensor used in the driver assistance apparatus 400, without being limited thereto. In some implementations, the sensor may include a radar, Lidar, ultrasonic sensor, or infrared sensor, in addition to the vehicle camera 200.

In addition, the following description will be given based on a mono camera 200a and a stereo camera 200b, which serves as the vehicle camera 200 used in the driver assistance apparatus 400, without being limited thereto. In some implementations, the vehicle camera 200 may include a triple camera, an Around View Monitoring (AVM) camera, a 360-degree camera, or an omnidirectional camera.

In the drawings, although the vehicle camera 200 used in the driver assistance apparatus 400 is illustrated as being mounted on a front windshield 10 in order to capture an image of the view to the front of the vehicle 100, the vehicle camera 200 may capture an image of any direction including the front side, the rear side, the right side and the left side of the vehicle 100. Accordingly, the vehicle camera 200 may be located at an appropriate position outside or inside the vehicle 100.

In some implementations, the vehicle camera 200 may capture an image of the view inside the vehicle 100.

"The overall length" refers to the length from the front end to the rear end of the vehicle 100, "the overall width" refers to the width of the vehicle 100, and "the overall height" refers to the height from the bottom of the wheel to the roof. In the following description, "the overall length direction L" may refer to the reference direction for the measurement of the overall length of the vehicle 100, "the overall width direction W" may refer to the reference direction for the measurement of the overall width of the vehicle 100, and "the overall height direction H" may refer to the reference direction for the measurement of the overall height of the vehicle 100.

FIG. 2 is a block diagram referenced to describe the vehicle 100 in accordance with an implementation.

Referring to FIG. 2, the vehicle 100 may include a communication unit 110, an input unit 120, a sensing unit 125, a memory 130, an output unit 140, a vehicle drive unit 150, a controller 170, an interface unit 180, a power supply unit 190, and the driver assistance apparatus 400.

The communication unit 110 may include a short-range communication module 113, a location information module 114, an optical communication module 115, and a V2X communication module 116.

The communication unit 110 may include one or more Radio Frequency (RF) circuits or elements in order to perform communication with another device.

The short-range communication module 113 may assist short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication module 113 may form wireless area networks to perform the short-range communication between the vehicle 100 and at least one external device. For example, the short-range communication module 113 may exchange data with a mobile terminal of a passenger in a wireless manner. The short-range communication module 113 may receive weather information and road traffic state information (e.g., Transport Protocol Expert Group (TPEG) information) from the mobile terminal. When a user gets into the vehicle 100, the mobile terminal of the user and the vehicle 100 may pair with each other automatically or as the user executes a pairing application.

The location information module 114 is a module for acquiring a location of the vehicle 100. A representative example of the location information module 114 includes a Global Positioning System (GPS) module. For example, when the vehicle 100 utilizes a GPS module, a location of the vehicle 100 may be acquired using signals transmitted from GPS satellites.

In some implementations, the location information module 114 may be a component included in the sensing unit 125, rather than a component included in the communication unit 110.

The optical communication module 115 may include a light emitting unit and a light receiving unit.

The light receiving unit may convert light into electrical signals to receive information. The light receiving unit may include Photo Diodes (PDs) for receiving light. The photo diodes may convert light into electrical signals. For example, the light receiving unit may receive information regarding a preceding vehicle via light emitted from a light source included in the preceding vehicle.

The light emitting unit may include at least one light emitting element for converting electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle 100. For example, the light emitting unit may be at least one selected from among a headlight, a taillight, a brake light, a turn signal light, and a sidelight. For example, the optical communication module 115 may exchange data with another vehicle via optical communication.

The V2X communication module 116 is a module for performing wireless communication with a server or another vehicle. The V2X communication module 116 includes a module capable of realizing a protocol for communication between autonomous driving vehicles (V2V) or communication between an autonomous driving vehicle and an infrastructure (V2I). The vehicle 100 may perform wireless communication with an external server or another vehicle via the V2X communication module 116.

The input unit 120 may include the driving operation device 121, a microphone 123, and a user input unit 124.

The driving operation device 121 is configured to receive user input for the driving of the vehicle 100. The driving operation device 121 may include a steering input device, a shift input device, an acceleration input device, and a brake input device.

The steering input device is configured to receive user input with regard to the direction of travel of the vehicle 100. The steering input device may take the form of a steering wheel to enable steering input via rotation thereof. In some implementations, the steering input device may be configured as a touchscreen, a touch pad, or a button.

The shift input device is configured to receive input for selecting one of Park (P), Drive (D), Neutral (N), and Reverse (R) gears of the vehicle 100 from the user. The shift input device may take the form of a lever. In some implementations, the shift input device may be configured as a touchscreen, a touch pad, or a button.

The acceleration input device is configured to receive user input for the acceleration of the vehicle 100. The brake input device is configured to receive user input for the speed reduction of the vehicle 100. Each of the acceleration input device and the brake input device may take the form of a pedal. In some implementations, the acceleration input device or the brake input device may be configured as a touchscreen, a touch pad, or a button.

The microphone 123 may process external sound signals into electrical data. The processed data may be utilized in various ways according to a function that the vehicle 100 is performing. The microphone 123 may convert a user voice command into electrical data. The converted electrical data may be transmitted to the controller 170.

In some implementations, the camera 200 or the microphone 123 may be components included in the sensing unit 125, rather than components included in the input unit 120.

The user input unit 124 is configured to receive information from the user. When information is input via the user input unit 124, the controller 170 may control the operation of the vehicle 100 so as to correspond to the input information. The user input unit 124 may include a touch input unit or a mechanical input unit. In some implementations, the user input unit 124 may be located in a region of the steering wheel. In this case, the driver may operate the user input unit 124 with the fingers while gripping the steering wheel.

The sensing unit 125 is configured to sense various situations in the vehicle 100 or situations outside the vehicle 100. To this end, the sensing unit 160 may include a collision sensor, a steering wheel sensor, a speed sensor, a gradient sensor, a weight sensor, a heading sensor, a yaw sensor, a gyro sensor, a position module, a vehicle forward/reverse sensor, a battery sensor, a fuel sensor, a tire sensor, a steering sensor based on the rotation of the steering wheel, a vehicle interior temperature sensor, a vehicle interior humidity sensor, an ultrasonic sensor, an illumination sensor, an accelerator pedal position sensor, a brake pedal position sensor, etc.

The sensing unit 125 may acquire sensing signals with regard to, for example, vehicle collision information, vehicle driving direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, vehicle external illumination, pressure applied to an accelerator pedal, and pressure applied to a brake pedal.

The sensing unit 125 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The location information module 114 may be arranged as a sub-component of the sensing unit 125.

The sensing unit 125 may include an object sensing unit capable of sensing an object around the vehicle 100. Here, the object sensing unit may include a camera module, a radar, Lidar, or an ultrasonic sensor. In this case, the sensing unit 125 may sense a front object located at the front of the vehicle 100 or a rear object located at the rear of the vehicle 100 using the camera module, the radar, the Lidar, or the ultrasonic sensor.

In some implementations, the object sensing unit may be sorted as a constituent component of the driver assistance apparatus 400.

The memory 130 is electrically connected to the controller 170. The memory 130 may store basic data for each unit, control data for the operation control of the unit, and input/output data. The memory 130 may be any of various storage devices, such as a ROM, a RAM, an EPROM, a flash drive, and a hard drive. The memory 130 may store various data for the overall operation of the vehicle 100, such as programs for the processing or control of the controller 170.

The output unit 140 is configured to output information processed in the controller 170. The output unit 140 may include a display device 141, a sound output unit 142, and a haptic output unit 143.

The display device 141 may display various graphic objects. For example, the display device 141 may display vehicle associated information. Here, the vehicle associated information may include vehicle control information for the direct control of the vehicle 100 or driver assistance information to guide the driver's vehicle driving. In addition, the vehicle associated information may include vehicle state information that indicates the current state of the vehicle or vehicle traveling information regarding the traveling of the vehicle.

The display device 141 may include at least one selected from among a Liquid Crystal Display (LCD), a Thin Film Transistor LCD (TFT LCD), an Organic Light Emitting Diode (OLED), a flexible display, a 3D display, and an e-ink display.

The display device 141 may configure an inter-layer structure with a touch sensor, or may be integrally formed with the touch sensor to implement a touchscreen. The touchscreen may function as the user input unit 124, which provides an input interface between the vehicle 100 and the user, and also function to provide an output interface between the vehicle 100 and the user. In this case, the display device 141 may include a touch sensor for sensing a touch to the display device 141 so as to receive a control command in a touch manner. When a touch is input to the display device 141 as described above, the touch sensor may sense the touch and the controller 170 may generate a control command corresponding to the touch. Content input in a touch manner may be characters or numbers, or may be, for example, instructions in various modes or menu items that may be designated.

The display device 141 may include a cluster for allowing the driver to check vehicle state information or vehicle traveling information while driving the vehicle. The cluster may be located on a dashboard. In this case, the driver may check information displayed on the cluster while looking forward.

In some implementations, the display device 141 may be implemented as a Head Up display (HUD). When the display device 141 is implemented as a HUD, information may be output via a transparent display provided at the front windshield 10. Alternatively, the display device 141 may include a projector module to output information via an image projected to the front windshield 10.

In some implementations, the display device 141 may include a transparent display. In this case, the transparent display may be attached to the front windshield 10.

The transparent display may display a prescribed screen with a prescribed transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent LED display. The transparency of the transparent display is adjustable.

In some implementations, the display device 141 may function as a navigation device.

The sound output unit 142 is configured to convert electrical signals from the controller 170 into audio signals and to output the audio signals. To this end, the sound output unit 142 may include, for example, a speaker. The sound output unit 142 may output sound corresponding to the operation of the user input unit 124.

The haptic output unit 143 is configured to generate tactile output. For example, the haptic output unit 143 may operate to vibrate a steering wheel, a safety belt, or a seat so as to allow the user to recognize an output thereof.

The vehicle drive unit 150 may control the operation of various devices of the vehicle 100. The vehicle drive unit 150 may include a power source drive unit 151, a steering drive unit 152, a brake drive unit 153, a lamp drive unit 154, an air conditioner drive unit 155, a window drive unit 156, an airbag drive unit 157, a sunroof drive unit 158, and a suspension drive unit 159.

The power source drive unit 151 may perform electronic control for a power source inside the vehicle 100.

For example, when a fossil fuel based engine is a power source, the power source drive unit 151 may perform electronic control for the engine. As such, the power source drive unit 151 may control, for example, an output torque of the engine. When the power source drive unit 151 is the engine, the power source drive unit 151 may limit the speed of the vehicle by controlling the output torque of the engine under the control of the controller 170.

In another example, when an electric motor is a power source, the power source drive unit 151 may perform control for the motor. As such, the power source drive unit 151 may control, for example, the RPM and torque of the motor.

The steering drive unit 152 may perform electronic control for a steering apparatus inside the vehicle 100. As such, the steering drive unit 152 may change the direction of travel of the vehicle 100.

The brake drive unit 153 may perform electronic control of a brake apparatus inside the vehicle 100. For example, the brake drive unit 153 may reduce the speed of the vehicle 100 by controlling the operation of brakes located at wheels. In another example, the brake drive unit 153 may adjust the direction of travel of the vehicle 100 leftward or rightward by differentiating the operation of respective brakes located at left and right wheels.

The lamp drive unit 154 may turn at least one lamp arranged inside and outside the vehicle 100 on or off. In addition, the lamp drive unit 154 may control, for example, the intensity and direction of light of the lamp. For example, the lamp drive unit 154 may perform control for a turn-signal lamp, a headlamp or a brake lamp.

The air conditioner drive unit 155 may perform the electronic control of an air conditioner inside the vehicle 100. For example, when the interior temperature of the vehicle 100 is high, the air conditioner drive unit 155 may operate the air conditioner to supply cold air to the interior of the vehicle 100.

The window drive unit 156 may perform the electronic control of a window apparatus inside the vehicle 100. For example, the window drive unit 156 may control the opening or closing of left and right windows of the vehicle 100.

The airbag drive unit 157 may perform the electronic control of an airbag apparatus inside the vehicle 100. For example, the airbag drive unit 157 may control an airbag to be deployed in a dangerous situation.

The sunroof drive unit 158 may perform electronic control of a sunroof apparatus inside the vehicle 100. For example, the sunroof drive unit 158 may control the opening or closing of a sunroof.

The suspension drive unit 159 may perform the electronic control for a suspension apparatus inside the vehicle 100. For example, when the road surface is uneven, the suspension drive unit may control the suspension apparatus to reduce vibration of the vehicle 100.

In some implementations, the vehicle drive unit 150 may include a chassis drive unit. Here, the chassis drive unit may include the steering drive unit 152, the brake drive unit 153, and the suspension drive unit 159.

The controller 170 may control the overall operation of each unit inside the vehicle 100. The controller 170 may be referred to as an Electronic Control Unit (ECU).

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The interface unit 180 may serve as a passage for various kinds of external devices that are connected to the vehicle 100. For example, the interface unit 180 may have a port that is connectable to a mobile terminal and may be connected to the mobile terminal via the port. In this case, the interface unit 180 may exchange data with the mobile terminal.

In some implementations, the interface unit 180 may serve as a passage for supplying electricity to a mobile terminal connected thereto. When the mobile terminal is electrically connected to the interface unit 180, the interface unit 180 may provide electricity supplied from the power supply unit 190 to the mobile terminal under the control of the controller 170.

The power supply unit 190 may supply power to operate the respective components under the control of the controller 170. In particular, the power supply unit 190 may receive power from, for example, a battery inside the vehicle 100.

The driver assistance apparatus 400 may assist the driver in driving the vehicle 100. The driver assistance apparatus 400 may include the vehicle camera 200.

Figure 3:
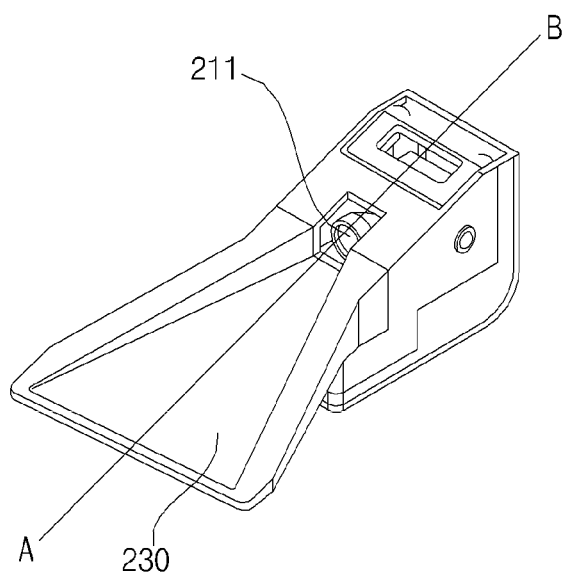
FIG. 3 is a diagram illustrating an example of a vehicle camera in accordance with an implementation.
Figure 4:
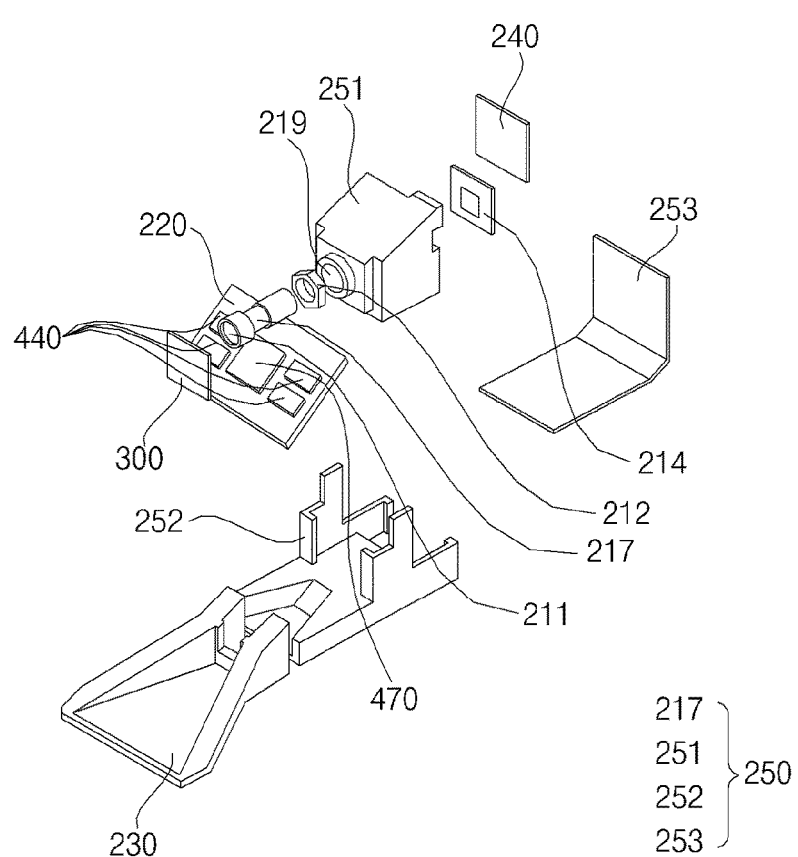
FIG. 4 is a diagram illustrating an example of the vehicle camera in accordance with the implementation.
Figure 5:
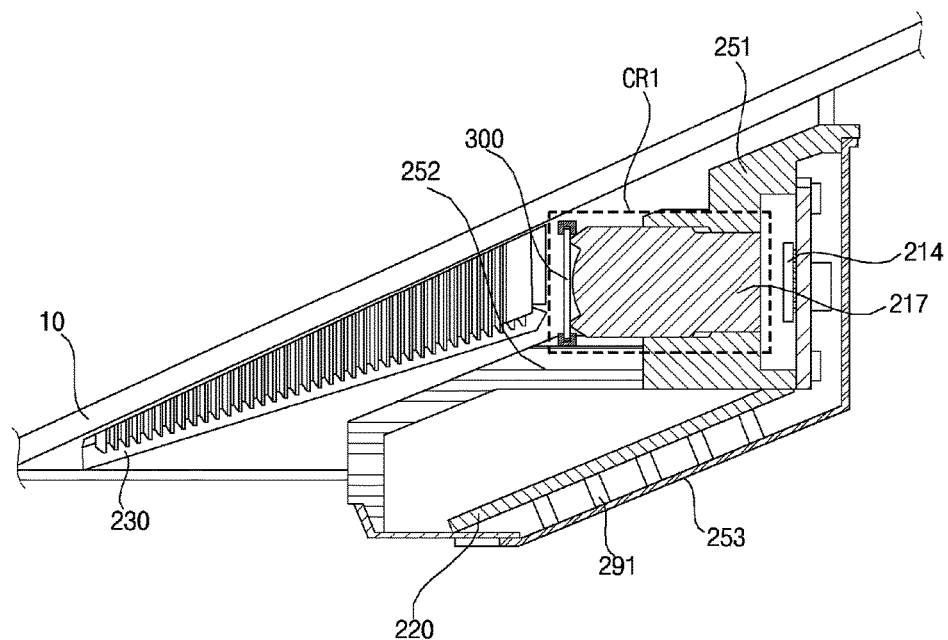
FIG. 5 is a diagram illustrating a cutaway side sectional view of an example of the vehicle camera taken along line A-B of FIG. 3 in accordance with the implementation.
Figure 6:
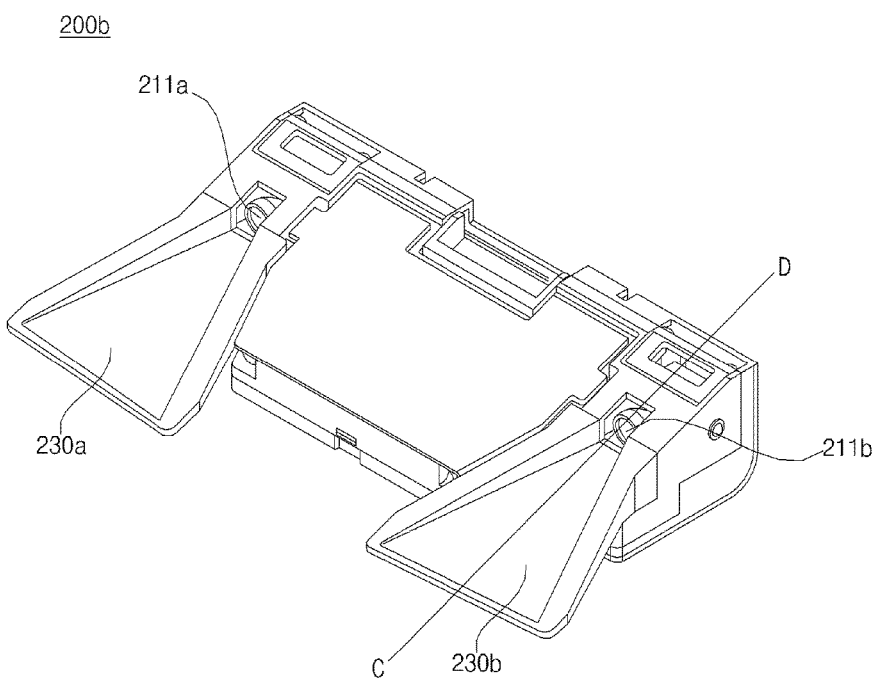
FIG. 6 is a diagram illustrating a perspective view of an example of a vehicle camera in accordance with an implementation.
Figure 7:
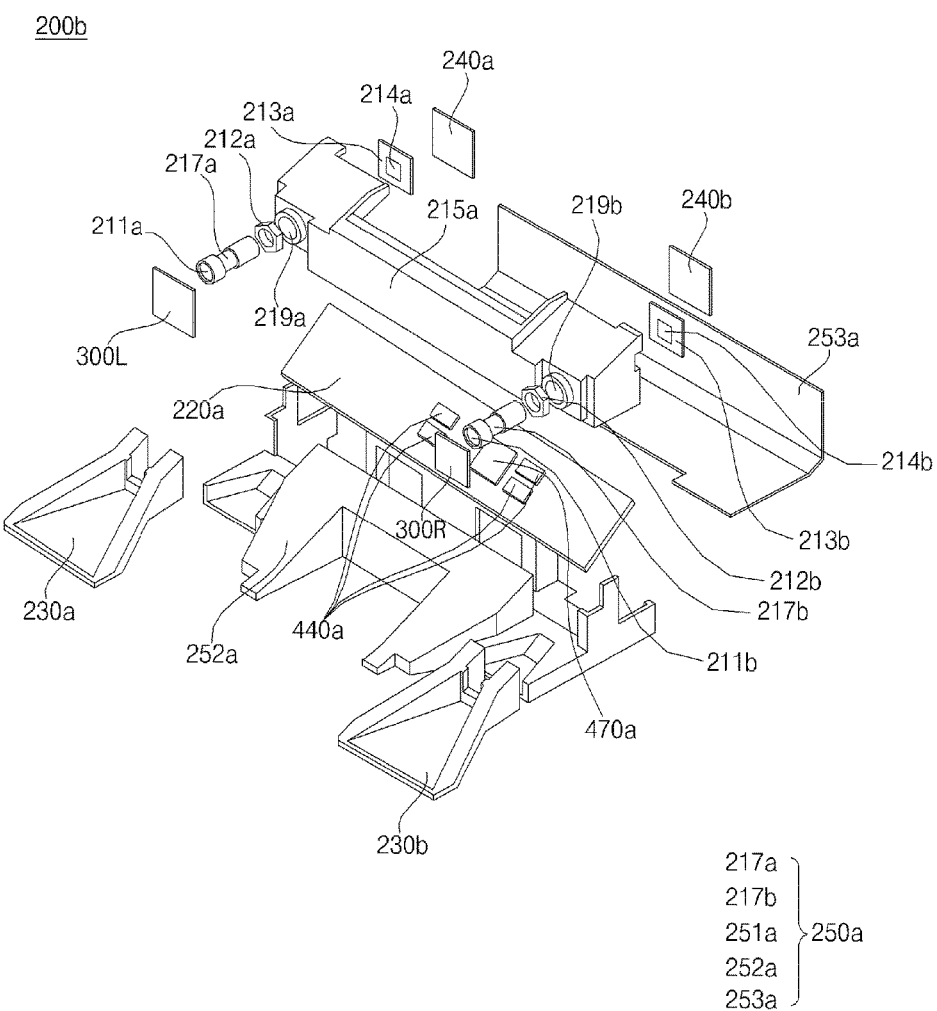
FIG. 7 is a diagram illustrating an exploded perspective view of an example of the vehicle camera in accordance with the implementation.
Figure 8:
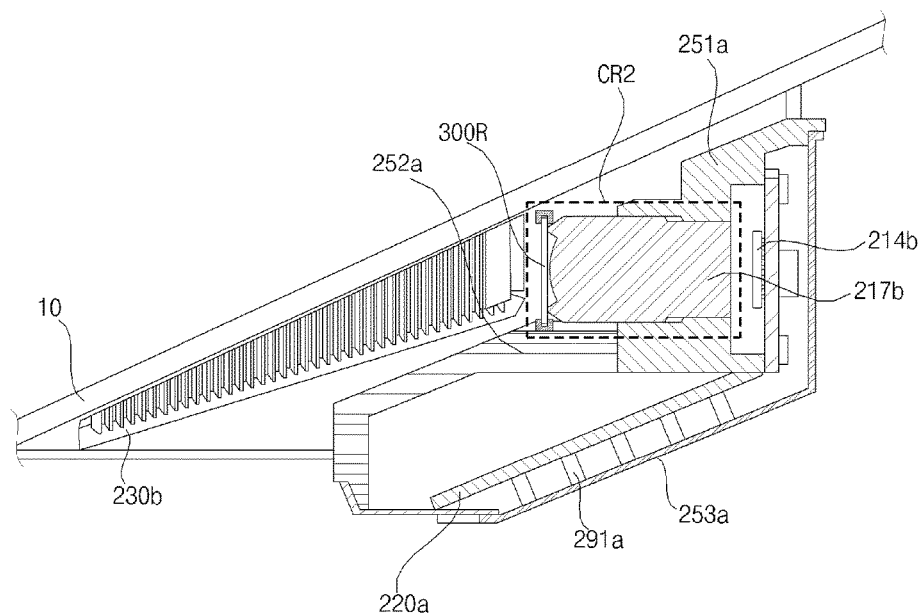
FIG. 8 is a diagram illustrating a cutaway side sectional view of an example of the vehicle camera taken along line C-D of FIG. 6 in accordance with the implementation.

In some implementations, the vehicle camera 200 may include a mono camera, such as the mono camera 200a illustrated in FIGS. 3 to 5, and/or may include a stereo camera, such as and the stereo camera 200b illustrated in FIGS. 6 to 8.

The vehicle camera 200 may include a variable lens 300. The variable lens 300 may be controlled by the driver assistance apparatus to change the focal distance of the variable lens 300 and thereby change the focal distance of the camera 200. For example, the variable lens 300 may be controlled to change the path of light passing through the camera 200 in order to change the focal distance. In some implementations, the variable lens 300 may be controlled to change the focal distance of the camera 200 based on detected surroundings of the vehicle, so as to provide a variable view of the surroundings that are appropriate for the situation.

In some implementations, the variable lens 300 may include a controllable liquid crystal layer. In such scenarios, the arrangement of liquid crystal molecules in the liquid crystal layer may be controlled by the driver assistance apparatus to selectively redirect light passing through the liquid crystal layer, thereby changing the focal distance of the camera 200.

The following description will be given based on the driver assistance apparatus 400, the vehicle camera 200, and the variable lens 300. The vehicle camera 200 may be referred to as a vehicle camera device.

FIG. 3 is a perspective view illustrating a vehicle camera in accordance with an implementation. FIG. 4 is an exploded perspective view illustrating the vehicle camera in accordance with the implementation. FIG. 5 is a cutaway side sectional view illustrating the vehicle camera taken along line A-B of FIG. 3 in accordance with the implementation.

The vehicle camera 200 described below with reference to FIGS. 3 to 5 is the mono camera 200a.

The vehicle camera 200a may include at least one lens 211, an image sensor 214, the variable lens 300, and at least one processor 470.

In some implementations, the vehicle camera 200a may further include a processing board 220, a light shield 230, a heat radiation member 240, and a housing 250 individually or in combinations thereof.

In some implementations, the housing 250 may include a first housing 251, a second housing 252, and a third housing 253.

The at least one lens 211 may be fastened using a nut 212 so as to be seated in a hole 219 formed in a portion of the first housing 251 while being received in a lens housing 217.

The image sensor 214 may include at least one photoelectric conversion element capable of converting optical signals into electrical signals. For example, the image sensor 214 may be a Charge-Coupled Device (CCD) or a Complementary Metal Oxide Semiconductor (CMOS).

The image sensor 214 may be located at an appropriate position on the exterior or interior of the vehicle 100 in order to acquire an image of the view outside or inside the vehicle 100.

For example, the image sensor 214 may be located in the passenger compartment of the vehicle 100 so as to be close to the front windshield 10 in order to acquire an image of the view to the front of the vehicle 100. Alternatively, the image sensor 214 may be located near a front bumper or a radiator grill.

For example, the image sensor 214 may be located in the passenger compartment of the vehicle 100 so as to be close to a rear windshield in order to acquire an image of the view to the rear of the vehicle 100. Alternatively, the image sensor 214 may be located near a rear bumper, a trunk, or a tail gate.

For example, the image sensor 214 may be located in the passenger compartment of the vehicle 100 so as to be close to at least one side window in order to acquire an image of the view to the lateral side of the vehicle 100. Alternatively, the image sensor 214 may be located near a side mirror, a fender, or a door.

The image sensor 214 may be located at the rear of the at least one lens 211 so as to acquire an image based on light introduced through the at least one lens 211. For example, the image sensor 214 may be oriented perpendicular to the ground surface at a position spaced apart from the at least one lens 211 by a prescribed distance.

The variable lens 300 may be configured to be controlled to alter light to be introduced into the image sensor 214. For example, the variable lens 300 may change the light to be introduced into the image sensor 214 so as to change the focal distance of the camera 200a.

In some implementations, the variable lens 300 may include liquid crystals. The variable lens 300 may change the light that is to be introduced into the image sensor 214 based on the arrangement of liquid crystals. For example, the variable lens 300 may change the path of light to be introduced into the image sensor 214, thereby changing the focal distance of the camera 200a.

The variable lens 300 may be controlled by one or more processors of the driver assistance apparatus. For example, in the example of FIG. 4, the variable lens 300 may be controlled by the processor 470.

Examples of the variable lens 300 will be described below in detail with reference to FIG. 8 and the following drawings.

A module including the at least one lens 211, the variable lens 300, and the image sensor 214 may be referred to as an image acquisition module. In some implementations, the image acquisition module may be installed at the ceiling of the vehicle 100. For example, the image acquisition module may be attached to the inner ceiling of the vehicle 100 with a prescribed connection member interposed therebetween. Positioning the image acquisition module on the inner ceiling of the vehicle 100 may, in some scenarios, provide an advantage of acquiring an image of a view outside the vehicle 100 from the highest position of the vehicle 100. As such, in these scenarios, there may be an advantage of increasing the field of vision.

The processor 470 may be electrically connected to the image sensor 214 and the variable lens 300. The processor 470 may perform computer processing on an image acquired via the image sensor 214. The processor 470 may control the image sensor 214 and the variable lens 300.

The processor 470 may be implemented, for example, using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 470 may be mounted on the processing board 220.

The processing board 220 may be configured so that the processor 470 and a memory 440 are mounted thereon.

The processing board 220 may be inclined in the overall length direction. For example, the processing board 220 may be oriented such that the front surface or the rear surface thereof faces the front windshield 10. For example, the processing board 220 may be arranged parallel to the front windshield 10.

The front windshield 10 included in the vehicle 100 is generally inclined from the bonnet to the roof of the vehicle 100 at a prescribed angle relative to the ground surface. In this case, when the processing board 220 is inclined in the overall length direction, the vehicle camera 200a may have a smaller size than when the processing board 220 is oriented vertically or horizontally. In some scenarios, the vehicle camera 200a having a reduced size may provide an advantage of increasing the available space inside the vehicle 100 in proportion to the reduction in the size of the vehicle camera 200a.

A plurality of elements or electronic components may be mounted on the processing board 220. In such scenarios, heat may be generated due to the elements or components included in the processing board 220.

The processing board 220 may be spaced apart from the image sensor 214. Spacing the processing board 220 apart from the image sensor 214 may, in some scenarios, mitigate heat generated from the processing board 220 from having a negative effect on the performance of the image sensor 214.

The processing board 220 may be located at a particular position so as to mitigate heat generated in the processing board 220 from having an effect on the image sensor 214. For example, the processing board 220 may be located underneath the image sensor 214. Alternatively, the processing board 220 may be located at the front of the image sensor 214.

One or more memories 440 may be mounted on the processing board 220. The memories 440 may store images acquired via the image sensor 214, various application data, data for the control of the processor 470, or data processed by the processor 470. In some scenarios, the memories 440 may be a source of heat generation, in addition to the processor 470. Arranging the processor 470 at the center of the processing board 220 may allow the memories 440 to be arranged around the processor 470. For example, the memories 440 may be arranged to surround the periphery of the processor 470. In this case, the processor 470 and the memories 440, which are heat generation elements, may be located at the farthest positions from the image sensor 214.

The processor 470 may be electrically connected to the controller 170. The processor 470 may be controlled by the controller 170.

The light shield 230 may be located at the front of the at least one lens 211. The light shield 230 may prevent light that is not necessary for image acquisition from being introduced into the at least one lens 211. For example, the light shield 230 may block light reflected from, for example, the windshield 10 or the dashboard of the vehicle 100. In addition, the light shield 230 may block light generated from an undesired light source.

The light shield 230 may have a screen shape. For example, the light shield 230 may take the form of a lower screen.

In some implementations, the shape of the light shield 230 may be changed depending on the vehicle model. For example, the light shield 230 may have a shape corresponding to the model of the vehicle to which the vehicle camera 200a is installed because the curvature of the windshield and the angle between the windshield and the ground surface may be different for different vehicle models. To this end, the light shield 230 may have a separable structure.

The heat radiation member 240 may be located at the rear of the image sensor 214. The heat radiation member 240 may come into contact with the image sensor 214 or an image sensor board on which the image sensor 214 is mounted. The heat radiation member 240 may handle the heat from the image sensor 214.

As described above, the image sensor 214 is sensitive to heat. The heat radiation member 240 may be located between the image sensor 214 and the third housing 253. The heat radiation member 240 may be located so as to come into contact with the image sensor 214 and the third housing 253. In this case, the heat radiation member 240 may radiate heat through the third housing 253.

For example, the heat radiation member 240 may be any one of a thermal pad and thermal grease.

The housing 250 may include the lens housing 217, the first housing 251, the second housing 252, and the third housing 253.

The lens housing 217 may receive at least one lens 211, and may protect the at least one lens 211 from external shocks.

The first housing 251 may be formed so as to surround the image sensor 214. The first housing 251 may have the hole 219. The at least one lens 211 received in the lens housing 217 may be connected to the image sensor 214 while being seated in the hole 219.

In some implementations, the first housing 251 may have a thickness that gradually increases with decreasing distance towards the image sensor 214. As such, the first housing 251 may be thicker in a region near the image sensor 214. In some scenarios, this configuration may help mitigate deterioration in performance of the image sensor 214 due to heat by providing a portion of the first housing 251 close to the image sensor 214 being thicker than the remaining portion of the first housing 251. For example, the first housing 251 may be formed via die casting.

In some implementations, the thickness of the first housing 251 may be greater than the thickness of the third housing 253. In such scenarios, the thicker housing may transfer heat more slowly. Therefore, when the thickness of the first housing 251 is greater than the thickness of the third housing 253, heat generated inside the vehicle camera 200a may be radiated outward through the third housing 253, rather than through the first housing 251, which is located near the front windshield 10 and may thus have difficulty in radiating heat.

In some implementations, the lens housing 217 and the first housing 251 may be integrally formed with each other.

The second housing 252 may be located at the front end of the processing board 220. The second housing 252 may be fastened to the first housing 251 and the third housing 253 via prescribed fasteners.

The second housing 252 may include an attachment member to which the light shield 230 may be attached. The light shield 230 may be attached to the second housing 252 via the attachment member.

The first and second housings 252 and 253 may be formed of a synthetic resin material.

The third housing 253 may be fastened to the first housing 251 and the second housing 252 via prescribed fasteners. In some implementations, the first to third housings 251, 252 and 253 may be integrally formed with one another.

The third housing 253 may be formed so as to surround the processing board 220. The third housing 253 may be located at the rear end or the lower end of the processing board 220. The third housing 253 may be formed of a thermally conductive material. For example, the third housing 253 may be formed of a metal such as aluminum. The third housing 253 formed of a thermally conductive material may achieve efficient heat radiation.

When the first and second housings 251 and 252 are formed of a synthetic resin material and the third housing 253 is formed of a thermally conductive material, heat inside the vehicle camera 200a may be radiated from the third housing 253, rather than the first and second housings 251 and 252. For example, when the vehicle camera 200a is mounted on the windshield 10, the first and second housings 251 and 252 are located close to the windshield 10, and therefore the heat may not be radiated through the first and second housings 251 and 252. In this case, the heat may be efficiently radiated through the third housing 253.

Implementing the third housing 253 as being formed of aluminum may, in some scenarios, be advantageous to protect components located in the third housing 253 (e.g. the image sensor 214 and the processor 470) from Electro Magnetic Compatibility (EMC) and Electrostatic Discharge (ESC).

The third housing 253 may come into contact with the processing board 220. In this case, the third housing 253 may effectively radiate heat outward by transferring the heat through the portion thereof in contact with the processing board 220.

The third housing 253 may further include a heat radiator 291. For example, the heat radiator 291 may include at least one selected from among a heat sink, a heat radiation fin, a thermal pad, and thermal grease.

The heat radiator 291 may outwardly radiate heat generated inside the vehicle camera 200a. For example, the heat radiator 291 may be located between the processing board 220 and the third housing 253. The heat radiator 291 may come into contact with the processing board 220 and the third housing 253 so as to outwardly radiate heat generated in the processing board 220.

The third housing 253 may further include an air discharge hole. The air discharge hole is a hole for discharging high-temperature air inside the vehicle camera 200a to the outside of the vehicle camera 200a. An air flow structure may be provided inside the vehicle camera 200a so as to be connected to the air discharge hole. The air discharge hole may guide the high-temperature air inside the vehicle camera 200a to the air discharge hole.

The vehicle camera 200a may further include a damp-proof member. The damp-proof member may take the form of a patch and may be attached to the air discharge hole. The damp-proof member may be a Gore-Tex damp-proof member. The damp-proof member may discharge moisture inside the vehicle camera 200a to the outside. In addition, the damp-proof member may prevent moisture outside the vehicle camera 200a from being introduced into the vehicle camera 200a.

FIG. 6 is a perspective view illustrating a vehicle camera in accordance with an implementation. FIG. 7 is an exploded perspective view illustrating the vehicle camera in accordance with the implementation. FIG. 8 is a cutaway side sectional view illustrating the vehicle camera taken along line C-D of FIG. 6 in accordance with the implementation.

The vehicle camera 200 described below with reference to FIGS. 6 to 8 is the stereo camera 200b.

The description given in relation to the mono camera 200a with reference to FIGS. 3 to 5 may be wholly applied to the stereo camera 200b. For example, each of first and second cameras included in the stereo camera 200b may be the camera described above with reference to FIGS. 3 to 5.

As shown in the example of FIGS. 6 and 7, the stereo camera 200b may include at least one lens, such as a first lens 211a and a second lens 211b. The stereo camera 200b may also include a first image sensor 214a, a second image sensor 214b, a left variable lens 300L, a right variable lens 300R, and a processor 470a.

In some implementations, the vehicle camera 200b may further include a processing board 220a, a first light shield 230a, a second light shield 230b, and a housing 250a individually or in combinations thereof.

In some implementations, the housing 250a may include a first lens housing 217a, a second lens housing 217b, a first housing 251a, a second housing 252a, and a third housing 253a.

In these examples, the description given in relation to the at least one lens 211 with reference to FIGS. 3 to 5 may be applied to the first lens 211a and the second lens 211b.

Furthermore, in these examples, the description given in relation to the image sensor 214 with reference to FIGS. 3 to 5 may be applied to the first image sensor 214a and the second image sensor 214b.

The description in relation to the variable lens 300 with reference to FIGS. 3 to 5 may be applied to the left variable lens 300L and the right variable lens 300R.

In particular, the left variable lens 300L may include a first liquid crystal layer, and may change the light to be introduced into the first image sensor 214a based on the arrangement of liquid crystal molecules included in the first liquid crystal layer, which depends on the voltage applied thereto. The left variable lens 300L may be referred to as a first variable lens.

The right variable lens 300R may include a second liquid crystal layer, and may change the light to be introduced into the second image sensor 214b based on the arrangement of liquid crystal molecules included in the second liquid crystal layer, which depends on the voltage applied thereto. The right variable lens 300R may be referred to as a second variable lens.

A module including the first lens 211a, the first image sensor 214a, and the left variable lens 300L may be referred to as a first image acquisition module. In addition, a module including the second lens 211b, the second image sensor 214b, and the right variable lens 300R may be referred to as a second image acquisition module.

The processor 470a may be electrically connected to the first image sensor 214a, the second image sensor 214b, the left variable lens 300L, and the right variable lens 300R. The processor 470a may perform computer processing on images acquired via the first image sensor 214a and the second image sensor 214b. The processor 470 may form a disparity map or perform disparity calculation based on the images acquired via the first image sensor 214a and the second image sensor 214b.

The processor 470a may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 470a may be mounted on the processing board 220a.

The description given in relation to the processing board 220 with reference to FIGS. 3 to 5 may be applied to the processing board 220a.

The description given in relation to the light shield 230 with reference to FIGS. 3 to 5 may be applied to the first light shield 230a and the second light shield 230b.

The description given in relation to the lens housing 217 with reference to FIGS. 3 to 5 may be applied to the first lens housing 217a and the second lens housing 217b.

The description given in relation to the first housing 251 with reference to FIGS. 3 to 5 may be applied to the first housing 251a.

The description given in relation to the second housing 252 with reference to FIGS. 3 to 5 may be applied to the second housing 252a.

The description given in relation to the third housing 253 with reference to FIGS. 3 to 5 may be applied to the third housing 253a.

Figure 9:
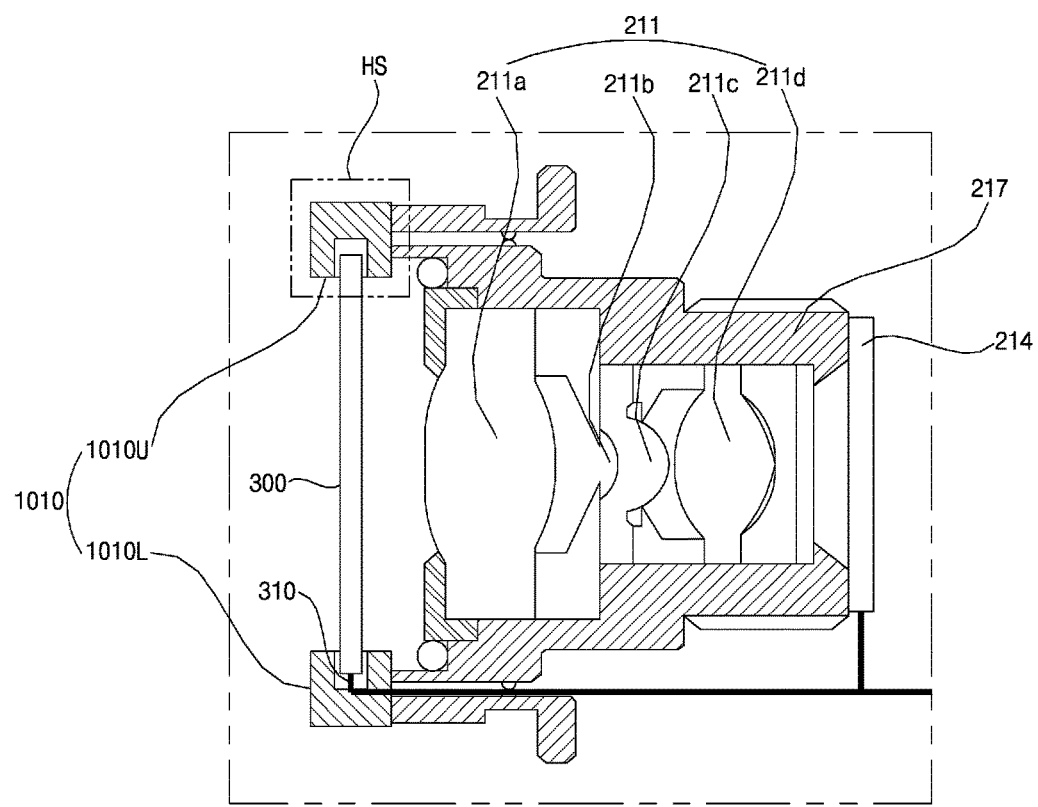
FIG. 9 is a diagram illustrating an enlarged cutaway side sectional view of an example of a portion CR1 of FIG. 5 or portion CR2 of FIG. 8.

FIG. 9 is an enlarged cutaway side sectional view illustrating portion CR1 of FIG. 5 or portion CR2 of FIG. 8.

Referring to FIG. 9, the vehicle camera 200 may include the image sensor 214 and the variable lens 300.

The image sensor 214 may include a CCD or CMOS as described above.

The image sensor 214 may be located at the rear of the variable lens 300.

The variable lens 300 may be located at the front of the image sensor 214.

The variable lens 300 may include a liquid crystal layer. The variable lens 300 may change the light to be introduced to the image sensor 214 based on the arrangement of liquid crystal molecules included in the liquid crystal layer, which depends on the voltage applied thereto, under the control of the processor 470.

For example, the variable lens 300 may refract the light to be introduced to the image sensor 214. In this case, the variable lens 300 may change the focal distance. The variable lens may perform various lens functions under the control of the processor 470.

For example, the variable lens 300 may include a wetting lens, a Graded Refractive Index (GRIN) lens or a Fresnel lens.

The wetting lens may change the introduced light by varying a polar material using the potential difference of the electricity applied to the lens.

The GRIN lens or the Fresnel lens may include a liquid crystal layer and may change the introduced light based on the arrangement of liquid crystals included in the liquid crystal layer, which depends on the application of electricity thereto.

The variable lens 300 may be configured to be slidably moved in the left-right direction (e.g. in the overall width direction). The vehicle camera 200 may include an actuator (e.g., actuator 401 in FIG. 19) and a drive power transmission unit.

For example, the actuator (e.g., actuator 401 in FIG. 19) may include a motor. The drive power transmission unit may include at least one gear.

The actuator (e.g., actuator 401 in FIG. 19) may generate drive power under the control of the processor 470. The drive power generated in the actuator (e.g., actuator 401 in FIG. 19) may be transmitted to the variable lens 300 via the drive power transmission unit through conversion from rotation to linear movement. The variable lens 300 may be slidably moved in the left-right direction (e.g., in the overall width direction) upon receiving drive power.

The variable lens 300 may be configured to be slidably moved in the front-rear direction (e.g., in the overall length direction). The vehicle camera 200 may include the actuator (e.g., actuator 401 in FIG. 19) and the drive power transmission unit.

For example, the actuator (e.g., actuator 401 in FIG. 19) may include a motor. The drive power transmission unit may include at least one gear.

The actuator (e.g., actuator 401 in FIG. 19) may generate drive power under the control of the processor 470. The drive power generated in the actuator (e.g., actuator 401 in FIG. 19) may be transmitted to the variable lens 300 via the drive power transmission unit through conversion from rotation to linear movement. The variable lens 300 may be slidably moved in the front-rear direction (e.g., in the overall length direction) upon receiving drive power.

In this way, the variable lens 300 may cope with blurring by sliding in the front-rear direction as the focal distance is changed.

The variable lens 300 may be configured to be rotatably moved. The vehicle camera 200 may include the actuator (e.g., actuator 401 in FIG. 19) and the drive power transmission unit.

For example, the actuator (e.g., actuator 401 in FIG. 19) may include a motor. The drive power transmission unit may include at least one gear.

The actuator (e.g., actuator 401 in FIG. 19) may generate drive power under the control of the processor 470. The drive power generated in the actuator (e.g., actuator 401 in FIG. 19) may be transmitted to the variable lens 300 via the drive power transmission unit. The variable lens 300 may be rotated and moved forward upon receiving the drive power.

When the variable lens 300 is configured to be slidably or rotatably moved as described above, the variable lens 300 may be used as needed, and may not be used by being slidably or rotatably moved when it is not necessary.

In some implementations, the vehicle camera 200 may further include at least one lens 211. The example of FIG. 9 illustrates the at least one 211 including four lenses, a first lens 211a, a second lens 211b, a third lens 211c and a fourth lens 211d. However, the number of lenses is not limited thereto and any suitable number of lenses in the at least one lens 211 may be implemented.

The at least one lens 211 may be located between the variable lens 300 and the image sensor 214. The at least one lens 211 may refract introduced light. The light refracted via the at least one lens 211 may be introduced to the image sensor 214.

In some implementations, the vehicle camera 200 may further include the housing 250. The housing 250 may include the lens housing 217, the first housing 251, the second housing 252, and the third housing 253.

The housing 250 may define the external appearance of the vehicle camera 200, and may receive the respective components of the vehicle camera 200 including the image sensor 214 and the variable lens 300.

The housing 250 may include a holder 1010. Although FIG. 9 illustrates the holder 1010 as being formed on the lens housing 217, the holder 1010 may be formed on the first housing 251 in some implementations.

The holder 1010 may support the variable lens 300. The holder 1010 may include an upper holder 1010U for supporting the upper end of the variable lens 300 and a lower holder 1010L for supporting the lower end of the variable lens 300.

In some implementations, the vehicle camera 200 may further include a heating element. The heating element may supply heat to the variable lens 300 under the control of the processor 470. In some implementations, the heating element may include one or more hot wires.

In some scenarios, liquid crystals may be sensitive to the surrounding temperature. For example, variable lenses that include liquid crystals may be vulnerable to the surrounding temperature, and particularly to low temperatures. In some implementations, the variable lens 300 included in the vehicle camera 200 may be configured in consideration of thermal properties of liquid crystals so as to cope with driving conditions in cold temperatures, such as during the winter or driving in very cold areas. In implementation in which the vehicle camera 200 includes a heating element as in the present implementation, the variable lens 300 may be operated even in such low-temperature driving situations.

In some implementations, the heating element may include one or more hot wires that may be referred to as a heat supply unit.

The heating element may be formed inside the holder 1010. For example, the heating element may be formed inside at least one of the upper holder 1010U and the lower holder 1010L.

The holder 1010 and the heating element formed inside the holder 1010 will be described below with reference to FIGS. 10A to 10C.

Figure 10A:
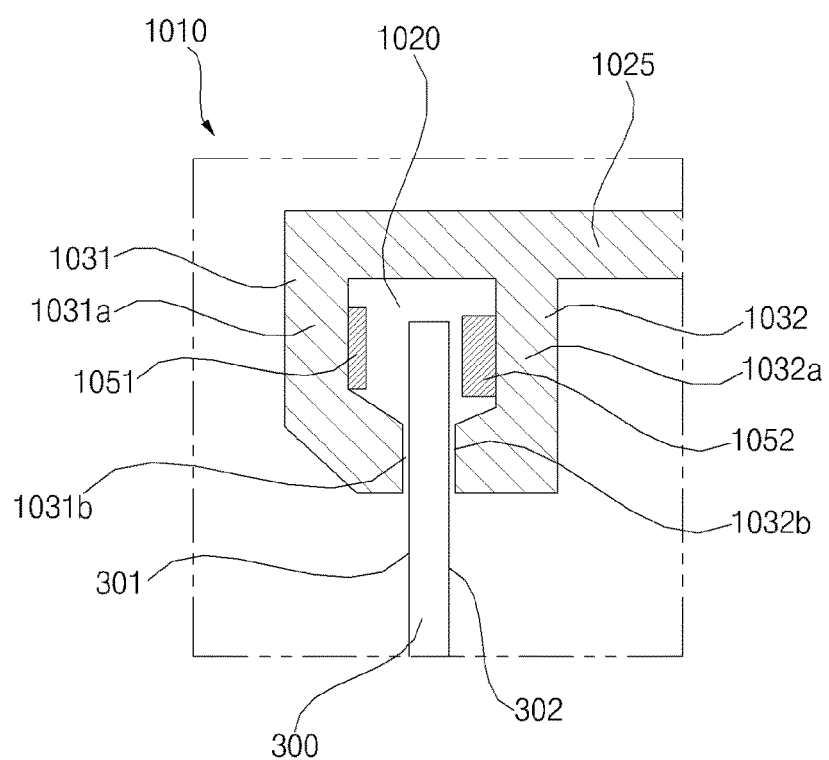
FIGS. 10A to 11 are diagrams illustrating enlarged side views of examples of portion HS of FIG. 9, which are referenced to describe various implementations of a holder and at least one heating element provided in the holder.
Figure 10B:
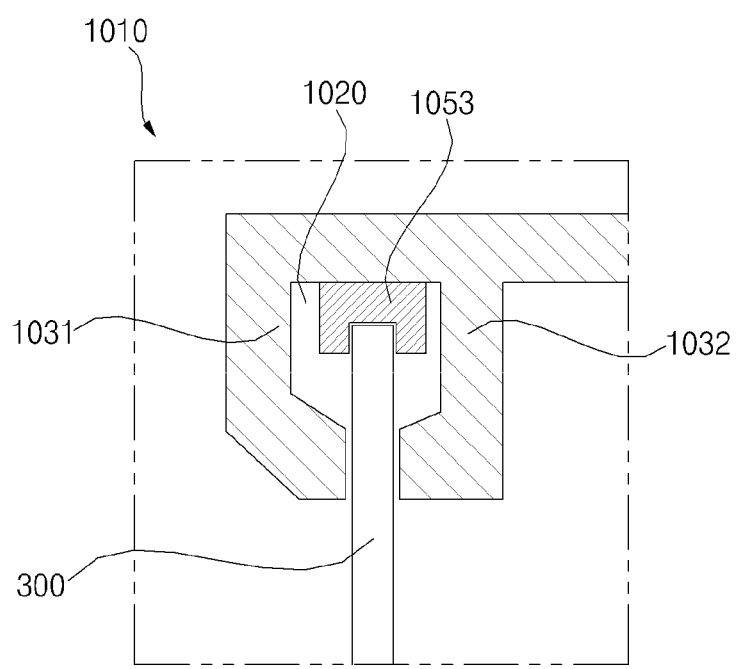
Figure 11:
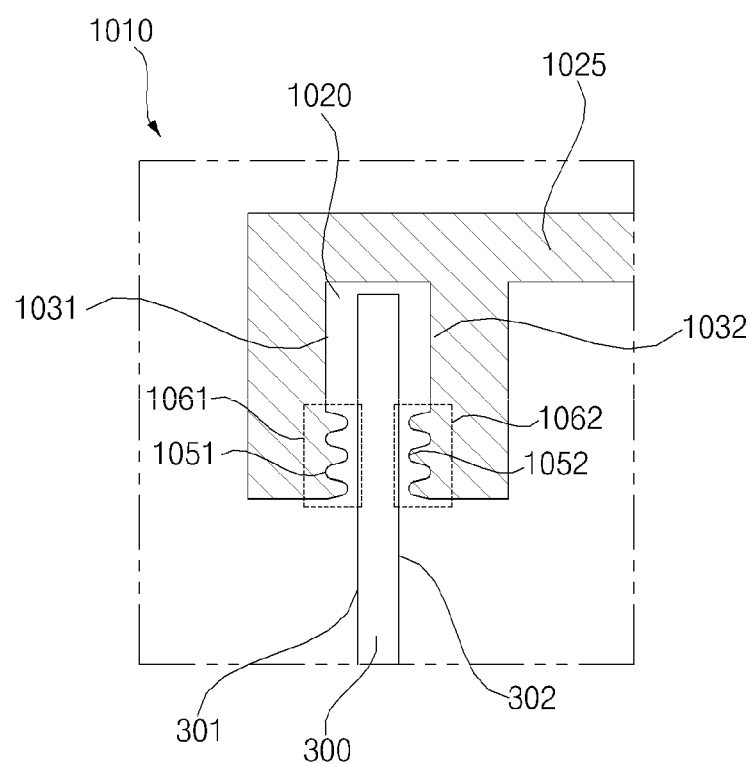

FIGS. 10A to 11 are enlarged side views illustrating portion HS of FIG. 9, which are referenced to describe various implementations of the holder and a heating element provided inside the holder.

Although the upper holder 1010U will be described by way of example with reference to FIGS. 10A to 11, a description related to the upper holder 1010U may be applied to the lower holder 1010L because the lower holder 1010L has the same function and configuration as those of the upper holder 1010U except the difference in the portion thereof for supporting the variable lens 300.

Referring to FIGS. 10A to 11, the holder 1010 may include a slot 1020.

The slot 1020 may receive a portion of the variable lens 300. For example, the slot 1020 included in the upper holder 1010U may receive an upper portion of the variable lens 300. The slot 1020 included in the lower holder 1010L may receive a lower portion of the variable lens 300.

A heating element may be formed inside the slot 1020. For example, as shown in FIG. 10A, hot wires 1051 and 1052 may be formed inside the slot 1020.

In some implementations, the hot wires 1051 and 1052 may be spaced apart from the variable lens 300. As such, the spacing of the hot wires 1051 and 1052 apart from the variable lens 300 may help mitigate damage to the variable lens 300 as compared to scenarios where the hot wires 1051 and 1052 come into contact with the variable lens 300. Heat generated from the hot wires 1051 and 1052 may be transferred to the variable lens 300 via radiation.

In some implementations, as illustrated in the example of FIG. 10B, a heating element, such as hot wire 1053, may come into contact with at least a portion of the rim of the variable lens 300. In this case, heat generated from the hot wire 1053 may be transferred to the variable lens 300 via conduction, which may provide efficient and direct transfer of heat.

In some implementations, the holder 1010 may include a first fixing portion 1031 and a second fixing portion 1032.

The first fixing portion 1031 may support a first surface 301 of the variable lens 300. The first surface 301 may be the surface facing the front side of the vehicle.

The first fixing portion 1031 may include a first separated portion 1031a and a first contact portion 1031b.

The first separated portion 1031a may extend upward or downward from a base 1025. The first separated portion 1031a may be spaced apart from the variable lens 300, rather than coming into contact with the variable lens 300. A cavity may be formed between the first separated portion 1031a and the variable lens 300.

The first contact portion 1031b may extend from the first separated portion 1031a toward the rear side of the vehicle 100. The first contact portion 1031b may come into contact with a portion of the first surface 301 of the variable lens 300. The first contact portion 1031b may support the variable lens 300 in conjunction with a second contact portion 1032b, so as to fix the variable lens 300.

The second fixing portion 1032 may support a second surface 302 of the variable lens 300. The second surface 302 may be the surface facing the rear side of the vehicle.

The second fixing portion 1032 may include a second separated portion 1032a and the second contact portion 1032b.

The second separated portion 1032a may extend upward or downward from the base 1025. The second separated portion 1032a may be spaced apart from the variable lens 300, rather than coming into contact with the variable lens 300. A cavity may be formed between the second separated portion 1032a and the variable lens 300.

The second contact portion 1032b may extend from the second separated portion 1032a toward the front side of the vehicle 100. The second contact portion 1032b may be symmetrical to the first contact portion 1031b about the variable lens 300. The second contact portion 1032b may support the variable lens 300 in conjunction with the first contact portion 1031b, so as to fix the variable lens 300.

The slot 1020 may be formed between the first fixing portion 1031 and the second fixing portion 1032.

A heating element may be provided. For example, the first hot wire 1051 and the second hot wire 1052 may be provided.

The first hot wire 1051 may be formed on a portion of the first fixing portion 1031.

The first hot wire 1051 may be located between the first fixing portion 1031 and the variable lens 300. For example, the first hot wire 1051 may be located between the first fixing portion 1031 and the first surface 301 of the variable lens 300.

The first hot wire 1051 may be spaced apart from the variable lens 300. For example, the first hot wire 1051 may be spaced apart from the first surface 301 of the variable lens 300.

The second hot wire 1052 may be located between the second fixing portion 1032 and the variable lens 300. For example, the second hot wire 1052 may be located between the second fixing portion 1032 and the second surface 302 of the variable lens 300.

The second hot wire 1052 may be spaced apart from the variable lens 300. For example, the second hot wire 1052 may be spaced apart from the second surface 302 of the variable lens 300.

In some implementations, as illustrated in FIG. 11, the first fixing portion 1031 may include a first ridged portion 1061. For example, the first contact portion 1031b may include the first ridged portion 1061.

The first ridged portion 1061 may come into contact with at least a portion of the first surface 301. For example, the first ridged portion 1061 may include at least one ridge and at least one furrow. Here, the ridge may protrude toward the variable lens 300 so as to come into contact with the first surface 301 of the variable lens 300. The furrow may be indented away from the variable lens 300 so as to be spaced apart from the first surface 301 of the variable lens 300.

Through the provision of the ridge and the furrow as described above, it is possible to prevent damage to the variable lens 300 when supporting and fixing the variable lens 300. For example, although shocks may be applied to the vehicle camera 200 depending on the road conditions when the vehicle 100 is being driven, it is possible to reduce the application of shocks to the variable lens 300 upon the occurrence of such shocks.

The first hot wire 1051 may be formed on the first ridged portion 1061. For example, the first hot wire 1051 may be formed on the protrusion or in the furrow included in the first ridged portion 1061.

When the first hot wire 1051 is formed on the ridge, the first hot wire 1051 may come into contact with the first surface 301 of the variable lens 300 so that heat is transferred to the variable lens 300 via conduction. In this case, the efficient and direct transfer of heat is possible.

When the first hot wire 1051 is formed in the furrow, the first hot wire 1051 may be spaced apart from the first surface 301 of the variable lens 300 so that heat is transferred to the variable lens 300 via radiation. In this case, it is possible to prevent damage to the variable lens 300.

The second fixing portion 1032 may include a second ridged portion 1062. For example, the second contact portion 1032b may include the second ridged portion 1062.

The second ridged portion 1062 may come into contact with at least a portion of the second surface 302. For example, the second ridged portion 1062 may include at least one ridge and at least one furrow. Here, the ridge may protrude toward the variable lens 300 so as to come into contact with the second surface 302 of the variable lens 300. The furrow may be indented away from the variable lens 300 so as to be spaced apart from the second surface 302 of the variable lens 300.

Through the provision of the ridge and the furrow as described above, it is possible to prevent damage to the variable lens 300 when supporting and fixing the variable lens 300. For example, although shocks may be applied to the vehicle camera 200 depending on the road conditions when the vehicle 100 is being driven, it is possible to reduce the application of shocks to the variable lens 300 upon the occurrence of such shocks.

The second hot wire 1052 may be formed on the second ridged portion 1062. For example, the second hot wire 1052 may be formed on the protrusion or in the furrow included in the second ridged portion 1062.

When the second hot wire 1052 is formed on the ridge, the second hot wire 1052 may come into contact with the second surface 302 of the variable lens 300 so that heat is transferred to the variable lens 300 via conduction. In this case, the efficient and direct transfer of heat is possible.

When the second hot wire 1052 is formed in the furrow, the second hot wire 1052 may be spaced apart from the second surface 302 of the variable lens 300 so that heat is transferred to the variable lens 300 via radiation. In this case, it is possible to prevent damage to the variable lens 300.

FIG. 12 is a view referenced to describe the variable lens in accordance with an implementation.

Referring to FIG. 12, the variable lens 300 may include a first substrate 1210, a second substrate 1220, and a liquid crystal layer 1230.

The first substrate 1210 may include a first base substrate 1211, a plurality of first electrodes 1212, and an insulator film 1213.

The first electrodes 1212 may be formed on the first base substrate 1211. The first electrodes 1212 are spaced apart from one another by a prescribed distance. A voltage may be applied to the first electrodes 1212 under the control of the processor 470. For example, different levels of voltage may be respectively applied to each of the first electrodes 1212 under the control of the processor 470.

In some implementations, the first electrodes 1212 may be transparent electrodes. For example, the first electrodes may be transparent Indium Tin Oxide (ITO) electrodes. When the first electrodes 1212 are transparent electrodes, the field of vision of the vehicle camera 200 may be achieved by preventing the electrodes from blocking the field of vision.

The insulator film 1213 may be formed on the first base substrate 1211 so as to cover the first electrodes 1212.

The second substrate 1220 may be disposed so as to face the first substrate 1210. The second substrate 1220 may include a second base substrate 1221 and a second electrode 1222.

The second electrode 1222 may be formed on the second base substrate 1221. The second electrode 1222 may be disposed so as to face the first electrodes 1212. A voltage may be applied to the second electrode 1222 under the control of the processor 470. A constant level of voltage may be applied to the second electrode 1222 under the control of the processor 470.

In some implementations, the second electrode 1222 may be a transparent electrode. For example, the second electrode 1222 may be a transparent ITO electrode. When the second electrode 1222 is a transparent electrode, the field of vision of the vehicle camera 200 may be achieved by preventing the electrodes from blocking the field of vision.

The liquid crystal layer 1230 may be disposed between the first substrate 1210 and the second substrate 1220. The liquid crystal layer 1230 may include a plurality of liquid crystal molecules 1231. The liquid crystal molecules 1231 may be driven from the horizontal direction to the vertical direction at a prescribed angle corresponding to the magnitude of a voltage applied thereto. The focal point of the variable lens 300 may be changed due to the prescribed angle of the liquid crystal molecules 1231 under the control of the processor 470.

The variable lens 300 may further include a first transparent plate and a second transparent plate. The first transparent plate may be disposed outside the first substrate 1210. The second transparent plate may be disposed outside the second substrate 1220. The transparent plate may be referred to as glass.

Figure 13:
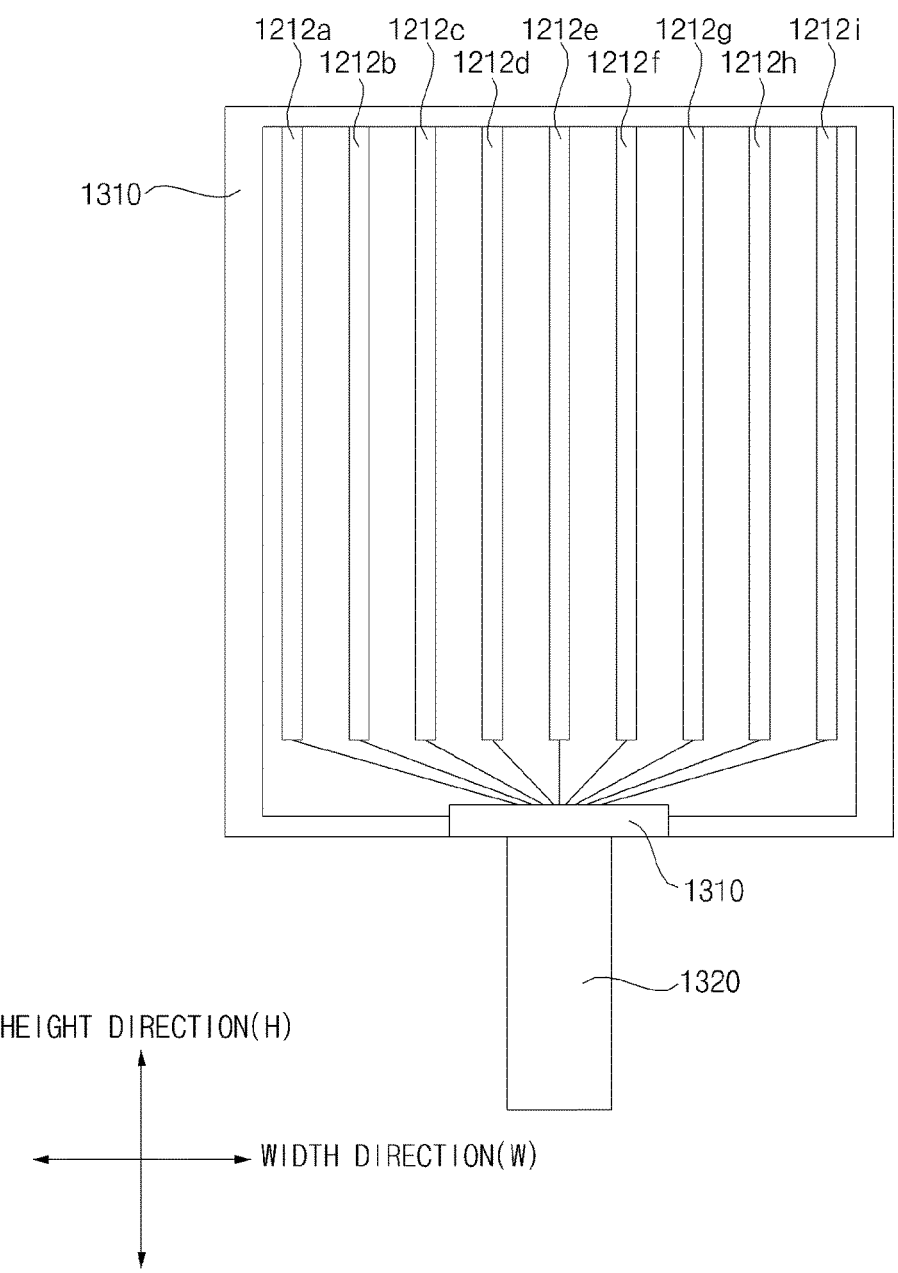
FIG. 13 is a diagram illustrating an example of a first substrate in accordance with an implementation.

FIG. 13 is a view referenced to describe the first substrate in accordance with an implementation.

FIG. 13 illustrates the first substrate 1210 in accordance with an implementation, which is viewed from the top side thereof.

Referring to FIG. 13, the first substrate (e.g., first substrate 1210 in FIG. 12) may include a plurality of first electrodes 1212a to 1212i. The first electrodes 1212a to 1212i may be spaced apart from one another by a prescribed distance. The first electrodes 1212a to 1212i may be arranged in the up-down direction or in the left-right direction. Here, the up-down direction may refer to the overall height direction or the vertical direction. The left-right direction may refer to the overall width direction or the horizontal direction.

FIG. 13 illustrates the first electrodes 1212a to 1212i arranged so as to extend in the up-down direction.

When the first electrodes 1212a to 1212i are arranged so as to extend in the up-down direction as described above, the Field Of View (FOV) in the left-right direction may be widened.

As the number of first electrodes 1212a to 1212i is increased, the FOV in the left-right direction may be gradually widened.

The variable lens 300 may further include a drive unit. The drive unit may apply a voltage to the respective first electrodes 1212a to 1212i or the second electrode 1222. The drive unit is electrically connected to the processor 470. The drive unit may be connected to the processor 470 via an FPCB or a cable.

In some implementations, a plurality of drive units may be provided. For example, the drive units may include a first drive unit 1310 and a second drive unit.

The first drive unit 1310 may include an Integrated Circuit (IC). The first drive unit 1310 may apply a voltage to the first electrodes 1212a to 1212i upon receiving a signal from the processor 470. The first drive unit 1310 may apply a constant level of voltage to the first electrodes 1212a to 1212i. Alternatively, the first drive unit 1310 may apply different levels of voltage to each of the first electrodes 1212a to 1212i.

The second drive unit may include an IC. The second drive unit may apply a voltage to the second electrode 1222 upon receiving a signal from the processor 470. The second drive unit may apply a constant level of voltage to the second electrode 1222.

The first substrate 1210 may include a heating element, such as hot wire 1310'. The hot wire 1310' may be disposed on the first base substrate 1211. For example, the hot wire 1310' may be disposed along the rim of the first base substrate 1211. With this arrangement of the hot wire 1310', the field of vision of the vehicle camera 200 may be achieved without blocking the field of vision due to the hot wire 1310'.

The hot wire 1310' may supply heat to the variable lens 300. For example, the hot wire 1310' may supply heat to the liquid crystal layer 1230.

In some implementations, the second substrate 1220 may include a heating element, such as a hot wire. The hot wire may be disposed on the second base substrate 1221.

Figure 14A:
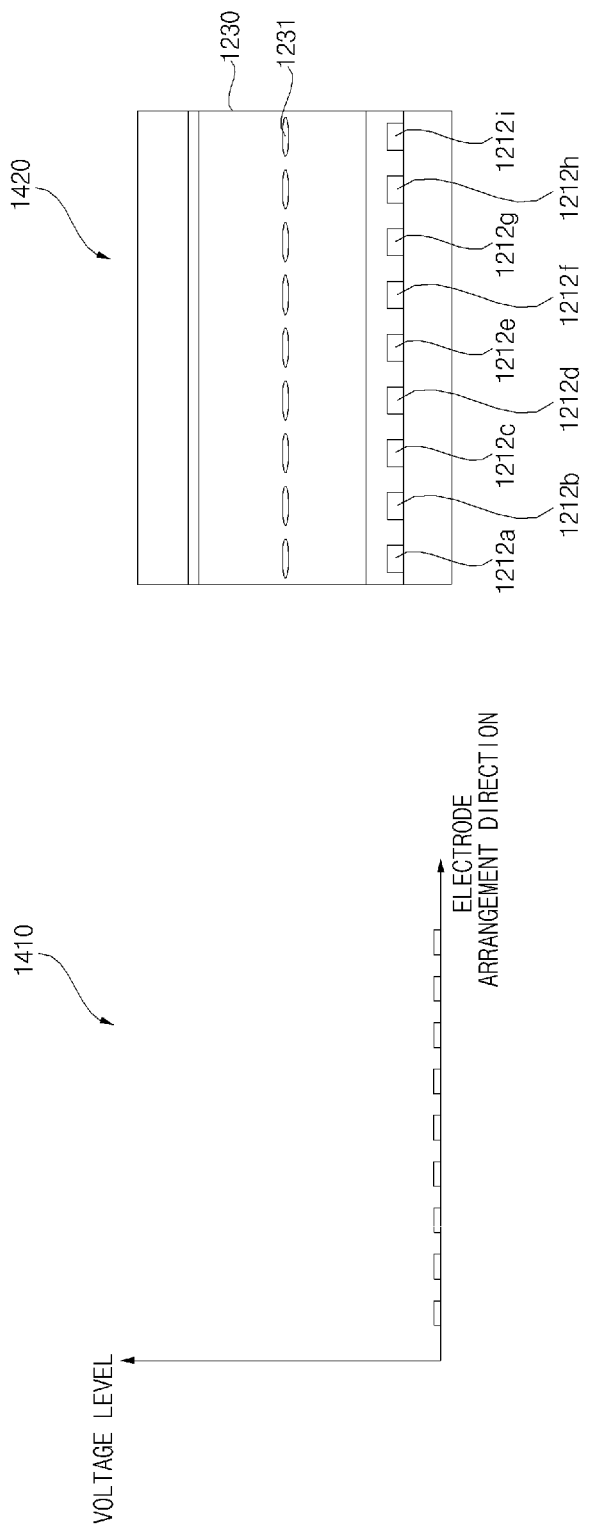
FIGS. 14A to 14C are diagrams illustrating examples of an operation in which different levels of voltage are respectively applied to each of a plurality of first electrodes in accordance with an implementation.
Figure 14B:
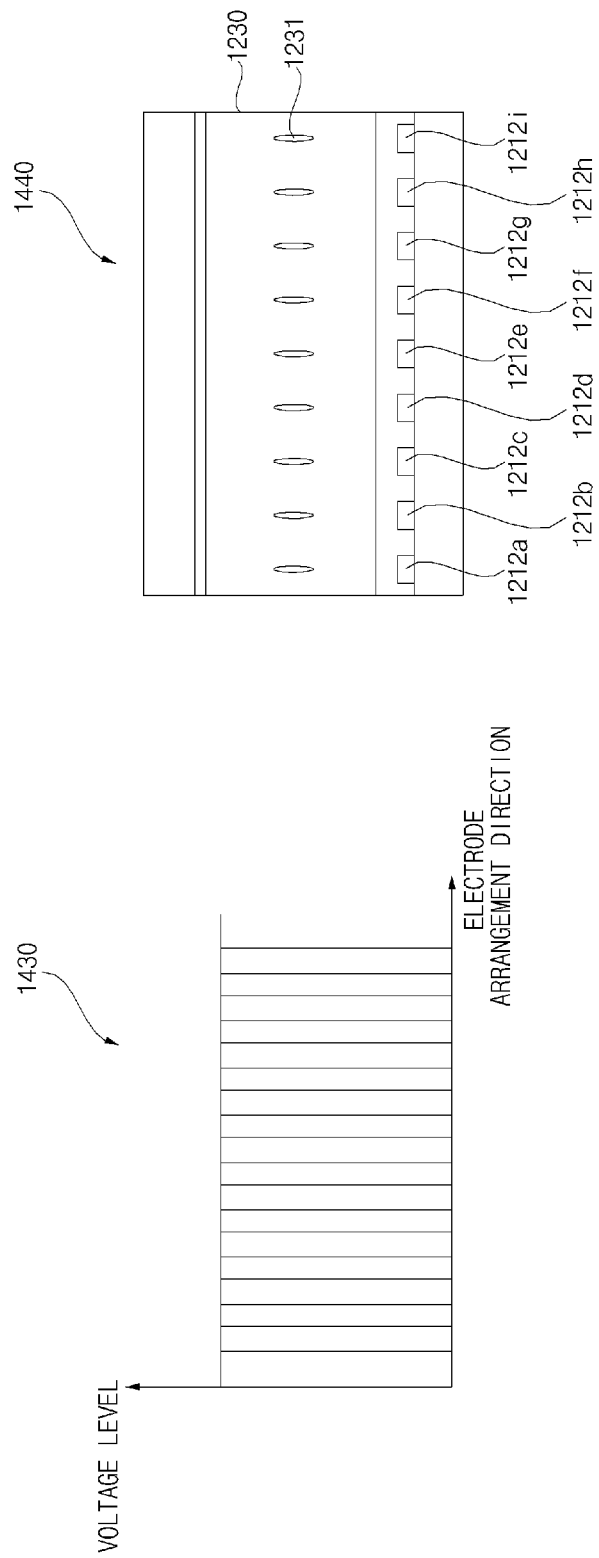
Figure 14C:
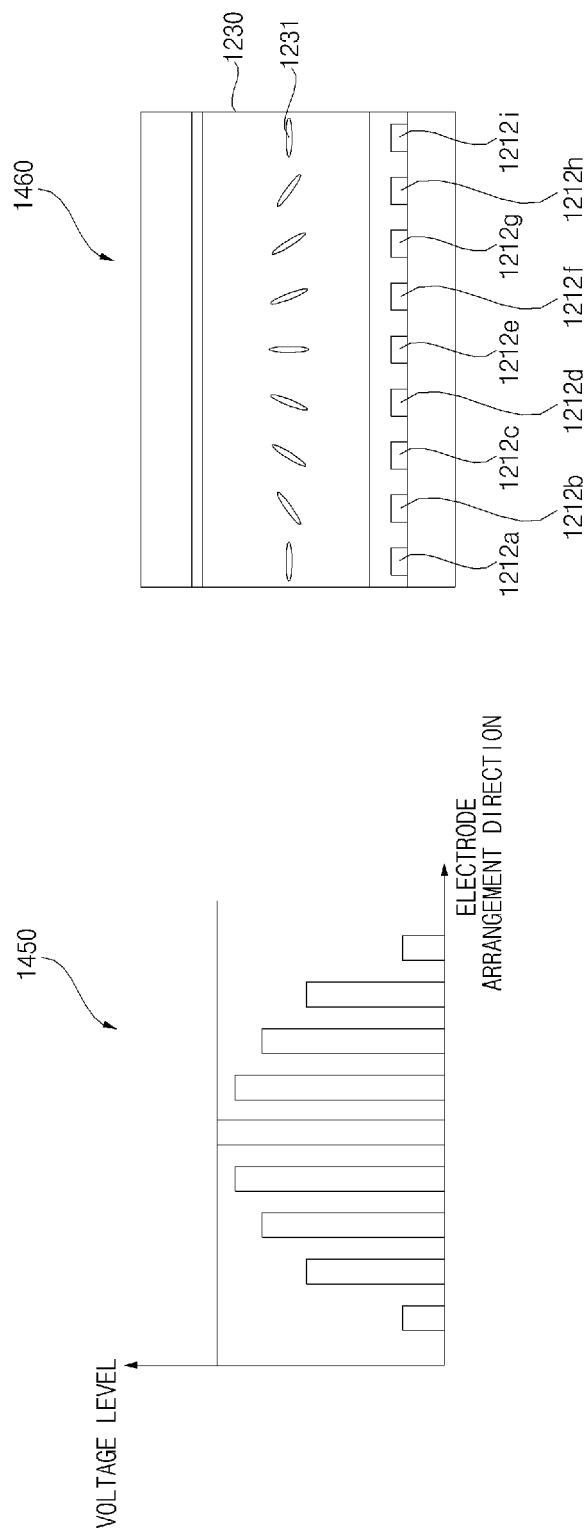

FIGS. 14A to 14C are views referenced to describe an operation in which different levels of voltage are respectively applied to each of the first electrodes in accordance with an implementation.

Referring to FIG. 14A, the processor 470 may control the levels of voltage 1410 respectively applied to each of the first electrodes 1212a to 1212i by controlling the first drive unit (e.g., first drive unit 1310 in FIG. 13). The arrangement 1420 of the liquid crystal molecules 1231 included in the liquid crystal layer 1230 may be converted so as to correspond to the levels of voltage applied to the first electrodes 1212a to 1212i.

As illustrated in the example of FIG. 14B, the processor 470 may control the first drive unit 1310 so that a constant level of voltage 1430 is applied to the first electrodes 1212a to 1212i.

In this case, the liquid crystal molecules 1231 included in the liquid crystal layer 1230 may have the arrangement 1440 for transmitting light introduced from the outside, rather than refracting the light. The arrangement of the liquid crystal molecules 1231 illustrated in FIG. 14B is merely given by way of example, and the arrangement may be changed according to the properties of the liquid crystals.

In this case, the variable lens 300 may have a reduced FOV and an increased focal distance, thus functioning as a telephoto lens. In this case, the variable lens 300 may be used to detect, and track an object located a long distance away from the vehicle 100.

As exemplarily illustrated in FIG. 14C, the processor 470 may control the first drive unit 1310 so that different levels of voltage 1450 are applied to the first electrodes 1212a to 1212i. For example, the processor 470 may control the first drive unit 1310 such that a higher level of voltage is applied to center electrodes 1212e and 1212f among the first electrodes 1212a to 1212i than that applied to outer peripheral electrodes 1212a and 1212j.

In this case, the liquid crystal molecules 1231 included in the liquid crystal layer 1230 may have an arrangement 1460 for refracting some or all of the light introduced from the outside. The arrangement of the liquid crystal molecules 1231 illustrated in FIG. 14C is merely given by way of example, and the arrangement may be changed according to the kind of liquid crystals.

In this case, the variable lens 300 may have an increased FOV and a reduced focal distance, thus functioning as a wide-angle lens. In this case, the variable lens 300 may be used to detect and track an object located a short distance away from the vehicle 100. In this case, the processor 470 may control the first drive unit 1310 so that the levels of voltage applied to the electrodes are symmetrical on the left side and the right side about the center electrodes 1212e and 1212f.

In some implementations, the processor 470 may change the FOV or the focal distance by controlling the levels of voltage of the first electrodes 1212a to 1212i.

In some implementations, the processor 470 may control the first drive unit 1310 so that the levels of voltage applied to the electrodes are symmetrical on the left side and the right side about the center electrodes 1212e and 1212f. In this case, the processor 470 may change the focal point of the variable lens 300 based on a Point of Interest (POI).

The processor 470 may perform computer processing on an image acquired via the image sensor 214.

FIG. 15 is a view referenced to describe the arrangement of the first electrodes in the left-right direction in accordance with an implementation.

Referring to FIG. 15, the first substrate (e.g., first substrate 1210 in FIG. 12) may include the first electrodes 1212a to 1212i. Here, the first electrodes 1212a to 1212i may be arranged so as to extend in the left-right direction.

When the first electrodes 1212a to 1212i are arranged so as to extend in the left-right direction as described above, the Field Of View (FOV) in the up-down direction may be widened.

As the number of first electrodes 1212a to 1212i is increased, the FOV in the up-down direction may be gradually widened.

Figure 16:
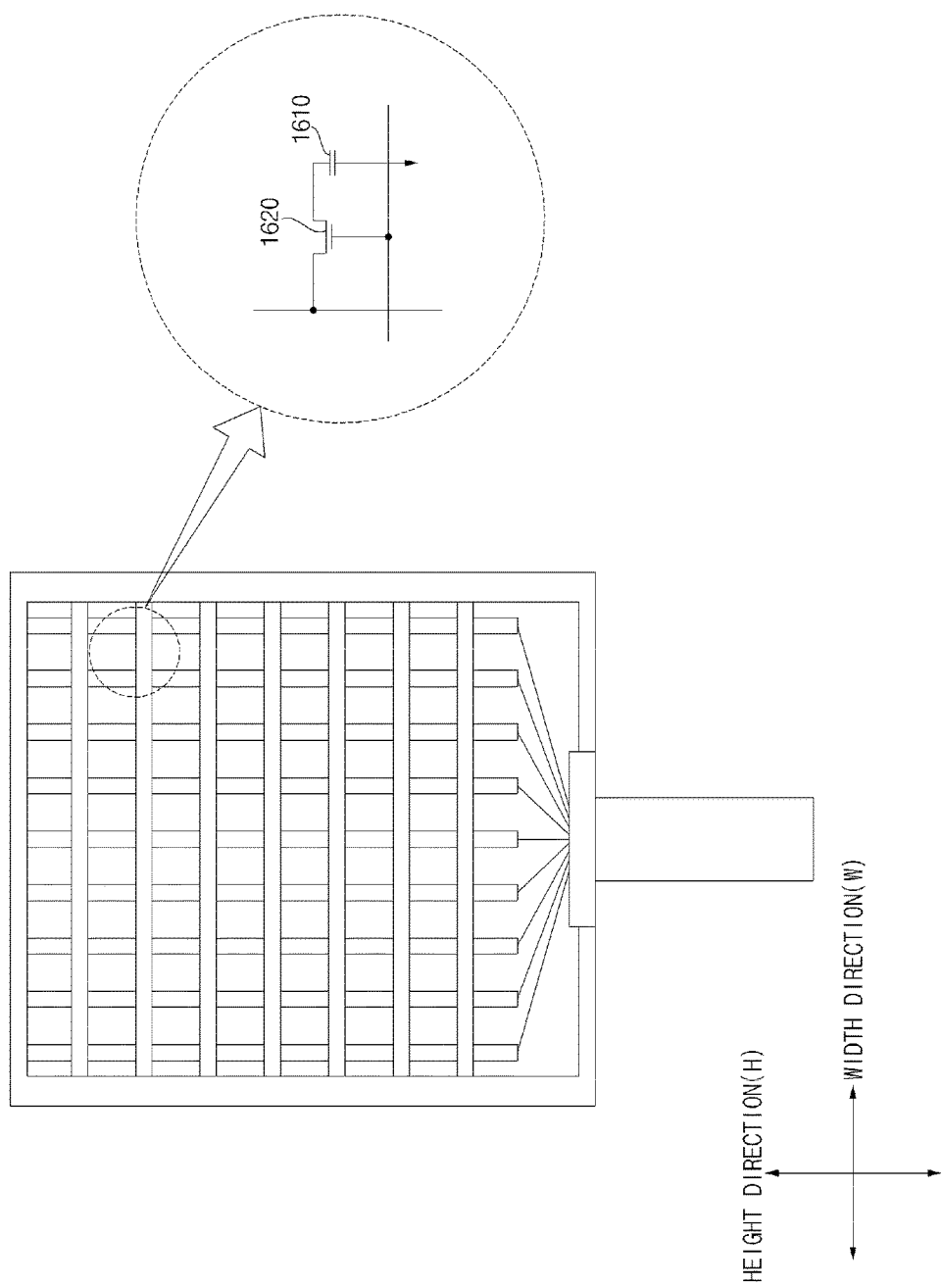
FIG. 16 is a diagram illustrating an example of an arrangement of the first electrodes in the left-right direction and the up-down direction in accordance with an implementation.

FIG. 16 is a view referenced to describe the arrangement of the first electrodes in the left-right direction and the up-down direction in accordance with an implementation.

Referring to FIG. 16, the first electrodes may be arranged so as to extend in the up-down direction and the left-right direction.

The first substrate 1210 may include the first electrodes 1212 and a plurality of capacitors 1610. Here, the first electrodes 1212 may be arranged so as to extend in the left-right direction and the up-down direction.

The capacitors 1610 may be located at respective intersections of the electrodes arranged so as to extend in the up-down direction and the electrodes arranged so as to extend in the left-right direction. The capacitors 1610 may prevent voltage drop that may occur at the intersections, thereby allowing a voltage to be applied to the respective first electrodes 1212 under the control of the controller 170.

Thin Film Transistors (TFTs) may be located between the intersections and the capacitors 1610. The TFTs may prevent reversed current.

Figure 17:
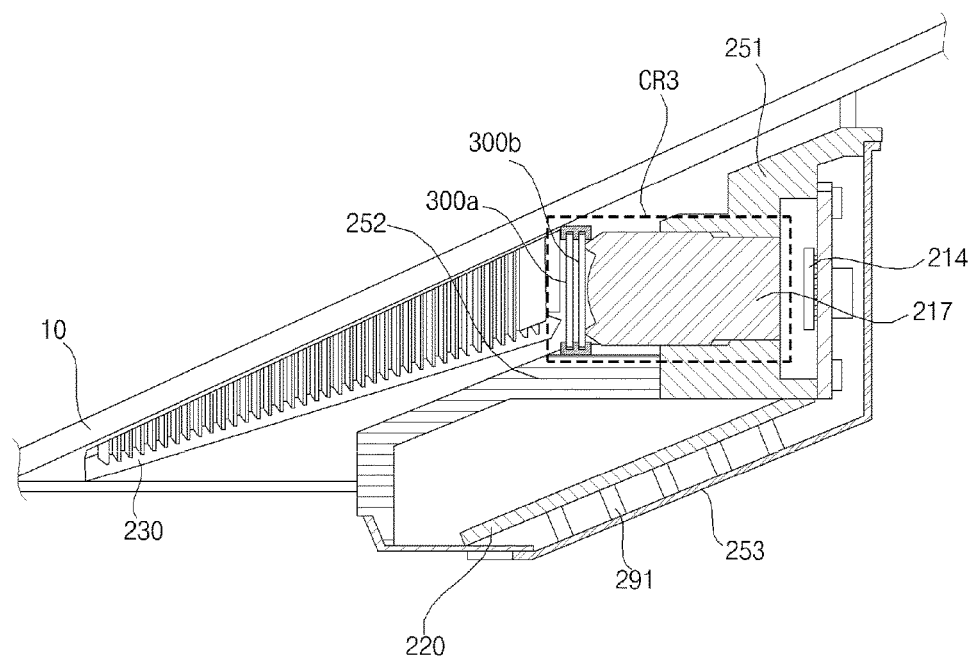
FIGS. 17 and 18 are diagrams illustrating examples of a vehicle camera including a plurality of variable lenses in accordance with an implementation.
Figure 18:
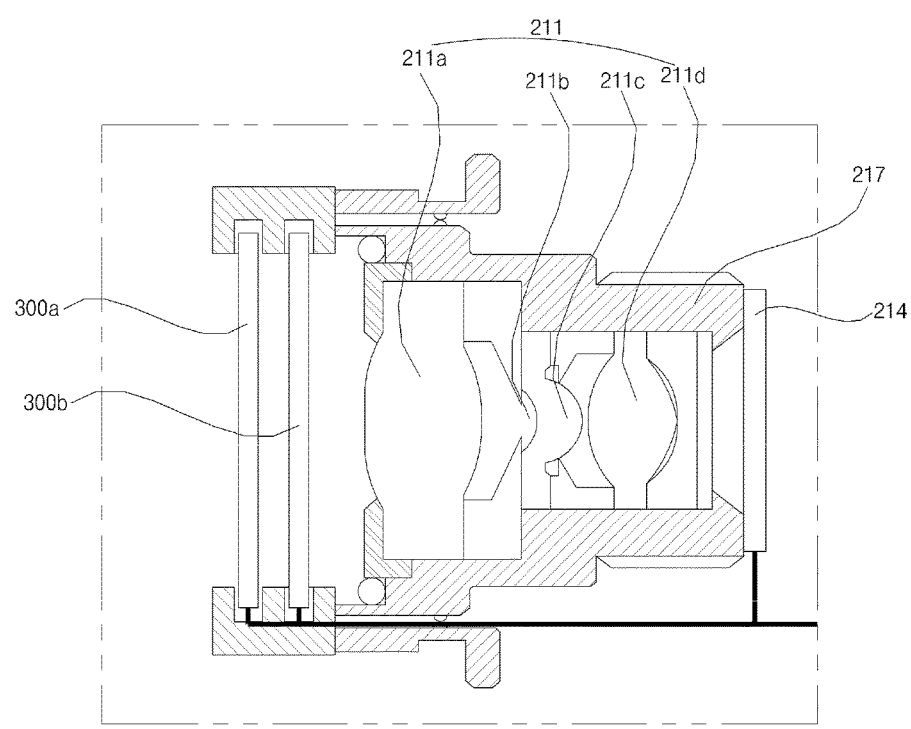

FIGS. 17 and 18 are views referenced to describe a vehicle camera including a plurality of variable lenses in accordance with an implementation.

FIG. 17 is a cutaway side view of the vehicle camera taken along line A-B of FIG. 3 or line C-D of FIG. 6 in accordance with an implementation.

FIG. 18 is an enlarged cutaway side view of portion CR3 of FIG. 18.

The vehicle camera of FIGS. 17 and 18 differs from the vehicle camera described above with reference to FIGS. 1 to 17 in that it includes a first variable lens 300a and a second variable lens 300b. The above description, made with reference to FIGS. 1 to 16, may be applied to the other configurations of the vehicle camera 200 of FIGS. 17 and 18, excluding the provision of the variable lenses 300a and 300b.

In addition, the above description given in relation to the variable lens 300 with reference to FIGS. 1 to 16 may be applied to each of the first variable lens 300a and the second variable lens 300b.

The vehicle camera 200 may include the image sensor 214, the first variable lens 300a, the second variable lens 300b, and the processor 470.

The first variable lens 300a may include a first liquid crystal layer, and may change light to be introduced to the image sensor 214 based on the arrangement of liquid crystal molecules included in the first liquid crystal layer. The first variable lens 300a may be located at the front side of the image sensor 214 and the second variable lens 300b. The first variable lens 300a may change the light introduced from the outside.

The first variable lens 300a may include a first substrate, a second substrate, and the first liquid crystal layer.

The description given in relation to the variable lens 300 with reference to FIG. 12 may be applied to the first variable lens 300a.

In particular, a plurality of electrodes may be disposed on the first substrate included in the first variable lens 300a so as to be spaced apart from one another.

In some implementations, the electrodes provided on the first substrate may be arranged so as to extend in the up-down direction. The number of electrodes provided on the first substrate may be greater than the number of electrodes provided on a third substrate. When the electrodes are arranged so as to extend in the up-down direction, an FOV in the left-right direction is widened. In an image acquired by the vehicle camera 200, information in the left-right direction may be more useful than information in the up-down direction. When the number of electrodes provided on the third substrate is greater than the number of electrodes provided on the first substrate, a greater number of pieces of information may be acquired in the up-down direction than that in the left-right direction.

In some implementations, the electrodes provided on the first substrate may be arranged so as to extend in the left-right direction.

The second variable lens 300b may include a second liquid crystal layer, and may change light to be introduced to the image sensor 214 based on the arrangement of liquid crystal molecules included in the second liquid crystal layer, which depends on the voltage applied thereto. The second variable lens 300b may be located at the front side of the image sensor 214. The second variable lens 300a may change the light introduced through the first variable lens 300a.

The second variable lens 300b may include a third substrate, a fourth substrate, and the second liquid crystal layer.

The description given in relation to the variable lens 300 with reference to FIG. 12 may be applied to the second variable lens 300b.

In particular, a plurality of electrodes may be disposed on the third substrate included in the second variable lens 300b so as to be spaced apart from one another.

In some implementations, the electrodes provided on the third substrate may be arranged so as to extend in the left-right direction.

In some implementations, the electrodes provided on the third substrate may be arranged so as to extend in the up-down direction. The number of electrodes provided on the third substrate may be greater than the number of electrodes provided on the first substrate. When the electrodes are arranged so as to extend in the up-down direction, an FOV in the left-right direction is widened. In an image acquired by the vehicle camera 200, information in the left-right direction may be more useful than information in the up-down direction. When the number of electrodes provided on the third substrate is greater than the number of electrodes provided on the first substrate, a greater number of pieces of information may be acquired in the up-down direction than that in the left-right direction.

The image sensor 214 may receive the light introduced through the first variable lens 300a and the second variable lens 300b.

Figure 19:
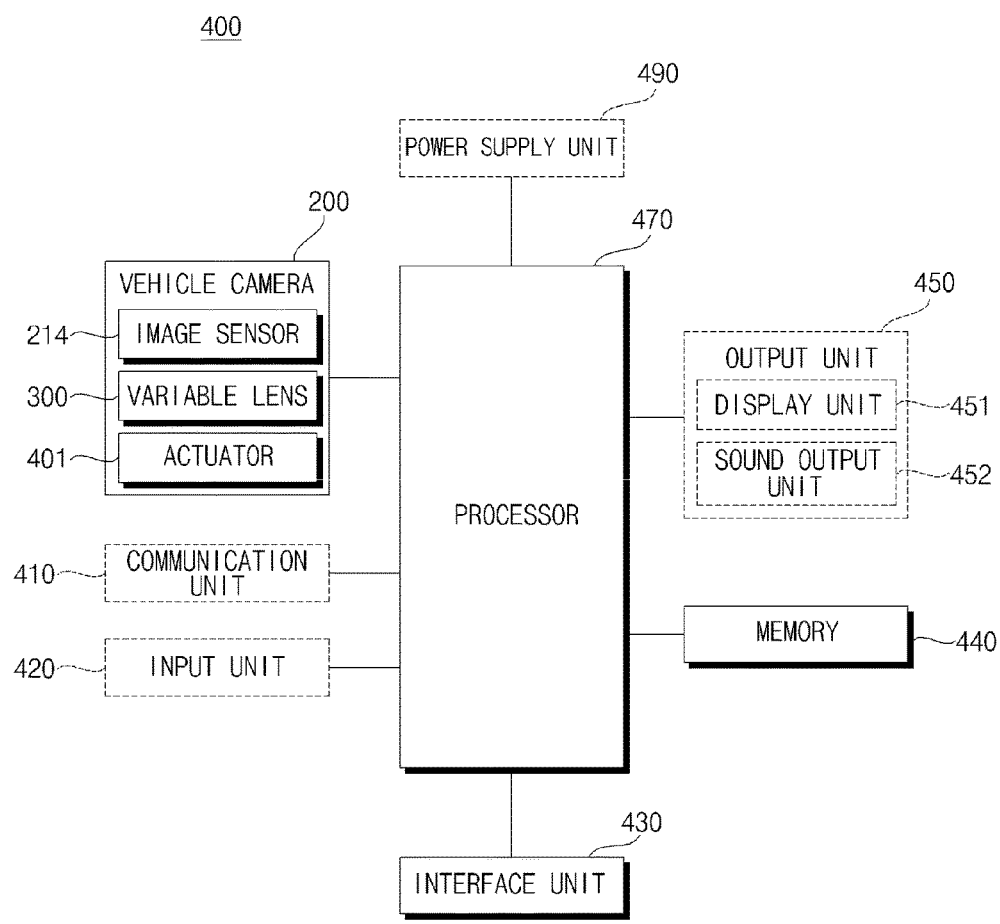
FIG. 19 is a diagram illustrating an example of a driver assistance apparatus 400 in accordance with an implementation.

FIG. 19 is a block diagram of the driver assistance apparatus 400 in accordance with an implementation.

Referring to FIG. 19, the driver assistance apparatus 400 may include the vehicle camera 200, the processor 470, an interface unit 430, and the memory 440.

In some implementations, the driver assistance apparatus 400 may further include a communication unit 410, an input unit 420, an output unit 450, and a power supply unit 490 individually or in combinations thereof.

In some implementations, unlike the illustration of FIG. 19, the processor 470, the interface unit 430, and the memory 440 may be sub-components of the camera 200. In this case, the vehicle camera 200 may function as the driver assistance apparatus 400.

The vehicle camera 200 may be mounted on a portion of the vehicle 100 and may acquire an image of the view outside or inside the vehicle 100.

For example, the vehicle camera 200 may be located in the passenger compartment of the vehicle 100 so as to be close to the front windshield 10 in order to acquire an image of the view in front of the vehicle 100. Alternatively, the vehicle camera 200 may be located near a front bumper or a radiator grill.

For example, the vehicle camera 200 may be located in the passenger compartment of the vehicle 100 so as to be close to a rear windshield in order to acquire an image of the view at the rear of the vehicle 100. Alternatively, the vehicle camera 200 may be located near a rear bumper, a trunk, or a tail gate.

For example, the vehicle camera 200 may be located in the passenger compartment of the vehicle 100 so as to be close to at least one side window in order to acquire an image of the view at the lateral side of the vehicle 100. Alternatively, the vehicle camera 200 may be located near a side mirror, a fender, or a door.

For example, the vehicle camera 200 may be located in the passenger compartment of the vehicle 100 on the front windshield 10, a dashboard, a cockpit module, or a rear windshield so as to face the passenger compartment in order to acquire an image of the passenger compartment of the vehicle 100.

The vehicle camera 200 may include the image sensor 214, the variable lens 300, and the actuator 401.

The image sensor 214 has been described above with reference to FIGS. 1 to 19.

The variable lens 300 may change light to be introduced to the image sensor 214. As such, the variable lens 300 may change the focal distance of the camera 200 by changing the light to be introduced to the image sensor 214.

In some implementations, the variable lens 300 may include liquid crystals. The variable lens 300 may change the light to be introduced to the image sensor 214 based on the arrangement of liquid crystals. For example, the variable lens 300 may change the focal distance by changing the path of light to be introduced to the image sensor 214 by way of the variable lens 300.

The variable lens 300 may be controlled by the processor 470. For example, the variable lens 300 may be controlled by the processor 470 to change the focal distance of the camera 200 based on various types of information regarding the driving state of the vehicle. As such, the driver assistance apparatus may variably control the focal distance of the camera 200 to adapt to different driving conditions, thereby providing appropriate views of the vehicle surroundings based on the particular driving condition.

The variable lens 300 has been described above with reference to FIGS. 1 to 19.

The actuator 401 may provide drive power to move the variable lens 300 or the image sensor 214. The actuator 401 may include a motor.

The actuator 401 may provide drive power for the slidable movement or rotatable movement of the variable lens 300. The drive power generated in the actuator 401 may be provided to the variable lens 300 through a drive power transmission unit.

For example, the variable lens 300 may be slidably moved in the left-right direction (or the overall width direction), in the front-rear direction (or the overall length direction), and in the up-down direction (or the overall height direction) upon receiving the drive power from the actuator 401.

For example, the variable lens 300 may be rotatably moved upon receiving the drive power from the actuator 401.

In some implementations, the actuator 401 may provide drive power for the slidable movement of the image sensor 214. The drive power generated in the actuator 401 may be provided to the image sensor 214 through a drive power transmission unit.

For example, the image sensor 214 may be slidably moved in the front-rear direction (or the overall length direction) upon receiving the drive power from the actuator 401.

In some implementations, the vehicle camera 200 may be a stereo camera (e.g., stereo camera 200b in FIGS. 6 to 8).

When the vehicle camera 200 is the stereo camera 200b, the vehicle camera 200 may include a first camera, a second camera, and the processor 470.

The first camera may acquire a first image.

The first camera may include a first image sensor (e.g., first image sensor 214a in FIGS. 6 to 8), and a left variable lens (e.g., left variable lens 300L in FIGS. 6 to 8).

The left variable lens 300L may include a first liquid crystal layer, and may change light to be introduced to the first image sensor 214a based on the arrangement of liquid crystal molecules included in the first liquid layer, which depends on the voltage applied thereto. The left variable lens 300L may be referred to as a first variable lens.

The second camera may acquire a second image.

The second camera may include a second image sensor (e.g., second image sensor 214b in FIGS. 6 to 8), and a right variable lens (e.g., right variable lens 300R in FIGS. 6 to 8).

The right variable lens 300R may include a second liquid crystal layer, and may change light to be introduced to the second image sensor 214b based on the arrangement of liquid crystal molecules included in the first liquid layer, which depends on the voltage applied thereto. The right variable lens 300R may be referred to as a second variable lens.

The interface unit 430 may receive various signals, information, or data. The interface unit 430 may transmit signals, information, or data processed or produced in the processor 470.

To this end, the interface unit 430 may perform data communication with, for example, the controller 170 inside the vehicle 100, the vehicle display device 141, the sensing unit 125, and the vehicle drive unit 150 in a wired or wireless communication manner.

The interface unit 430 may receive driving information. Here, the driving information may include speed information, vehicle steering information, turn-signal information, and predetermined path information.

The interface unit 430 may receive sensor information from the controller 170 or the sensing unit 125.

Here, the sensor information may include at least one selected from among vehicle travel direction information, vehicle location information (GPS information), vehicle angle information, vehicle speed information, vehicle steering information, vehicle acceleration information, vehicle tilt information, vehicle forward/reverse movement information, battery information, fuel information, tire information, vehicle lamp information (e.g. turn-signal information), vehicle interior temperature information, vehicle interior humidity information, and information regarding whether it rains.

The sensor information may be acquired from, for example, a heading sensor, a yaw sensor, a gyro sensor, a position module, a vehicle forward/reverse movement sensor, a wheel sensor, a vehicle speed sensor, a steering angle sensor, a vehicle body gradient sensor, a battery sensor, a fuel sensor, a tire sensor, a steering sensor based on the rotation of a steering wheel, a vehicle interior temperature sensor, a vehicle interior humidity sensor, and a rain sensor. In some implementations, the position module may include a GPS module for receiving GPS information.

The interface unit 430 may receive navigation information via data communication with the controller 170, the vehicle display device 141, or a separate navigation apparatus. Here, the navigation information may include set destination information, destination based routing information, map information related to vehicle driving, and vehicle's current location information. For example, the navigation information may include information regarding a vehicle's location on a road.

The interface unit 430 may provide the controller 170 or the vehicle drive unit 150 with a signal. Here, the signal may be a control signal.

For example, the interface unit 430 may perform communication with the power source drive unit 151 for controlling a power source. The interface unit 430 may provide the power source drive unit 151 with a signal produced in the processor 470.

For example, the interface unit 430 may perform communication with the brake drive unit 153 for controlling a brake. The interface unit 430 may provide the brake drive unit 153 with a signal produced in the processor 470.

For example, the interface unit 430 may perform communication with the steering drive unit 152 for controlling a steering apparatus. The interface unit 430 may provide the steering drive unit 152 with a signal produced in the processor 470.

The memory 130 may store various data for the overall operation of the driver assistance apparatus 400, such as programs for the processing or control of the processor 470.

The memory 440 may be any one of various hardware storage devices, such as a ROM, a RAM, an EPROM, a flash drive, and a hard drive. In some implementations, the memory 440 may be a sub-component of the processor 470.

The processor 470 may be electrically connected to each unit of the driver assistance apparatus 400.

The processor 470 may control the overall operation of each unit included in the driver assistance apparatus 400.

The processor 470 may process an image acquired via the vehicle camera 200.

The processor 470 may control the drive unit (e.g., first drive unit 1310 in FIG. 13) included in the variable lens 300, and thus control the arrangement of liquid crystal molecules (e.g., liquid crystal molecules 1231 in FIG. 12) included in the liquid crystal layer (e.g., liquid crystal layer 1230 in FIG. 12), thereby changing the focal distance of the variable lens 300.

As described further below, the processor 470 may receive various types of information and change the focal distance of the variable lens 300 based on the received information.

For example, the processor 470 may receive driving information via the interface unit 430. The processor 470 may change the focal distance of the variable lens 300 based on the received driving information.

The driving information may include driving speed information. The processor 470 may receive driving speed information from the controller (e.g., controller 170 in FIG. 2) or the sensing unit (e.g., sensing unit 125 in FIG. 2) of the vehicle 100 via the interface unit 430. The sensing unit (e.g., sensing unit 125 in FIG. 2) may include a vehicle speed sensor.

As a particular example, the processor 470 may change the focal distance of the variable lens 300 based on driving speed information.

The processor 470 may gradually increase the focal distance of the variable lens 300 as the driving speed is gradually increased. When the focal distance is gradually increased, the FOV of the vehicle camera 200 is gradually reduced, thus becoming suitable for remote image capture. In this case, the vehicle camera 200 may serve as a telephoto camera. When a driver drives the vehicle 100 by focusing at a long distance, rather than a short distance, as the driving speed is gradually increased, the driver may appropriately respond to an occurring situation.

The processor 470 may gradually reduce the focal distance of the variable lens 300 as the driving speed is gradually reduced. When the focal distance is gradually reduced, the FOV of the vehicle camera 200 is gradually increased, thus becoming suitable for short-distance image capture. In this case, the vehicle camera 200 may serve as a wide-angle camera. When a driver drives the vehicle 100 by focusing at a short distance with an increased FOV, rather than a long distance, as the driving speed is gradually reduced, the driver may appropriately respond to an occurring situation.

As another example, the processor 470 may receive vehicle steering information or turn-signal information via the interface unit 430. The processor 470 may change the focal distance of the variable lens 300 based on the received steering information or turn-signal information.

The driving information may include vehicle steering information or turn-signal information. The processor 470 may receive the vehicle steering information or turn-signal information from the controller (e.g., controller 170 in FIG. 2) or the sensing unit (e.g., sensing unit 125 in FIG. 2) of the vehicle 100 via the interface unit 430.

In some implementations, the sensing unit (e.g., sensing unit 125 in FIG. 2) may include a steering sensor. When steering is input via a steering apparatus, the steering sensor may produce steering information. The processor 470 may receive the produced steering information via the interface unit 430.

In some implementations, when a turn-signal input is received via a turn-signal input apparatus, the processor 470 may receive turn-signal information via the interface unit 430.

The processor 470 may reduce the focal distance of the variable lens 300 when a steering value of a reference value or more to the left side or the right side of the direction of travel is received as steering information.

Pedestrian collision accidents occur at a high frequency when the vehicle 100 turns to the left or to the right. This is because the driver has difficulty in acquiring many pieces of information within a short time after being confronted with a new environment when the vehicle 100 turns to the left or to the right. In such a situation, the vehicle camera 200 may be used as a wide-angle camera by reducing the focal distance of the variable lens 300 and increasing the FOV of the vehicle camera 200. When the vehicle camera 200 is used as such a wide-angle camera, it is possible to acquire information regarding a greater number of objects that are located a short distance away and to prevent the occurrence of accidents.

As another example, the processor 470 may receive a predetermined path information of the vehicle 100 via the interface unit 430. The processor 470 may change the focal distance of the variable lens 300 based on the received path information.

The driving information may include, for example, predetermined path information of the vehicle 100. The processor 470 may receive predetermined path information of the vehicle 100 from the vehicle display device 141 or a separate navigation apparatus via the interface unit 430.

In some implementations, the driving speed, acceleration, or deceleration of the vehicle 100 may be controlled based on the predetermined path information. For example, when the vehicle 100 is an autonomous vehicle, the vehicle 100 may be driven based on the predetermined path information. The processor 470 may change the focal distance of the variable lens 300 based on the predetermined path information, thereby acquiring information suitable for the driving of the vehicle 100 and providing the vehicle 100 or the driver with the acquired information.

As another example, the processor 470 may receive V2X information via the interface unit 430. The processor 470 may change the focal distance of the variable lens 300 based on the V2X information.

The V2X information may be information regarding the situation around the vehicle 100 received via the V2X communication module 116. The driving speed, acceleration, or deceleration of the vehicle 100 may be controlled based on the V2X information. In particular, when the vehicle 100 is an autonomous vehicle, the vehicle 100 may be driven based on the V2X information. The processor 470 may change the focal distance of the variable lens 300 based on the V2X information, thereby acquiring information suitable for the driving of the vehicle 100 and providing the vehicle 100 or the driver with the acquired information.

The processor 470 may receive an input signal via the input unit 420. The processor 470 may change the focal distance of the variable lens 300 based on the received input signal.

As another example, the processor 470 may control the Power-On/Off of an ADAS based on the input signal received via the input unit 420. The processor 470 may change the focal distance of the variable lens 300 so as to suit the ADAS, which is in the On state based on the input signal.

The Advanced Driver Assistance System (ADAS) may include an Autonomous Emergency Braking (AEB) system, an Adaptive Cruise Control (ACC) system, a Cross Traffic Alert (CTA) system, a Lane Change Assistant (LCA) system, a Forward Collision Warning (FCW) system, a Lane Departure Warning (LDW) system, a Lane Keeping Assistant (LKA) system, a Speed Assistant System (SAS), a Traffic Sign Recognition (TSR) system, a High Beam Assistant (HBA) system, a Blind Spot Detection (BSD) system, an Autonomous Emergency Steering (AES) system, a Curve Speed Warning System (CSWS), a Smart Parking Assistant System (SPAS), a Traffic Jam Assistant (TJA) system, and an Around View Monitoring (AVM) system.

For example, the ACC system, SAS, and CSWS may utilize information regarding an object that is located a relatively long distance away. The processor 470 may increase the focal distance of the variable lens 300 upon receiving an input signal for turning on the ACC system, SAS system, or the CSWS.

For example, the CTA, AEB, FCW, TSR, HBA, BSD, AES, and TJA systems may utilize information regarding an object that is located a relatively long distance away. The processor 470 may reduce the focal distance of the variable lens 300 upon receiving an input signal for turning on the CTA, AEB, FCW, TSR, HBA, BSD, AES, or TJA system.

As another example, the processor 470 may detect an object from an image acquired via the vehicle camera 200. The object that is detected may include a wide range of objects, including but not limited to vehicles and persons as well as, more generally, roadways and intersections and other configurations of the surrounding environment around the vehicle. The processor 470 may change the focal distance of the variable lens 300 based on the detected object.

As a specific example, the processor 470 may change the focal distance of the variable lens 300 based on the distance to the object or the position of the object.

The processor 470 may change the focal distance of the camera 200 so as to capture an appropriate image of an object 2925 based on the distance to or position of the object.

The processor 470 may calculate the distance to the object based on the acquired image. An operation of calculating the distance to the object will be described below with reference to FIGS. 20A to 20C.

The processor 470 may calculate the position of the object based on the acquired image. For example, the processor 470 may calculate the position of the object relative to the vehicle 100 based on pixels corresponding to the position of the object in the image.

The processor 470 may gradually increase the focal distance of the variable lens 300 as the distance to the object is gradually increased.

The processor 470 may detect an object and track the detected object. When the distance to the object is gradually increased, the processor 470 may gradually increase the focal distance of the variable lens 300 for object tracking. Thereby, the processor 470 may maintain object tracking by adjusting the focal distance of the variable lens 300.

The processor 470 may gradually reduce the focal distance of the variable lens 300 as the distance to the object is gradually reduced.

The processor 470 may detect an object and track the detected object. When the distance to the object is gradually reduced, the processor 470 may gradually reduce the focal distance of the variable lens 300 for object tracking. Thereby, the processor 470 may maintain object tracking by adjusting the focal distance of the variable lens 300.

The processor 470 may, based on object position information, alter the focal distance of the variable lens 300 to thereby change the Region of Interest (ROI) of an image.

For example, when an object is detected in an image, the processor 470 may change the ROI of the image so as to clearly display the detected object. For example, the processor 470 may adjust the focal distance of the variable lens 300 so that the detected object is focused on.

The processor 470 may adjust the distance between the variable lens 300 and the image sensor 214 by controlling the actuator 401 so as to correspond to the changed focal distance of the variable lens 300.

For example, when the focal distance of the variable lens 300 is increased, the processor 470 may move the variable lens 300 in the front-rear direction (or in the overall length direction) by controlling the actuator 401, thereby controlling the distance between the variable lens 300 and the image sensor 214 so as to be increased.

For example, when the focal distance of the variable lens 300 is reduced, the processor 470 may move the variable lens 300 in the front-rear direction (or in the overall length direction) by controlling the actuator 401, thereby controlling the distance between the variable lens 300 and the image sensor 214 so as to be reduced.

In some implementations, the processor 470 may adjust the distance between the variable lens 300 and the image sensor 214 by moving the image sensor 214.

The adjustment of the distance between the variable lens 300 and the image sensor 214 may prevent the blurring of an image.

As another example, the processor 470 may detect an intersection as an object. When the intersection is detected as an object, the processor 470 may reduce the focal distance of the variable lens 300 based on the detected intersection.

When the vehicle 100 is passing through an intersection, the driver may be wary about an object (e.g. another vehicle) that is located in the direction crossing the direction of travel of the vehicle 100. In such scenarios, for example at the intersection, an image having an increased FOV may be acquired in order to detect, for example, a vehicle or a pedestrian that violates a traffic signal.

Therefore, in some implementations, upon detection of an intersection as described above, the driver assistance apparatus may be configured to reduce the focal distance of the variable lens 300 to acquire an image having an increased FOV and detect an object within a wider range. This may help prevent an accident at the intersection by providing a better view of the relevant portions of the surroundings of the vehicle.

When the vehicle camera 200 is the stereo camera 200*b*, the vehicle camera 200 may include a first camera, a second camera, and the processor 470.

The processor 470 may change the focal distance of the left variable lens 300L by controlling the arrangement of liquid crystal molecules included in the first liquid crystal layer. In addition, the processor 470 may change the focal distance of the right variable lens 300R by controlling the arrangement of liquid crystal molecules included in the second liquid crystal layer.

The processor 470 may change the focal distance of the left variable lens 300L and the focal distance of the right variable lens 300R in different manners. In some implementations, the processor 470 may coordinate the changing of the focal distance of the left variable lens 300L with the changing the focal distance of the right variable lens 300R.

For example, the processor 470 may increase the focal distance of the left variable lens 300L, thereby allowing the first camera to be used as a long-distance camera. In addition, the processor 470 may reduce the focal distance of the right variable lens 300R, thereby allowing the second camera to be used as a short-distance camera.

The processor 470 may process a first image acquired via the first camera, and may process a second image acquired via the second camera. The focal distances of the first camera and the second camera may differ from each other.

The processor 470 may perform process binning on the first image. The processor 470 may perform cropping on the second image.

The processor 470 may acquire a stereo image based on the binned first image and the cropped second image.

The processor 470 may perform disparity calculation based on the acquired stereo image.

The processor 470 may detect an object based on the first image. The processor 470 may change the focal distance of the left variable lens 300L or the right variable lens 300R based on the detected object. For example, the processor 470 may change the focal distances of the left variable lens 300L and the right variable lens 300R so as to coincide with each other so that the object is focused on.

The processor 470 may acquire a stereo image based on a first image and a second image, which are acquired after the focal distances are changed.

The communication unit 410 may exchange data with another device located inside or outside the vehicle 100 in a wireless manner. Here, the other device may be a mobile terminal, a server, or another vehicle.

For example, the communication unit 410 may exchange data with a mobile terminal of the driver in a wireless manner. Various wireless data communication protocols, such as Bluetooth, Wi-Fi, Wi-Fi direct, APiX, and NFC, may be used.

For example, the communication unit 410 may receive weather information and road traffic state information, such as Transport Protocol Expert Group (TPEG) information, from the mobile terminal or the server.

When a user enters the vehicle 100, the mobile terminal of the user may pair with the driver assistance apparatus 400 automatically or as the user executes an application.

The communication unit 410 may receive traffic light change information from an external server. Here, the external server may be a server located in a traffic control center.

The input unit 420 may receive user input. The input unit 420 may include a mechanical input device, a touch input device, a voice input device, or a wireless input device.

The mechanical input device may include, for example, a button, a jog-wheel, or a switch.

The touch input device may include at least one touch sensor. The touch input device may be configured as a touchscreen.

The voice input device may include a microphone for converting the user's voice into electrical signals.

The wireless input device may receive wireless user input via a key from the outside of the vehicle 100.

The input unit 420 may receive user input for opening or closing a door included in the vehicle 100.

The output unit 450 may output data or information processed in the processor 470 under the control of the processor 470.

The output unit 450 may include a display unit 451 and a sound output unit 452.

The display unit 451 may display information processed in the processor 470. The display unit 451 may display an image related to the operation of the driver assistance apparatus 400. For the display of the image, the display unit 451 may include a cluster or a Head Up Display (HUD) provided on the inner front surface of the vehicle 100. In scenarios where the display unit 451 is the HUD, the display unit 451 may include a projector module for projecting an image to the front windshield 10 or a combiner.

The sound output unit 452 may output sound to the outside based on an audio signal processed in the processor 470. To this end, the sound output unit 452 may include at least one speaker.

The power supply unit 490 may supply power required to operate the respective components under the control of the processor 470. The power supply unit 490 may receive power from, for example, a battery inside the vehicle 100.

Figure 20A:
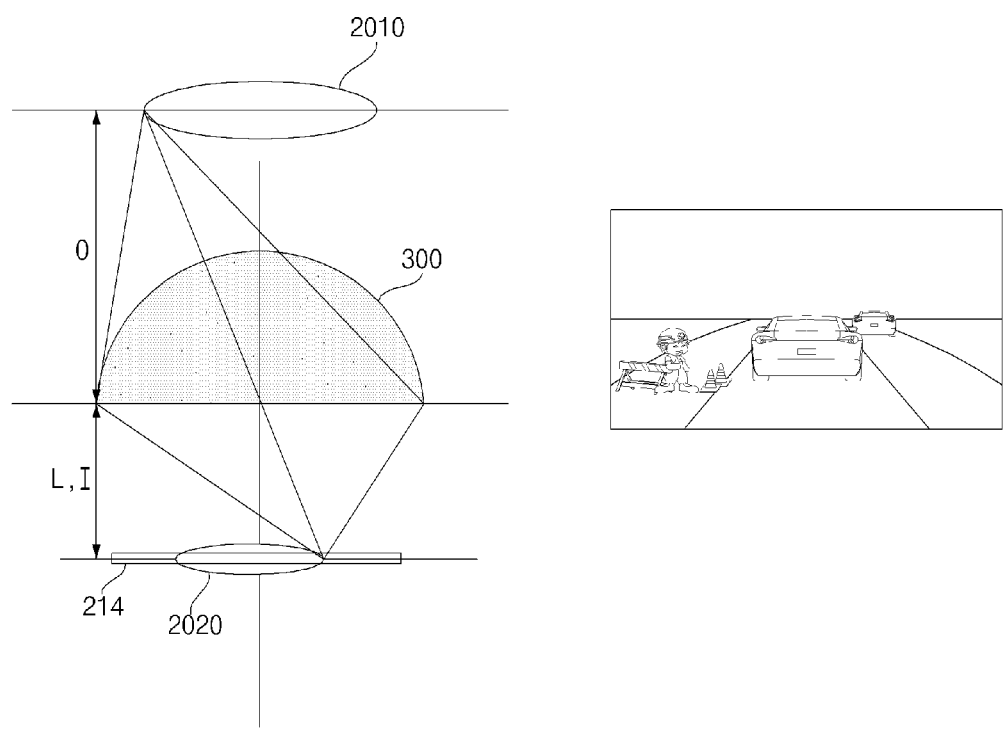
FIGS. 20A to 21 are diagrams illustrating examples of a variable lens and operations of calculating a distance to an object using the variable lens in accordance with an implementation.
Figure 20B:
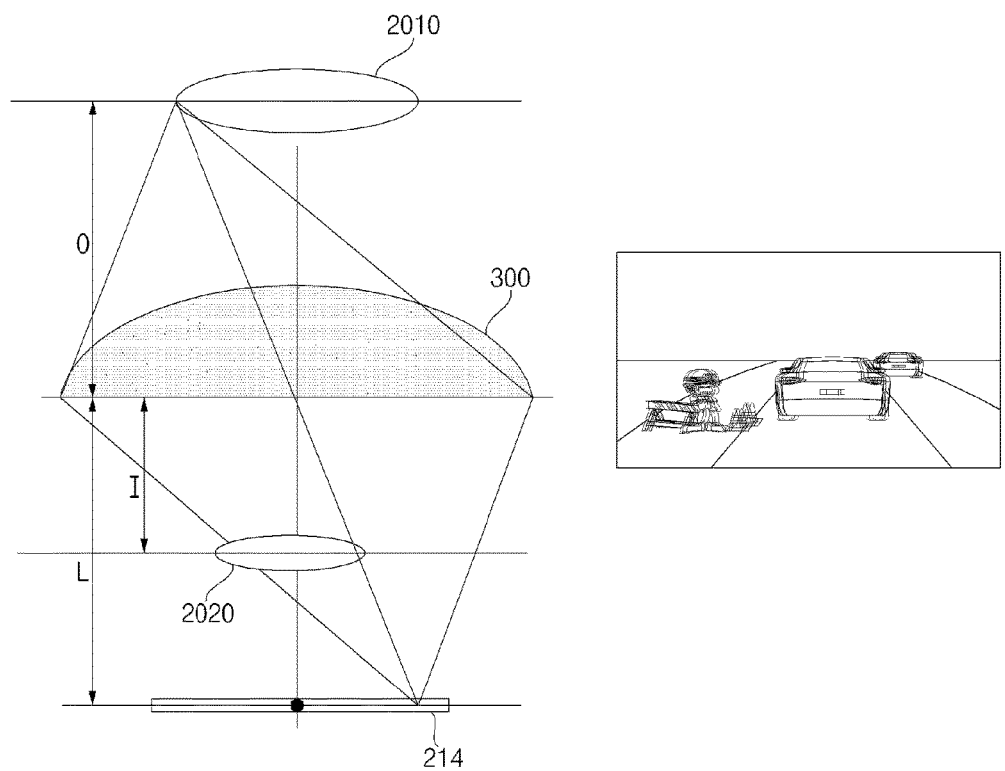
Figure 21:
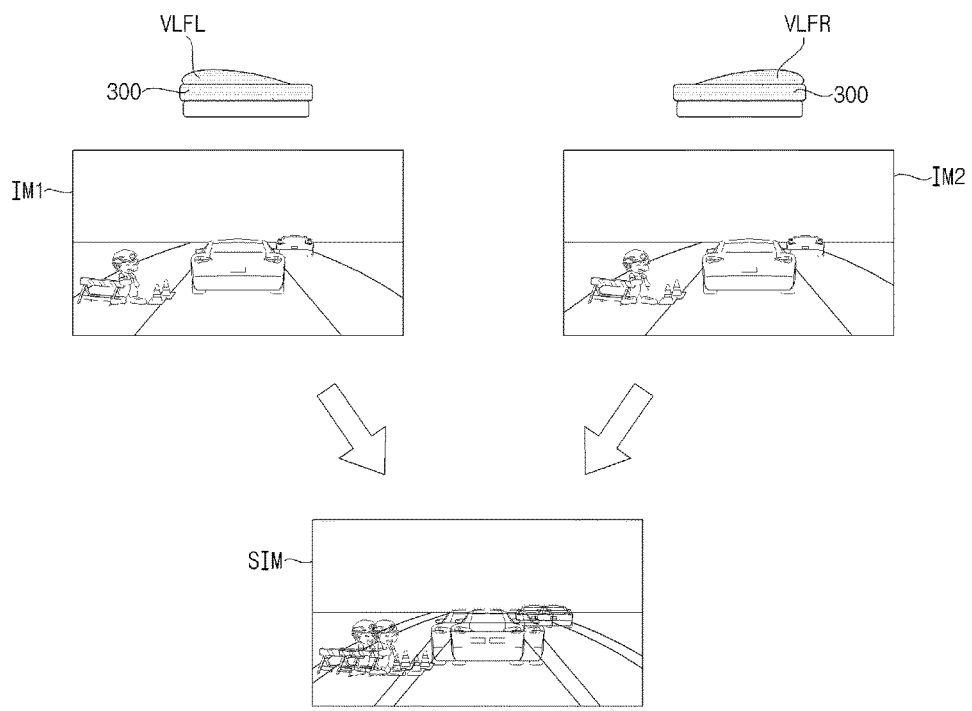

FIGS. 20A to 21 are schematic diagrams illustrating the variable lens in order to describe an operation of calculating the distance to an object using the variable lens in accordance with an implementation.

The processor 470 may detect an object from an image acquired via the vehicle camera 200. The processor 470 may track the object detected in the image by varying the focal distance of the variable lens 300 and analyzing resulting variations in the object in the image. As such, the processor 470 may calculate the distance to the object based on variation in the object, by varying the focal distance.

For example, the processor 470 may calculate the distance to the object based on a detected blurring of the object in the image as the focal distance of the variable lens 300 is changed.

For example, the processor 470 may calculate the distance to the object based on variation in the size of the object in the image as the focal distance of the variable lens 300 is changed.

For example, the processor 470 may acquire two images as the focal distance of the variable lens 300 is changed. The processor 470 may produce a stereo image based on the acquired two images. The processor 470 may perform disparity calculation based on the stereo image. The processor 470 may calculate the distance to the object based on disparity calculation.

FIG. 20A illustrates the case where the focal distance of the variable lens 300 is in the first state, and FIG. 20B illustrates the case where the focal distance of the variable lens 300 is in the second state. In particular, FIGS. 20A and 20B illustrate the case where the variable lens 300 is close to the image sensor 214.

Referring to FIG. 20A, the Gaussian lens formula may be applied to the variable lens 300.

$$1/L = 1/O + 1/I \qquad \text{Equation 1:}$$

Here, "L" is the distance to the variable lens 300 to the image sensor 214, "O" is the distance to the variable lens 300 to an object 2010, and "I" is the distance at which an image is formed via the variable lens 300.

The processor 470 may calculate the distance O from the variable lens 300 to the object 2010 based on the distance I at which the image is formed via the variable lens 300 and the distance L from the variable lens 300 to the image sensor 214. This distance detection method may be referred to as a pinhole model method.

Referring to FIG. 20B, when the focal distance of the variable lens 300 is changed under the control of the processor 470, the size of an object in an image acquired via the vehicle camera 200 may be changed.

In this case, the processor 470 may detect the distance to the object using the Gaussian lens formula and variation in the size of the object.

Because the processor 470 may calculate the distance I at which the image is formed via the variable lens 300 based on the size of the object, and may know the distance L between the variable lens 300 and the image sensor 214, the processor 470 may calculate the distance O between the variable lens 300 and the object 2010. Here, the distance between the variable lens 300 and the object 2010 may be defined as the distance between the vehicle 100 and the object 2010.

In some implementations, the processor 470 may calculate the distance to the object based on the blurring of the image based on the changed focal point of the variable lens 300.

In the state in which the focal distance of the variable lens 300 is tuned to suit the prescribed object 2010, the processor 470 may change the focal distance of the variable lens 300. In this case, blurring may occur at the rim of the object 2010 in the image acquired via the vehicle camera 200. Here, the blurring may have a Gaussian form.

The processor 470 may calculate the distance to the object based on the degree of blurring that depends on variation in the focal distance of the variable lens 300. For example, the processor 470 may calculate the distance to the object by measuring the extent of Gaussian blur.

FIG. 21 illustrates an operation of calculating the distance to the object using disparity.

Referring to FIG. 21, the processor 470 may change the focal distance of the variable lens 300 to take the first state VLFL. For example, the processor 470 may change the focal distance of the variable lens 300 so as to focus on the area to the left side based on the direction of travel of the vehicle at the first distance ahead of the vehicle.

The processor 470 may acquire a first image IM1 when the focal distance of the variable lens 300 is in the first state VLFL.

The processor 470 may change the focal distance of the variable lens 300 to take the second state VLFR. For example, the processor 470 may change the focal distance of the variable lens 300 so as to focus on the area to the right side, based on the direction of travel of the vehicle, at the first distance ahead of the vehicle.

The processor 470 may acquire a second image IM2 when the focal distance of the variable lens 300 is in the second state VLFR.

The processor 470 may acquire the first image IM1 and the second image IM2 within a very short time. For example, the processor 470 may acquire the first image IM1 and the second image IM2 at about the same time.

The processor 470 may produce a stereo image SIM based on the first image IM1 and the second image IM2. The processor 470 may perform disparity calculation based on the stereo image SIM. The processor 470 may detect the distance to the object based on disparity calculation.

Figure 22:
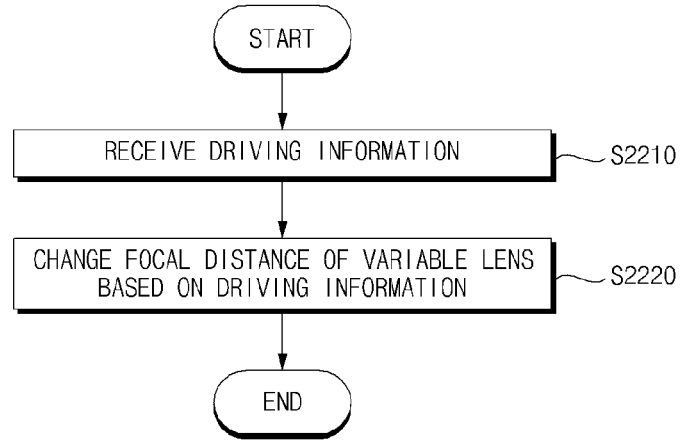
FIG. 22 is a flowchart illustrating an example of an operation of the driver assistance apparatus in accordance with an implementation.

FIG. 22 is a flowchart referenced to describe an operation of the driver assistance apparatus in accordance with an implementation.

Figure 23A:
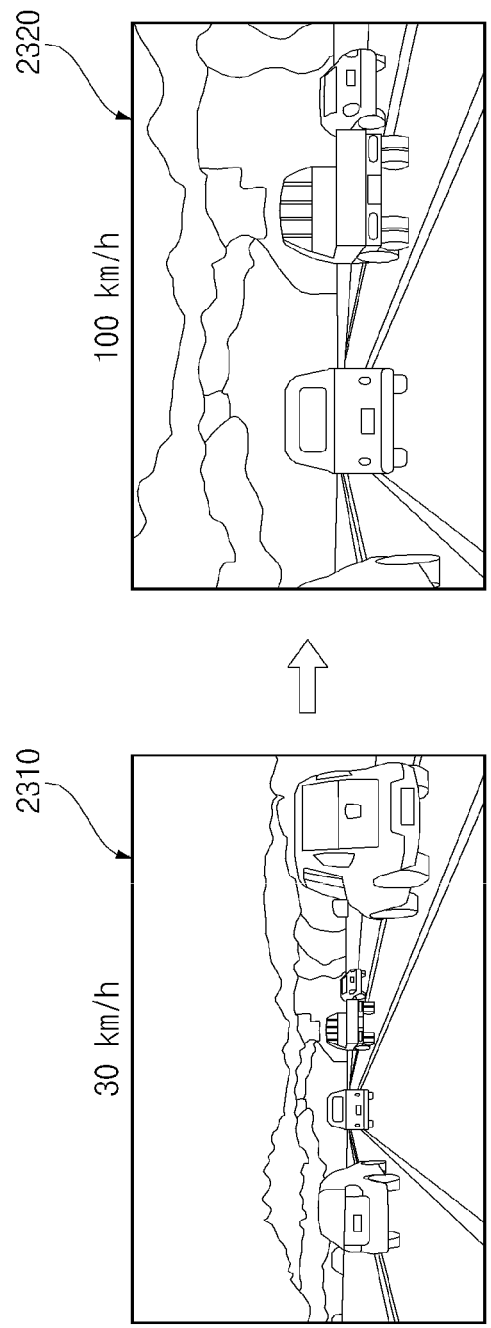
FIGS. 23A and 23B are diagrams illustrating examples of operations of changing the focal distance of the variable lens based on a driving speed in accordance with an implementation.
Figure 23B:
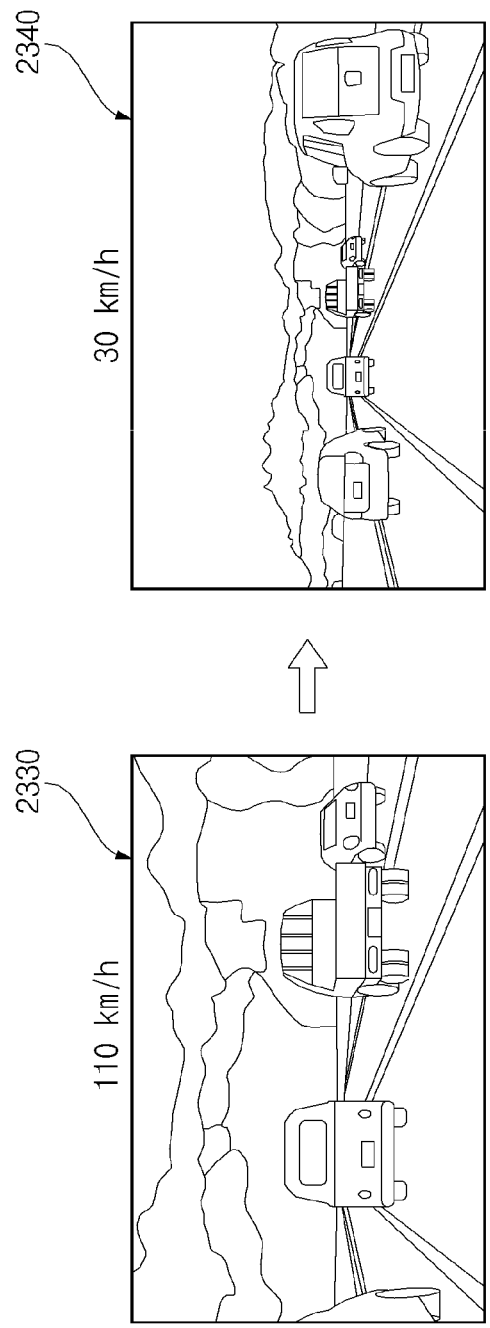

FIGS. 23A and 23B are views referenced to describe an operation of changing the focal distance of the variable lens based on a driving speed in accordance with an implementation.

FIG. 24 is a view referenced to describe an operation of changing the focal distance of the variable lens based on steering information or turn-signal information in accordance with an implementation.

FIG. 25 is a view referenced to describe an operation of changing the focal distance of the variable lens based on predetermined path information in accordance with an implementation.

Referring to FIG. 22, the processor 470 may receive driving information via the interface unit 430 (S2210).

The driving information may include driving speed information, steering information, turn-signal information, and predetermined path information.

The sensing unit 125 of the vehicle 100 may include a vehicle speed sensor. The vehicle speed sensor may produce driving speed information. The processor 470 may receive the driving speed information via the interface unit 430 from the controller (e.g., controller 170 in FIG. 2) or the sensing unit (e.g., sensing unit 125 in FIG. 2) of the vehicle.

The sensing unit 125 of the vehicle 100 may include a steering sensor. When steering is input via a steering apparatus, the steering sensor may produce steering information. The processor 470 may receive the steering information via the interface unit 430 from the controller (e.g., controller 170 in FIG. 2) or the sensing unit (e.g., sensing unit 125 in FIG. 2) of the vehicle.

The vehicle 100 may receive a turn-signal input via the input unit (e.g., input unit 420 in FIG. 19). The processor 470 may receive turn-signal information via the interface unit 430 from the input unit (e.g., input unit 420 in FIG. 19), the controller (e.g., controller 170 in FIG. 2), or the lamp drive unit (e.g., lamp drive unit 154 in FIG. 2) of the vehicle.

The processor 470 may receive predetermined path information of the vehicle via the interface unit 430 from the vehicle display device 141 or a navigation apparatus. The predetermined path information of the vehicle may be stored in a memory of the vehicle display device 141 or a memory of the navigation apparatus.

The processor 470 may change the focal distance of the variable lens 300 based on driving information (S2220).

The processor 470 may change the focal distance of the variable lens 300 based on a driving speed.

For example, the processor 470 may change the focal distance of the variable lens 300 in proportion to the driving speed.

For example, the processor 470 may change the focal distance of the variable lens 300 so as to correspond to variation in driving speed.

As exemplarily illustrated in FIG. 23A, the processor 470 may gradually increase the focal distance of the variable lens 300 as the driving speed is increased.

An image 2310 may be acquired via the vehicle camera 200 by changing the focal distance of the variable lens 300 based on the driving speed when the vehicle 100 drives at 30 km/h.

In addition, an image 2320 may be acquired via the vehicle camera 200 by changing the focal distance of the variable lens 300 based on the driving speed when the vehicle 100 drives at 110 km/h.

When the driving speed of the vehicle 100 is gradually increased from 30 km/h to 110 km/h, the processor 470 may gradually increase the focal distance of the variable lens 300 so as to correspond to variation in driving speed.

When the focal distance is increased, the vehicle camera 200 may detect an object that is located a long distance away, although the FOV thereof is reduced. Generally, in the case of high-speed driving, information regarding an object that is located a long distance away may be useful.

As exemplarily illustrated in FIG. 23B, the processor 470 may gradually reduce the focal distance of the variable lens 300 as the driving speed is gradually reduced.

An image 2330 may be acquired via the vehicle camera 200 by changing the focal distance of the variable lens 300 based on the driving speed when the vehicle 100 drives at 110 km/h.

In addition, an image 2340 may be acquired via the vehicle camera 200 by changing the focal distance of the variable lens 300 based on the driving speed when the vehicle 100 drives at 30 km/h.

When the driving speed of the vehicle 100 is gradually reduced from 110 km/h to 30 km/h, the processor 470 may gradually reduce the focal distance of the variable lens 300 so as to correspond to variation in driving speed.

When the focal distance is reduced, the vehicle camera 200 may be difficult to detect an object that is located a long distance away, but may have an increased FOV. Generally, in the case of low-speed driving, information regarding an object that is detected within an increased range may be useful.

The processor 470 may change the focal distance of the variable lens 300 based on steering information or turn-signal information.

The processor 470 may reduce the focal distance of the variable lens 300 when a steering value of a reference value or more to the left side or the right side of the direction of travel is received as steering information.

As exemplarily illustrated in FIG. 24, when the vehicle 100 turns to the left or to the right, detecting objects over a wide field of vision is required in order to prevent an accident. Because the driver is confronted with a new environment, which is different from an existing driving path, immediately after turned to the left or to the right at a low speed, a greater number of pieces of object information need to be provided within a short-distance range of the vehicle 100.

An image 2410 may be acquired via the vehicle camera 200 immediately before making a right turn.

An image 2420 may be acquired via the vehicle camera 200 by changing the focal distance of the variable lens 300 based on the steering information or the turn-signal information immediately after right turn.

When the vehicle 100 turns to the left or to the right, the processor 470 may reduce the focal distance of the variable lens 300.

The processor 470 may change the focal distance of the variable lens 300 based on predetermined path information.

The path information may include information regarding the high-speed driving path (e.g. expressway driving) or the low-speed driving path (e.g. city driving). The path information may include right-turn path information or left-turn path information of the vehicle 100.

The processor 470 may change the focal distance of the variable lens 300 based on the high-speed driving path, the low-speed driving path, the right-turn path or the left-turn path.

As exemplarily illustrated in FIG. 25, when the predetermined path information includes information regarding left-turn path 2505 or right-turn path and the vehicle 100 drives along the left-turn path 2505 or right-turn path, the processor 470 may reduce the focal distance of the variable lens 300.

An image 2510 may be acquired via the vehicle camera 200 immediately before the vehicle enters the left-turn path 2505 during driving based on the path information.

An image 2520 may be acquired via the vehicle camera 200 immediately after the vehicle enters the left-turn path 2505 during driving based on the path information.

Alternatively, when the vehicle 100 moves from the high-speed road to the low-speed road based on predetermined path information, the processor 470 may reduce the focal distance of the variable lens 300.

Alternatively, when the vehicle 100 moves from the low-speed road to the high-speed road based on predetermined path information, the processor 470 may increase the focal distance of the variable lens 300.

Alternatively, when the vehicle 100 enters a curve section based on predetermined path information, the processor 470 may reduce the focal distance of the variable lens 300 compared to in the case of straight section driving.

As described above, changing the focal distance of the variable lens 300 based on predetermined path information may provide the driver or the vehicle with information suitable for responding to the situation, thereby preventing an accident.

Figure 26:
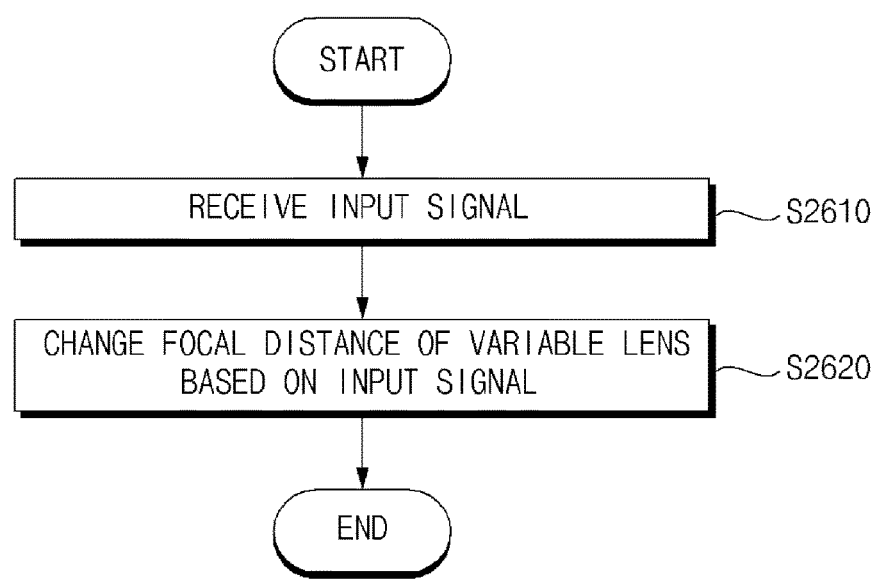
FIG. 26 is a flowchart illustrating an example of an operation of the driver assistance apparatus in accordance with an implementation.

FIG. 26 is a flowchart referenced to describe an operation of the driver assistance apparatus in accordance with an implementation.

FIG. 27 is a view referenced to describe an operation of changing the focal distance of the variable lens based on an input signal in accordance with an implementation.

Referring to FIG. 26, the processor 470 may receive an input signal via the input unit 420 (S2610).

The driver assistance apparatus 400 may provide various functions of an Advanced Driver Assistance System (ADAS). Some or all of the ADAS functions may be turned on or off in response to user input received via the input unit 420.

The processor 470 may change the focal distance of the variable lens 300 based on a received input signal (S2620).

As exemplarily illustrated in FIG. 27, the driver assistance apparatus 400 may include the input unit 420. The driver assistance apparatus 400 may receive an input to turn an ADAS function on or off via the input unit 420.

An image 2710 may be acquired via the vehicle camera 200 when the focal distance of the variable lens 300 is increased under the control of the processor 470, in the case where an input signal to turn an ACC, SAS or CSWS function on or off is received via the input unit 420.

An image 2720 may be acquired via the vehicle camera 200 when the focal distance of the variable lens 300 is reduced under the control of the processor 470, in the case where an input signal to turn a CTA, AEB, FCW, TSR, HBA, BSD, AES, or TJA function on or off is received via the input unit 420.

Figure 28:
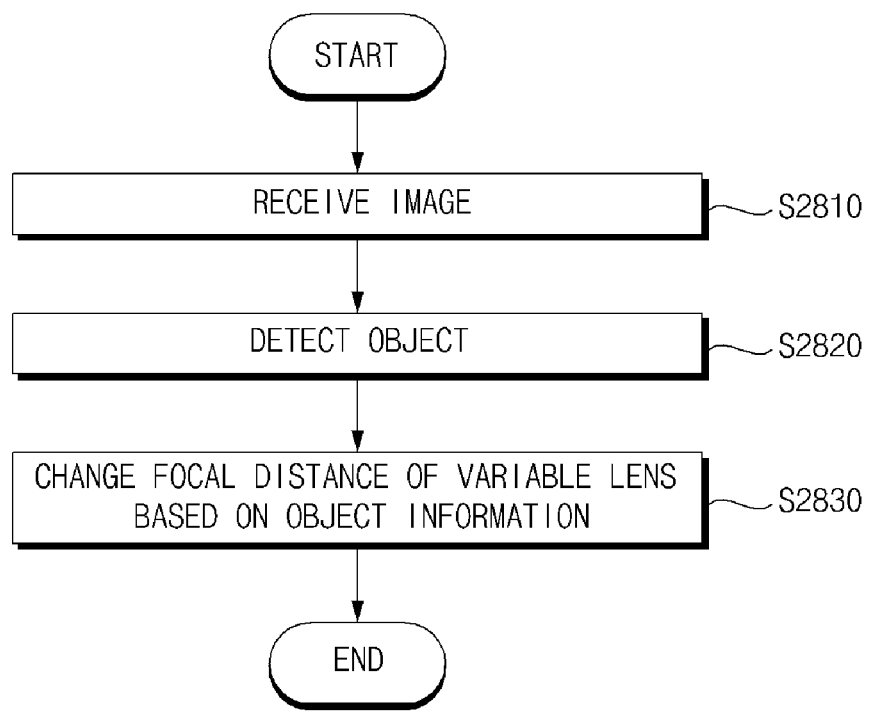
FIG. 28 is a flowchart illustrating an example of an operation of the driver assistance apparatus in accordance with an implementation.

FIG. 28 is a flowchart referenced to describe an operation of the driver assistance apparatus in accordance with an implementation.

Figure 29:
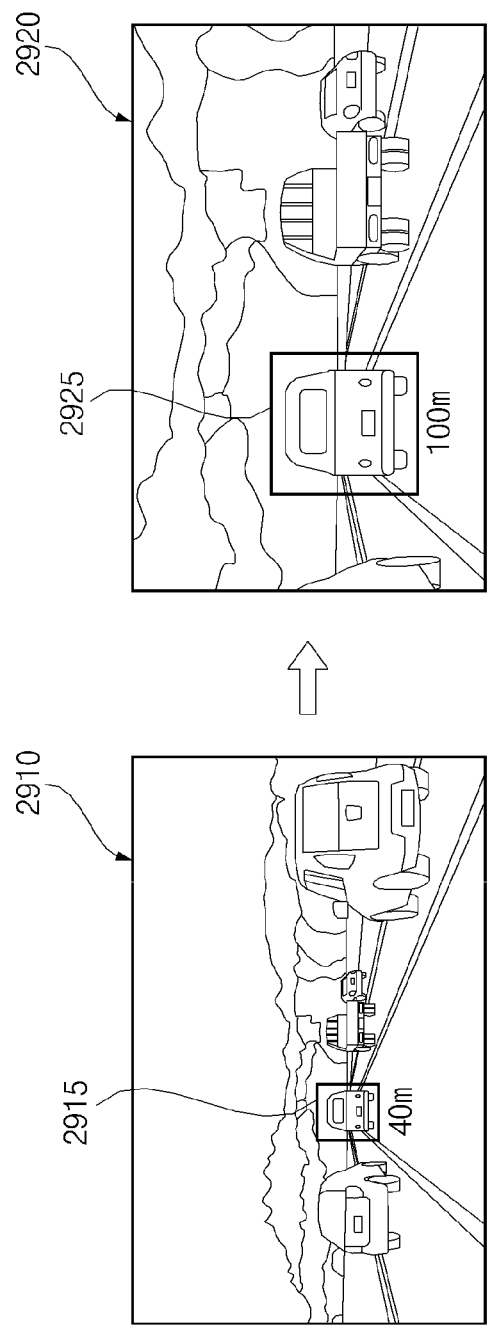
FIG. 29 is a diagram illustrating an example of an operation of changing the focal distance of the variable lens based on a distance to an object in accordance with an implementation.

FIG. 29 is a view referenced to describe an operation of changing the focal distance of the variable lens based on a distance to an object in accordance with an implementation.

Figure 30:
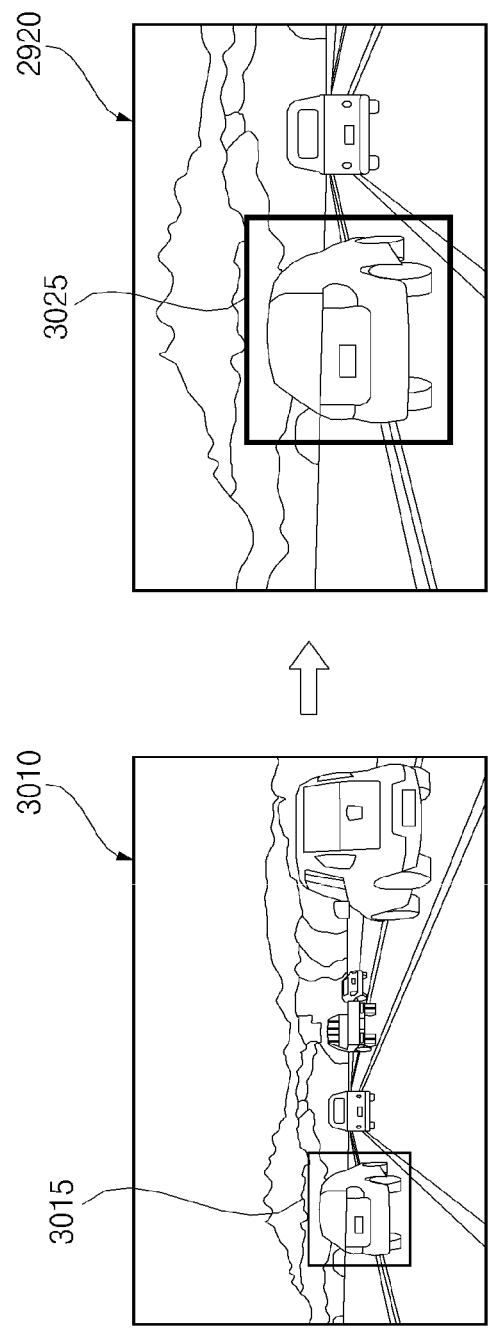
FIG. 30 is a diagram illustrating an example of an operation of changing the focal distance of the variable lens based on the position of the object in accordance with an implementation.

FIG. 30 is a view referenced to describe an operation of changing the focal distance of the variable lens based on the position of the object in accordance with an implementation.

FIG. 31 is a view referenced to describe an operation of changing the focal distance of the variable lens when the intersection is detected as the object in accordance with an implementation.

Referring to FIG. 28, the processor 470 may receive an image captured via the vehicle camera 200 (S2810). Here, the image may be an image captured via a mono camera or an image captured via a stereo camera.

The processor 470 may detect an object based on the received image (S2820). The processor 470 may perform object detection, such as lane detection, vehicle detection, pedestrian detection, bright-spot detection, traffic sign recognition, or road surface detection.

For example, another vehicle may be a preceding vehicle, a following vehicle, a vehicle being driven in the neighboring lane, a vehicle that has been involved in an accident, or an ACC follow-up vehicle.

The processor 470 may change the focal distance of the variable lens 300 based on the detected object (S2830).

The processor 470 may change the focal distance of the variable lens 300 based on the distance to the object or the position of the object.

The processor 470 may calculate the distance to the object detected based on the acquired image. The processor 470 may calculate the distance via the method described with reference to FIGS. 20A to 21. When the image is an image captured via a stereo camera, the processor 470 may calculate the distance to the object via disparity calculation.

As exemplarily illustrated in FIG. 29, the processor 470 may gradually increase the focal distance of the variable lens 300 as the distance to the object is gradually increased.

An image 2910 may be captured via the vehicle camera 200 in the first focal distance state of the variable lens 300. The processor 470 may detect an object 2915 from the image. The processor 470 may calculate the distance to the object 2915. In FIG. 29, the distance to the object 2915 is assumed to be 40 m.

An image 2920 may be captured via the vehicle camera 200 in the state in which the distance to a detected object 2925 is increased to 100 m. In this case, the processor 470 may gradually increase the focal distance of the variable lens 300. The processor 470 may change the focal distance so that an image is captured about the object 2925.

Because the distance to the object 2925 is increased, the processor 470 may increase the focal distance of the variable lens 300. As such, although the FOV of the vehicle camera 200 is reduced, capturing an image of a remote object is possible.

The processor 470 may gradually reduce the focal distance of the variable lens 300 as the distance to the object is gradually reduced.

The processor 470 may calculate the position of the object detected based on the acquired image. For example, the processor 470 may calculate the position of the object relative to the vehicle 100 based on pixels corresponding to the position of the image in the image.

As exemplarily illustrated in FIG. 30, the processor 470 may control the variable lens 300 so that the ROI of the image is changed based on the position of the object.

An image 3010 may be captured via the vehicle camera 200 in the first focal distance state of the variable lens 300. The processor 470 may detect an object 3015 from an image. The processor 470 may calculate the position of the object 3015.

An image 2920 may be captured via the vehicle camera 200 in the state in which the ROI of the image is changed about an object 3025. The processor 470 may change the ROI of the image so that the object 3025 is centered on the image by controlling a voltage applied to the variable lens 300.

As described above, changing the ROI of the image may accurately provide the vehicle or the driver with required information.

As exemplarily illustrated in FIG. 31, the processor 470 may detect an intersection 3100 as an object.

The processor 470 may detect the intersection 3100 via the detection of a signal light 3105 that is located at the intersection. The processor 470 may detect the intersection 3100 via the detection of an intersection directional sign 3107. The processor 470 may detect the intersection 3100 via lane detection. The processor 470 may detect the intersection 3100 via the detection of another vehicle that is being driven in the direction crossing the direction of travel of the vehicle 100. The processor 470 may detect the intersection 3100 via road surface detection.

When the intersection 3100 is detected as an object, the processor 470 may reduce the focal distance of the variable lens 300.

An image 3110 may be captured via the vehicle camera 200 before the detection of the intersection 3100. An image 3120 may be captured via the vehicle camera 200 after the detection of the intersection 3100. For example, the image 3120 may be captured via the vehicle camera 200 in the state in which the focal distance of the variable lens 300 is reduced.

When the vehicle 100 is being driven through the intersection, it is necessary to detect objects crossing the direction of travel of the vehicle 100 as well as objects moving parallel to the direction of travel. In this case, an image captured via a camera having a wide FOV is advantageous for object detection. Upon detection of the intersection, reducing the focal distance of the variable lens 300 may increase the FOV of the camera.

Figure 32A:
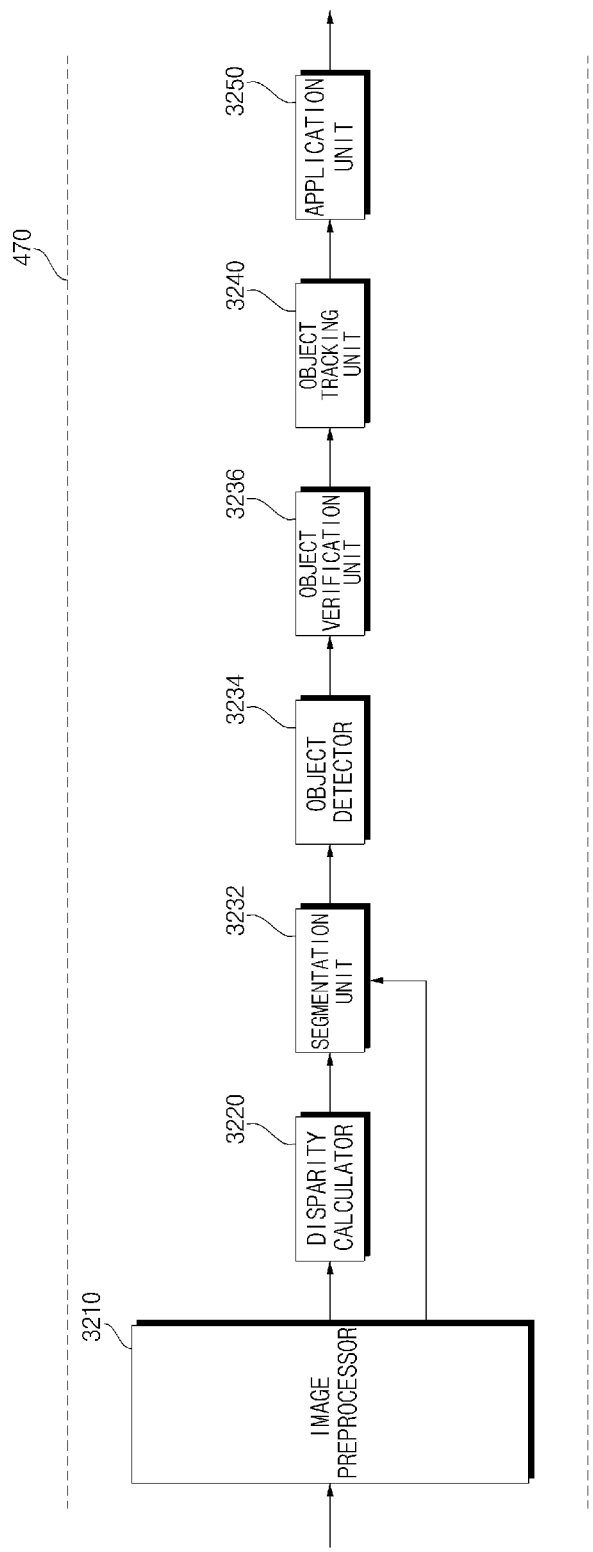
FIGS. 32A and 32B are diagrams illustrating examples of the internal configuration of a processor for a vehicle camera that includes a stereo camera in accordance with an implementation.
Figure 32B:
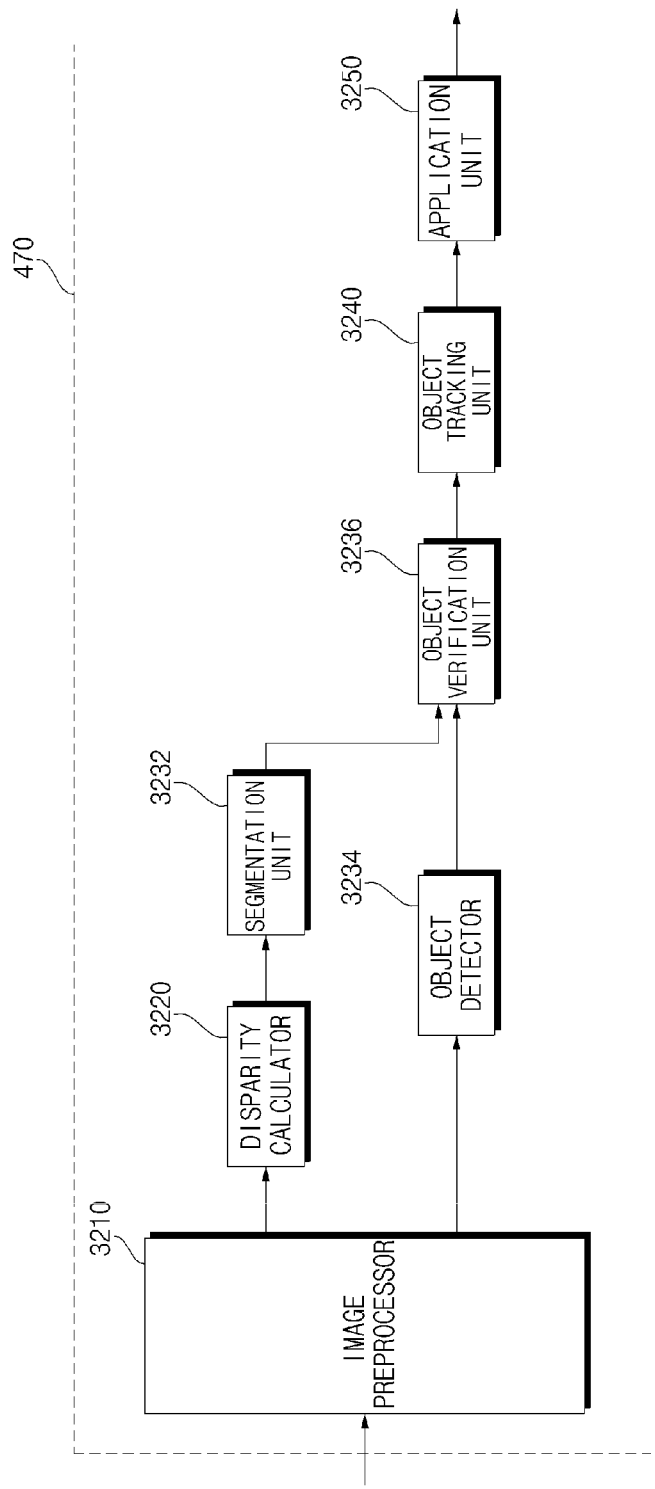

FIGS. 32A and 32B are block diagrams referenced to describe the internal configuration of the processor when the vehicle camera includes a stereo camera in accordance with an implementation.

First, referring to FIG. 32A that is a block diagram illustrating one example the internal configuration of the processor 470, the processor 470 included in the driver assistance apparatus 400 may include an image preprocessor 3210, a disparity calculator 3220, a segmentation unit 3232, an object detector 3234, an object verification unit 3236, an object tracking unit 3240, and an application unit 3250.

The image preprocessor 3210 may receive an image from the camera 200 and perform preprocessing on the image.

For example, the image preprocessor 3210 may perform, for example, noise reduction, rectification, calibration, color enhancement, color space conversion (CSC), interpolation, or camera gain control on the image. Thereby, a more vivid image than the stereo image captured via the camera 200 may be acquired.

The disparity calculator 3220 may receive the image signal-processed by the image preprocessor 3210, perform stereo matching for the received images, and acquire a disparity map based on the stereo matching. For example, disparity information related to a stereo image of the view in front of the vehicle may be acquired.

The stereo matching may be performed on a per pixel basis or on a per prescribed block basis of stereo images. The disparity map may refer to a map showing binocular parallax information between stereo images, e.g., left and right images as numerical values.

The segmentation unit 3232 may perform segmentation and clustering on at least one of the images based on the disparity information from the disparity calculator 3220.

As a specific example, the segmentation unit 3232 may segment at least one of the stereo images into a background and a foreground based on the disparity information.

For example, a region having a predetermined value or less of the disparity information in the disparity map may be calculated as a background, and the corresponding region may be excluded. As a result, a foreground may be relatively separated from the image.

In another example, a region having a predetermined value or more of the disparity information in the disparity map may be calculated as a foreground, and the corresponding region may be extracted. As a result, the foreground may be separated from the image.

As described above, as the foreground and the background are separated based on the disparity information extracted based on the stereo images, for example, signal processing speed and signal processing amount may be reduced during object detection.

Subsequently, the object detector 3234 may detect an object based on an image segment from the segmentation unit 3232.

For example, the object detector 3234 may detect an object for at least one of the images based on the disparity information.

For example, the object detector 3234 may detect an object for at least one of the images. For example, the object detector 3234 may detect an object from a foreground separated from the image by the image segment.

Subsequently, the object verification unit 3236 may classify and verify the separated object.

To this end, the object verification unit 3236 may use, for example, an identification method using a neural network, a Support Vector Machine (SVM) method, an AdaBoost identification method using a Harr-like feature, or a Histograms of Oriented Gradients (HOG) method.

The object verification unit 3236 may compare the detected object with objects stored in the memory 440 to verify the detected object.

For example, the object verification unit 3236 may verify an adjacent vehicle, a traffic lane marker, road surface, a traffic sign, a dangerous zone, and a tunnel, located around the vehicle 100.

The object tracking unit 3240 may track the verified object. For example, the object tracking unit 3240 may sequentially verify an object in the acquired stereo images, calculate motion or a motion vector of the verified object, and track movement of the object based on the calculated motion or the calculated motion vector. Consequently, the object tracking unit 3240 may track, for example, an adjacent vehicle, a traffic lane marker, road surface, a traffic sign, a dangerous area, and a tunnel located around the vehicle 100.

Subsequently, the application unit 3250 may calculate, for example, the accident risk of the vehicle 100 based on various objects (e.g. other vehicles, traffic lane markers, road surface, and traffic signs) located around the vehicle 100. In addition, the application unit 3250 may calculate the possibility of head-on collision with a preceding vehicle and whether or not loss of traction occurs.

In addition, the application unit 3250 may output, for example, a message to notify a user of driver assistance information, such as the calculated risk, collision possibility, or traction loss. Alternatively, the application unit 3250 may generate a control signal, as vehicle control information, for the attitude control or traveling control of the vehicle 100.

In some implementations, some of the image preprocessor 3210, the disparity calculator 3220, the segmentation unit 3232, the object detector 3234, the object verification unit 3236, the object tracking unit 3240, and the application unit 3250 may be included in the processor 470.

FIG. 32B is a block diagram illustrating another example the internal configuration of the processor 470 in accordance with an implementation.

Referring to FIG. 32B, the processor 470 of FIG. 32B has the same inner constituent units as those of the processor 470 of FIG. 32A, but has a difference in terms of signal processing sequence. Hereinafter, only the difference will be described.

The object detector 3234 may receive stereo images, and detect an object from at least one of the stereo images. Unlike FIG. 32A, the object detector 3234 may directly detect an object from the stereo image, rather than detecting an object from a segmented image based on disparity information.

Subsequently, the object verification unit 3236 may classify and verify the detected and separated object based on the image segment from the segmentation unit 3232 and the object detected in the object detection unit 3234.

To this end, the object verification unit 3236 may use, for example, an identification method using a neural network, a Support Vector Machine (SVM) method, an AdaBoost identification method using a Harr-like feature, or a Histograms of Oriented Gradients (HOG) method.

Figure 33A:
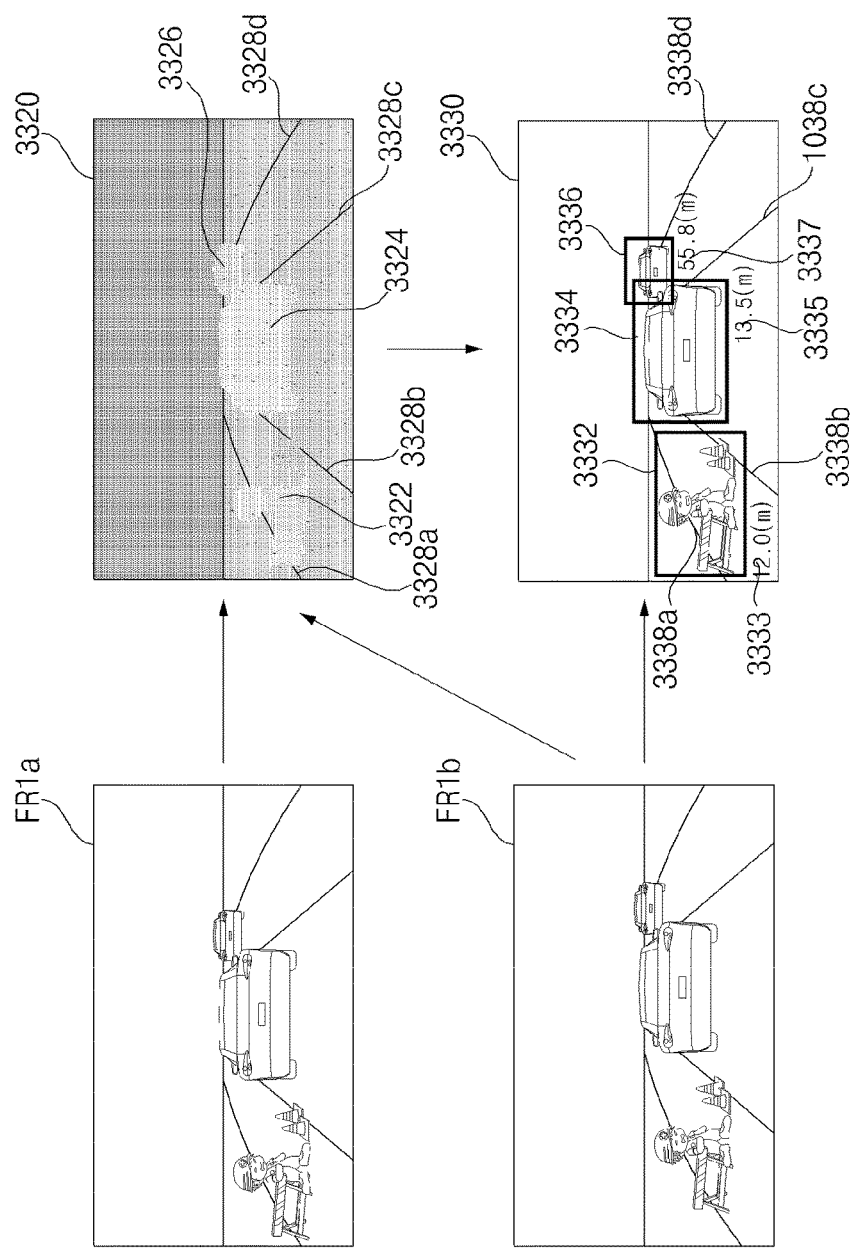
FIGS. 33A and 33B are diagrams illustrating examples of operating a processor (e.g., processor 470 of FIG. 19) based on stereo images acquired respectively during first and second frame periods in accordance with an implementation.
Figure 33B:
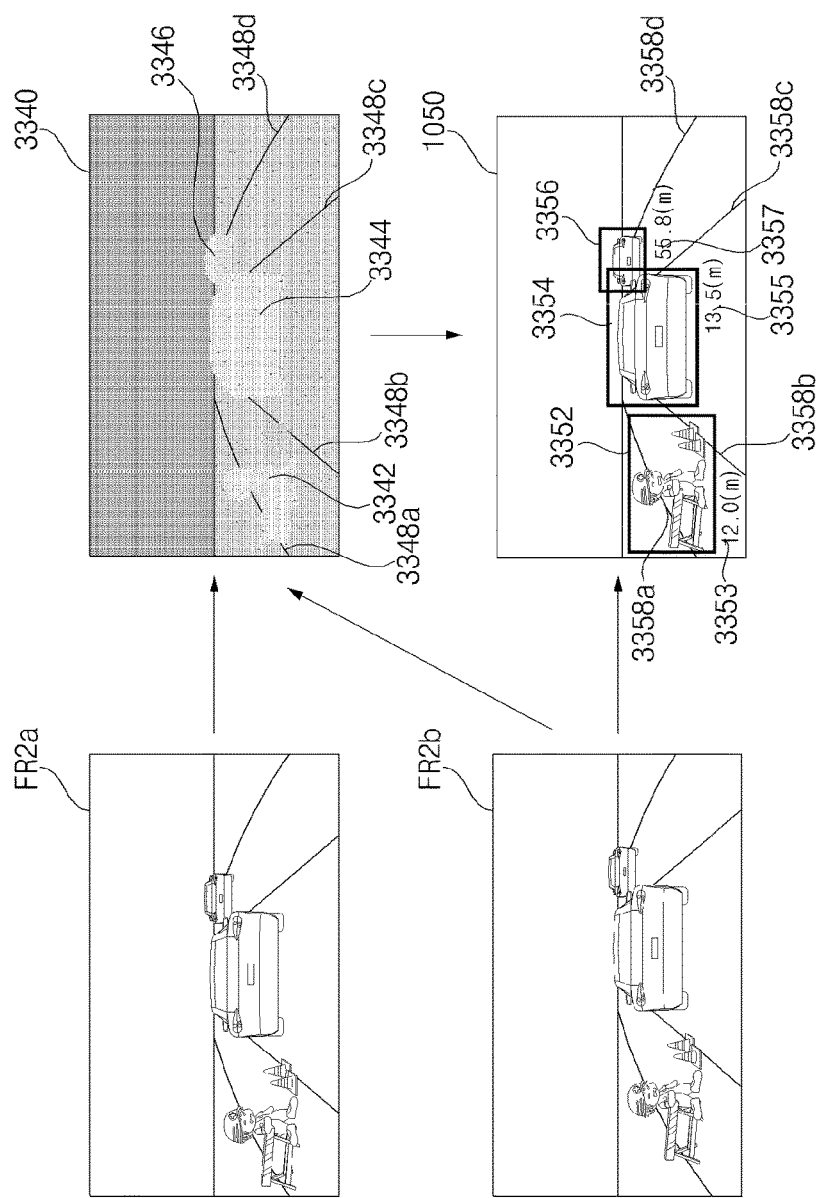

FIGS. 33A and 33B are views referenced to describe a method of operating the processor 470 of FIG. 19 based on stereo images acquired respectively during first and second frame periods in accordance with an implementation.

First, referring to FIG. 33A, the stereo camera 200 acquires stereo images during a first frame period.

The disparity calculator 3220 included in the processor 470 receives stereo images FR1*a* and FR1*b* signal-processed by the image preprocessor 3210 and performs stereo matching for the received stereo images FR1*a* and FR1*b* to acquire a disparity map 3320.

The disparity map 3320 shows a binocular disparity between the stereo images FR1*a* and FR1*b* as levels. As the disparity level is higher, the distance to the vehicle may be calculated as being shorter. As the disparity level is lower, the distance to the vehicle may be calculated as being longer.

When the disparity map is displayed, the disparity map may be displayed with higher brightness as the disparity level is higher and displayed with lower brightness as the disparity level is lower.

FIG. 33A illustrates, by way of example, that, in the disparity map 3320, first to fourth traffic lane markers 3328*a*, 3328*b*, 3328*c*, and 3328*d* have their own disparity levels and a roadwork zone 3322, a first preceding vehicle 3324, and a second preceding vehicle 3326 have their own disparity levels.

The segmentation unit 3232, the object detector 3234, and the object verification unit 3236 respectively perform segmentation, object detection, and object verification for at least one of the stereo images FR1*a* and FR1*b* based on the disparity map 3320.

FIG. 33A illustrates, by way of example, that object detection and object verification for the second stereo image FR1*b* are performed using the disparity map 3320.

For example, object detection and object verification for first to fourth traffic lane markers 3338*a*, 3338*b*, 3338*c*, and 3338*d*, a roadwork zone 3332, a first preceding vehicle 3334, and a second preceding vehicle 3336 in an image 3330 may be performed.

Subsequently, referring to FIG. 33B, the stereo camera 200 acquires stereo images during a second frame period.

The disparity calculator 3220 included in the processor 470 receives stereo images FR2*a* and FR2*b* signal-processed by the image preprocessor 3210 and performs stereo matching for the received stereo images FR2*a* and FR2*b* to acquire a disparity map 3340.

FIG. 33B shows, by way of example, that, in the disparity map 3340, first to fourth traffic lane markers 3348*a*, 3348*b*, 3348*c*, and 3348*d* have their own disparity levels and a roadwork zone 3342, a first preceding vehicle 3344, and a second preceding vehicle 3346 have their own disparity levels.

The segmentation unit 3232, the object detector 3234, and the object verification unit 3236 respectively perform segmentation, object detection, and object verification for at least one of the stereo images FR2a and FR2b based on the disparity map 3340.

FIG. 33B shows, by way of example, that object detection and object verification for the second stereo image FR2b are performed using the disparity map 3340.

For example, object detection and object verification for first to fourth traffic lane markers 3358a, 3358b, 3358c, and 3358d, a roadwork zone 3352, a first preceding vehicle 3354, and a second preceding vehicle 3356 in an image 3350 may be performed.

The object tracking unit 3240 may track verified objects by comparing FIGS. 33A and 33B with each other.

In some implementations, the object tracking unit 3240 may track, for example, movement of an object based on the motion or motion vectors of respective objects verified from FIGS. 33A and 33B. As such, the object tracking unit 3240 may track, for example, traffic lane markers, a roadwork zone, a first preceding vehicle and a second preceding vehicle, which are located around the vehicle 100.

FIGS. 34 to 39 are views referenced to describe an operation of acquiring stereo images and calculating disparity when the left variable lens 300L and the right variable lens 300R included in the respective stereo cameras have different focal distances in accordance with an implementation.

The stereo camera 200 may include a first camera and a second camera.

The first camera may include the left variable lens 300L and the first image sensor 214a.

The second camera may include the right variable lens 300R and the second image sensor 214b.

In the following description, the focal distance of the left variable lens 300L is longer than the focal distance of the right variable lens 300R. The left variable lens 300L is advantageous for image capture at a long distance, and the right variable lens 300R is advantageous for image capture at a short distance.

Figure 34:
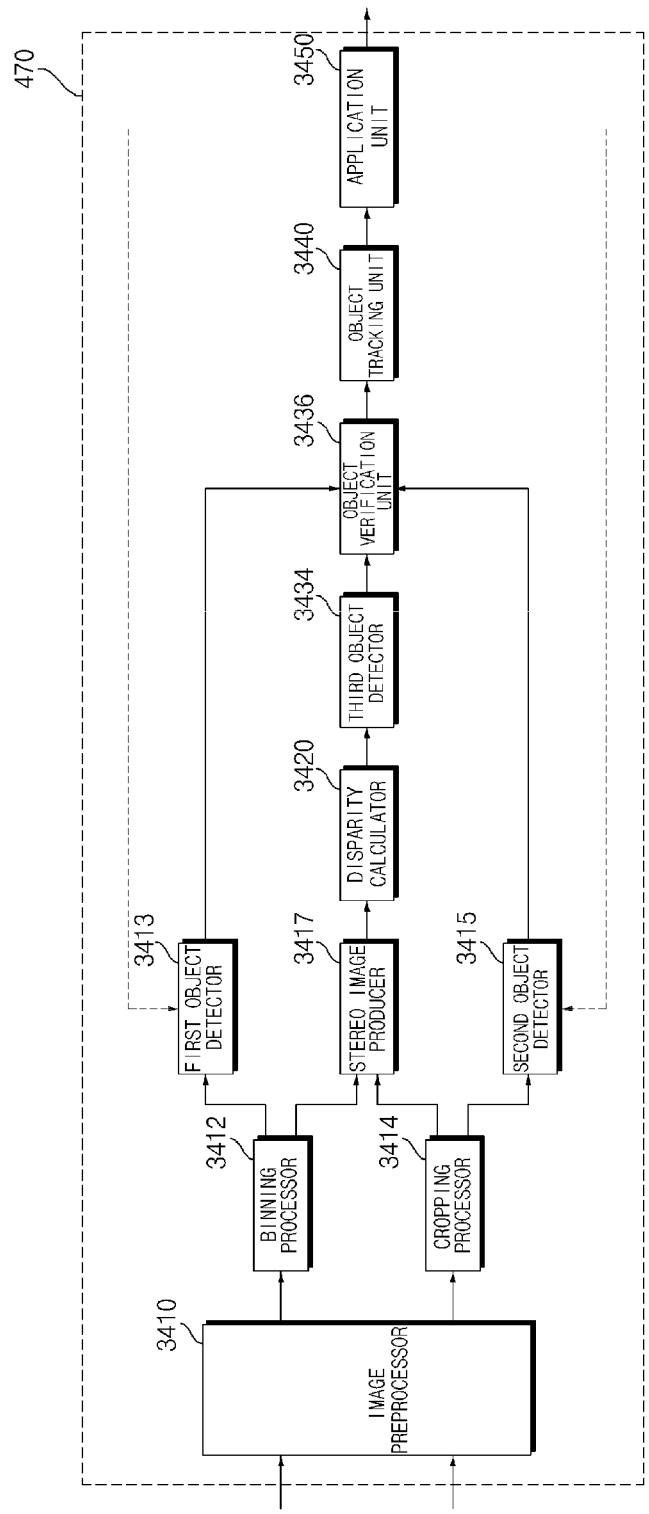
FIG. 34 is a diagram illustrating an example of the internal configuration of the processor for a vehicle camera that includes a stereo camera in accordance with an implementation.

FIG. 34 is a block diagram referenced to describe the internal configuration of the processor when the vehicle camera includes a stereo camera in accordance with an implementation.

Referring to FIG. 34, the processor 470 may include an image preprocessor 3410, a binning processor 3412, a first object detector 3413, a cropping processor 3414, a second object detector 3415, a stereo image producer 3417, a disparity calculator 3420, a third object detector 3434, an object verification unit 3436, an object tracking unit 3440, and an application unit 3450.

The image preprocessor 3410 may receive an image from the stereo camera 200 and perform preprocessing on the image.

For example, the image preprocessor 3410 may perform, for example, noise reduction, rectification, calibration, color enhancement, color space conversion (CSC), interpolation, or camera gain control on the image. Thereby, a more vivid image than the stereo image captured via the camera 200 may be acquired.

The binning processor 3412 may perform binning on the first image received from the first camera of the stereo camera 200. Here, the image input to the binning processor 3412 may be the image preprocessed in the image preprocessor 3410. The binning processor 3412 may combine information regarding at least two pixels of the first image into information regarding one pixel. Thereby, the binning may reduce the resolution of the first image.

The binning processor 3412 may perform binning on some of a plurality of frames of the first image that are not successive.

The first object detector 3413 may detect an object based on the first image received from the first camera among the stereo camera 200. Here, the image input to the first object detector 3413 may be the image preprocessed in the image preprocessor 3410.

The first object detector 3413 may calculate the distance to the detected object and the speed of the vehicle relative to the object. The first object detector 3413 may track the detected object, and may calculate the distance to the object based on the size of the object, which is changed as time passes. The first object detector 3413 may calculate the speed of the vehicle relative to the object based on the distance to the object.

The cropping processor 3414 may perform cropping on the second image received from the second camera of the stereo camera 200. Here, the image input to the cropping processor 3414 may be the image preprocessed in the image preprocessor 3410. The cropping processor 3414 may cut off an undesired region of the second image.

The cropping processor 3414 may perform cropping some of a plurality of frames of the second image that are not successive.

The second object detector 3415 may detect an object based on the second image received from the second camera among the stereo camera 200. Here, the image input to the second object detector 3415 may be the image preprocessed in the image preprocessor 3410.

The second object detector 3415 may calculate the distance to the detected object and the speed of the vehicle relative to the object. The second object detector 3415 may track the detected object, and calculate the distance to the object based on the size of the object that is changed as time passes. The second object detector 3415 may calculate the speed of the vehicle relative to the object based on the distance to the object.

The stereo image producer 3417 may produce a stereo image based on the binned first image and the cropped second image. The stereo image producer 3417 may produce the stereo image by performing rectification on the binned first image or the cropped second image. For example, the processor 470 may produce the stereo image after matching the sizes of the binned first image and the cropped second image with each other by adjusting the size of any one of the first and second images. For example, the processor 470 may produce the stereo image after matching the sizes of the binned first image and the cropped second image with each other by adjusting the sizes of both the images.

The disparity calculator 3420 may perform stereo matching for the received images, and acquire a disparity map based on the stereo matching. For example, disparity information related to a stereo image of the view in front of the vehicle may be acquired.

The stereo matching may be performed on a per pixel basis or on a per prescribed block basis of stereo images. The disparity map may refer to a map showing binocular parallax information between stereo images, e.g., left and right images as numerical values.

The third object detector 3434 may detect an object.

For example, the third object detector 3434 may detect an object from at least one image based on disparity information.

For example, the object detector 3434 may detect an object from at least one of the images.

The object verification unit 3436 may classify and verify the detected objects.

The object verification unit 3436 may classify and verify the objects detected by the first object detector 3413, the second object detector 3415, and the third object detector 3434.

To this end, the object verification unit 3436 may use, for example, an identification method using a neural network, a Support Vector Machine (SVM) method, an AdaBoost identification method using a Harr-like feature, or a Histograms of Oriented Gradients (HOG) method.

The object verification unit 3436 may compare the detected objects with objects stored in the memory 440 to verify the detected objects.

For example, the object verification unit 3436 may verify an adjacent vehicle, a traffic lane marker, road surface, a traffic sign, a dangerous zone, and a tunnel, located around the vehicle.

The object tracking unit 3440 may track the verified objects. For example, the object tracking unit 3440 may sequentially verify an object in the acquired stereo images, calculate motion or a motion vector of the verified object, and track movement of the object based on the calculated motion or the calculated motion vector. Consequently, the object tracking unit 3440 may track, for example, an adjacent vehicle, a traffic lane marker, road surface, a traffic sign, a dangerous area, and a tunnel located around the vehicle 100.

Subsequently, the application unit 3450 may calculate, for example, the accident risk of the vehicle 100 based on various objects (e.g. other vehicles, traffic lane markers, road surface, and traffic signs) located around the vehicle 100. In addition, the application unit 3450 may calculate the possibility of head-on collision with a preceding vehicle and whether or not loss of traction occurs.

In addition, the application unit 3450 may output, for example, a message to notify a user of driver assistance information, such as the calculated risk, collision possibility, or traction loss. Alternatively, the application unit 3450 may generate a control signal, as vehicle control information, for the attitude control or traveling control of the vehicle 100.

In some implementations, some of the image preprocessor 3410, the binning the disparity calculator 3420, the object detectors 3413, 3415 and 3434, the object verification unit 3436, the object tracking unit 3440, and the application unit 3450 may be included in the processor 470.

Figure 35:
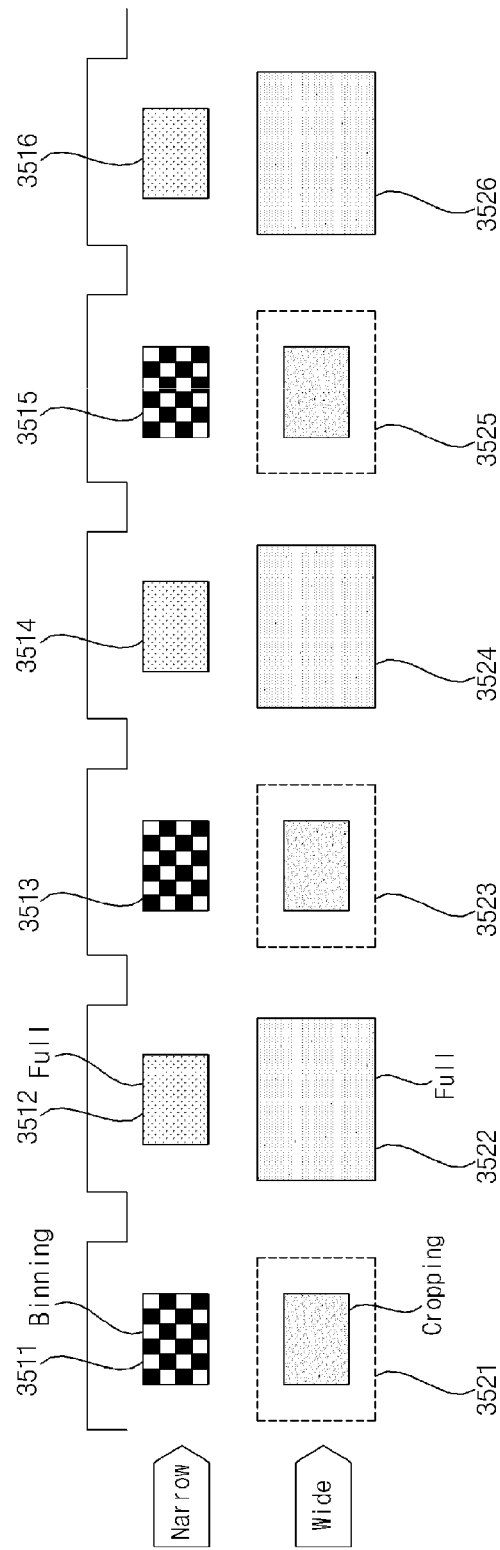
FIG. 35 is a diagram illustrating an example of binning and cropping in accordance with an implementation.

FIG. 35 is a view referenced to describe binning and cropping in accordance with an implementation.

Referring to FIG. 35, the processor 470 may receive a first image from the first camera of the stereo camera 200.

The first image may be an image acquired via the left variable lens 300L and the first image sensor 214a.

The first image may include a plurality of frames 3511, 3512, 3513, 3514, 3515, 3516, . . . .

The processor 470 may perform binning on the first image. For example, the processor 470 may perform binning on, for example, some frames 3511, 3513, 3515, . . . , which are not successive, among the frames 3511, 3512, 3513, 3514, 3515, 3516, . . . .

The processor 470 may perform binning on the first image based on the second image.

The processor 470 may perform binning on the first image so as to be synchronized with the second image. For example, the processor 470 may perform binning on the frames 3511, 3513, 3515, . . . of the first image, which correspond to cropped frames 3521, 3523, 3525, . . . of the second image.

The processor 470 may perform binning on the first image so as to match the resolution of the second image. For example, the processor 470 may perform binning on the first image so as to have the same resolution as the resolution of the second image.

The processor 470 may detect an object based on the first image. For example, the processor 470 may detect an object based on frames 3512, 3514, 3516, . . . , which are not subjected to binning, among the frames 3511, 3512, 3513, 3514, 3515, 3516, . . . .

An image of the frames that are not subjected to binning has a higher resolution, and thus has a greater number of pieces of information. Information regarding the object may be more accurately detected by detecting the object based on the image of the frames that are not subjected to binning.

The processor 470 may receive a second image from the second camera of the stereo camera 200.

The second image may be an image acquired via the right variable lens 300R and the second image sensor 214b.

The second image may include a plurality of frames 3521, 3522, 3523, 3524, 3525, 3526, . . . .

The processor 470 may perform cropping on the second image. For example, the processor 470 may perform cropping on, for example, some frames 3521, 3523, 3525, . . . , which are not successive, among the frames 3521, 3522, 3523, 3524, 3525, 3526, . . . .

The processor 470 may perform the cropping on the second image based on the first image.

The processor 470 may perform cropping on the second image so as to be synchronized with the first image. For example, the processor 470 may perform cropping on the frames 3521, 3523, 3525, . . . of the second image, which correspond to the binned frames 3511, 3513, 3515, of the first image.

The processor 470 may perform cropping on the second image so as to correspond to content of the first image. For example, the processor 470 may perform cropping on the second image so as to have the same content as the content of the first image.

The processor 470 may detect an object based on the second image. For example, the processor 470 may detect an object based on frames 3522, 3524, 3526, which are not subjected to cropping, among the frames 3521, 3522, 3523, 3524, 3525, 3526, . . . .

An image of the frames that are not subjected to cropping has a wider field of vision, and thus has a greater number of pieces of information. Information regarding the object may be more accurately detected by detecting the object based on the image of the frames that are not subjected to cropping.

Figure 36:
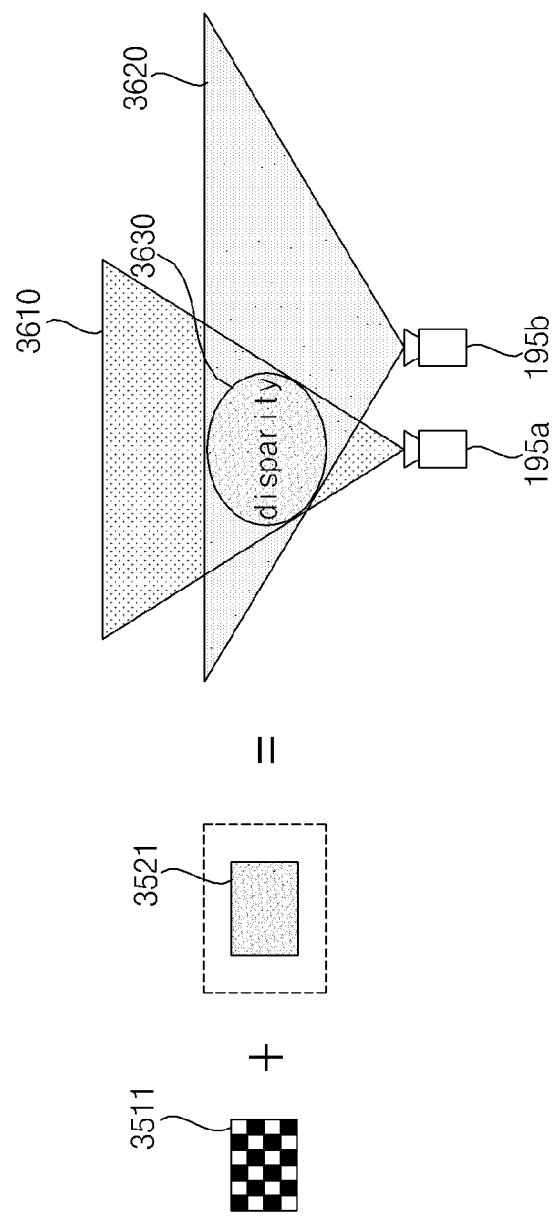
FIG. 36 is a diagram illustrating an example of an operation of producing a stereo image in accordance with an implementation.

FIG. 36 is a view referenced to describe an operation of producing a stereo image in accordance with an implementation.

Referring to FIG. 36, the processor 470 may produce a stereo image by processing each of a first image and a second image. The processor 470 may acquire stereo images by performing binning on the first image 3511 and cropping on the second image 3521. The processor 470 may produce stereo images by performing rectification on the binned first image or the cropped second image. For example, the processor 470 may produce the stereo image after mating the sizes of the binned first image and the cropped second image with each other by adjusting the size of any one of the first and second images. For example, the processor 470 may produce the stereo image after mating the sizes of the binned first image and the cropped second image with each other by adjusting the sizes of both the images.

The processor 470 may perform disparity calculation based on the stereo images 3511 and 3512.

Figure 37:
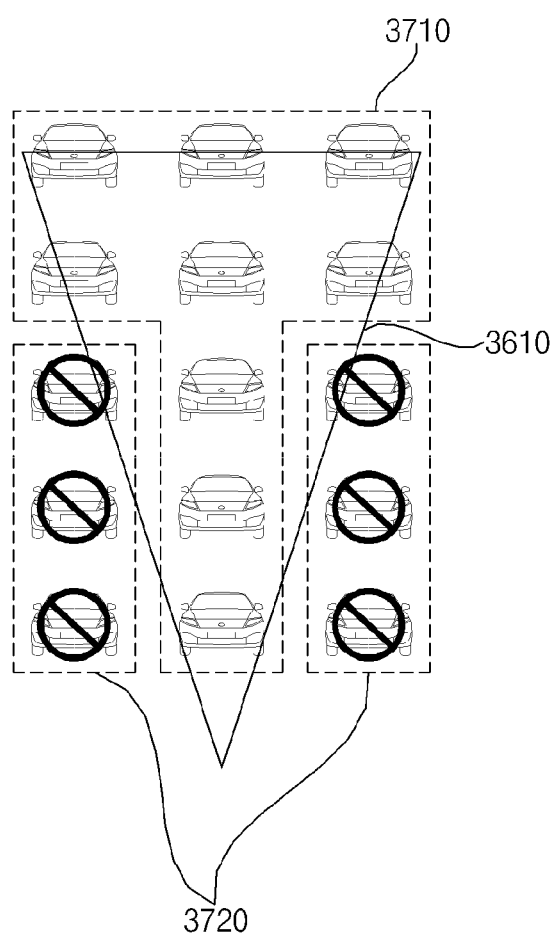
FIG. 37 is a diagram illustrating an example of a first image in accordance with an implementation.

FIG. 37 is a view referenced to describe a first image in accordance with an implementation.

Referring to FIG. 37, the processor 470 may receive a first image from the first camera. The first image may be an image of the view at a long distance in front of the vehicle, which is acquired via the left variable lens 300L and the first image sensor 214a.

The processor 470 may detect an object located a long distance away from the first image. The processor 470 may detect the object from the first image even if the object is located a long distance away, but may fail to detect an object over a wide field of vision in the left-right direction. In FIG. 37, an area 3610 is detectable based on the properties of the first camera.

The processor 470 may detect an object 3710 from the first image. The detection of the object 3710 is possible because the object 3710 is included in the first image based on the FOV of the left variable lens 300L, which is included in the first camera. An object 3720 may not be detected because it is not included in the first image based on the FOV of the left variable lens 300L, which is included in the first camera.

Figure 38:
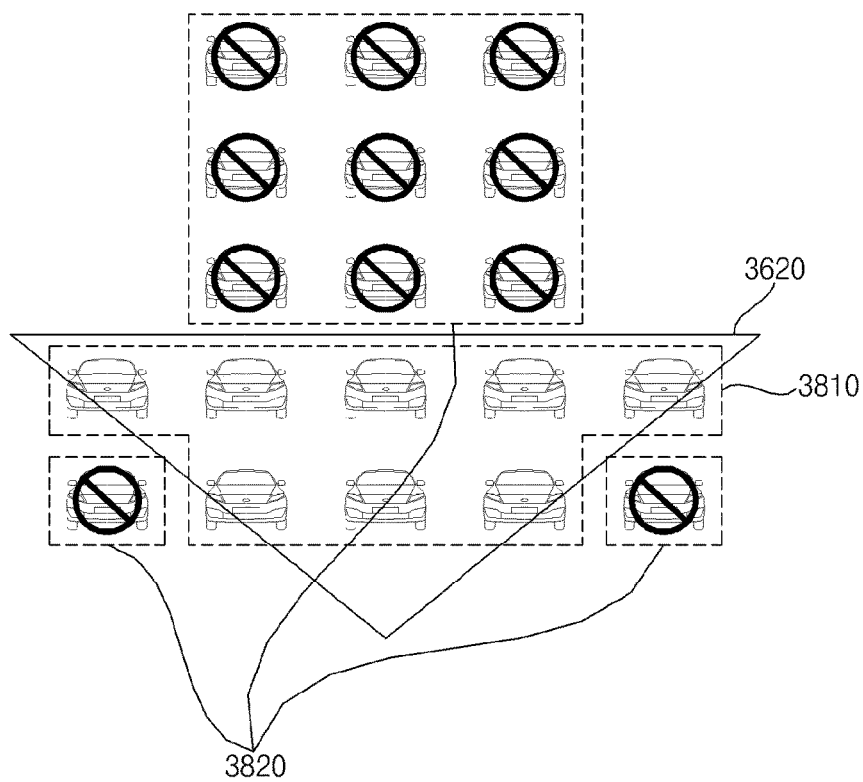
FIG. 38 is a diagram illustrating an example of a second image in accordance with an implementation.

FIG. 38 is a view referenced to describe a second image in accordance with an implementation.

Referring to FIG. 38, the processor 470 may receive a second image from the second camera. The second image may be an image of the view at a short distance in front of the vehicle, which is acquired via the wide angle camera.

The processor 470 may detect an object, which is located at the left side or the right side in front of the vehicle, among objects located a short distance away from the second image. The processor 470 may detect, from the second image, objects over a wide field of vision in the left-right direction, but may fail to detect an object a long distance away. In FIG. 38, an area 3620 is detectable based on the property of the second camera.

The processor 470 may detect an object 3810 from the second image. The detection of the object 3810 is possible because the object 3810 is included in the second image based on the FOV of the right variable lens 300R, which is included in the second camera. An object 3820 may not be detected because it is not included in the second image based on the FOV of the right variable lens 300R included in the second camera.

Figure 39:
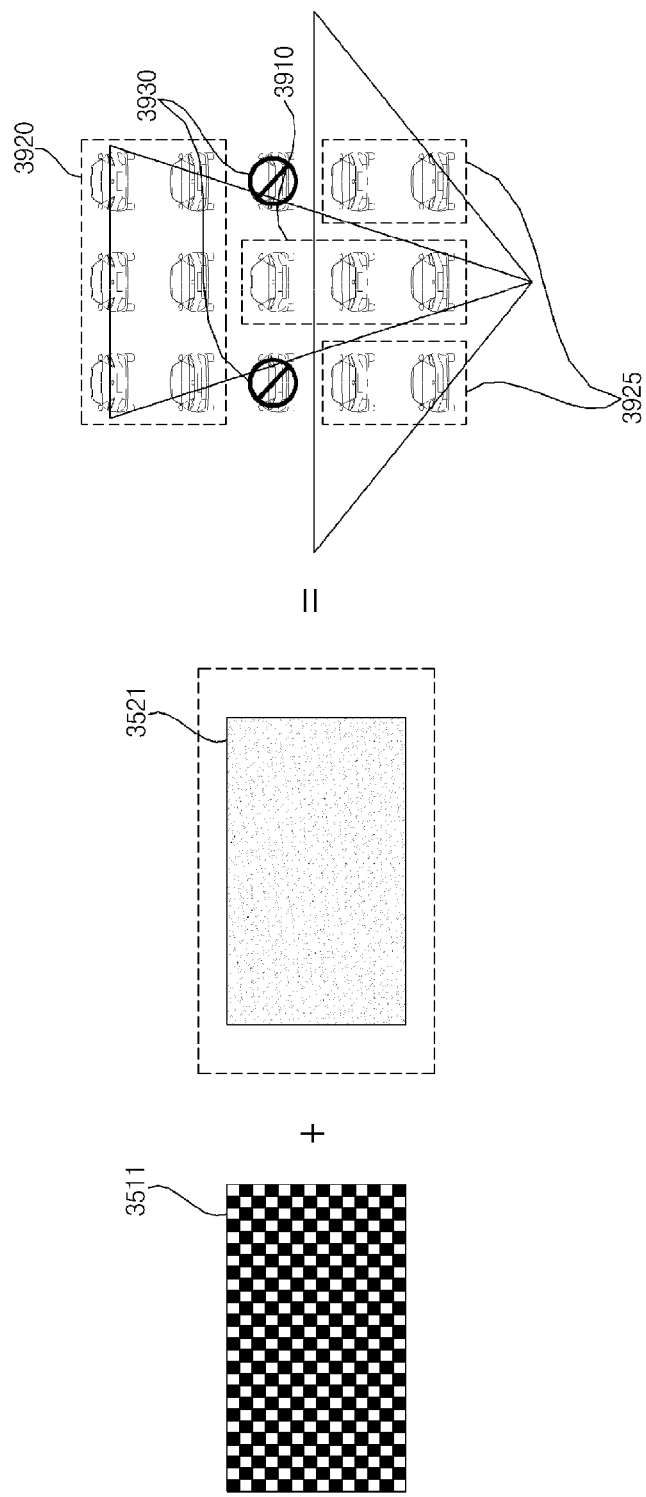
FIG. 39 is a diagram illustrating an example of a stereo image produced based on the first image and the second image in accordance with an implementation.

FIG. 39 is a view referenced to describe a stereo image produced based on the first image and the second image in accordance with an implementation.

Referring to FIG. 39, the processor 470 may produce stereo images by performing binning on the first image 3511 and cropping on the second image 3521, and thereafter performing rectification on the images. The processor 470 may perform disparity calculation based on the produced stereo images.

The processor 470 may perform disparity calculation on an object 3910, which is detected in the area in which the first image and the second image overlap each other. An object 3920 may be detected in the first image, but not detected in the second image. An object 3925 may be detected in the second image, but not detected in the first image. The processor 470 may not perform disparity calculation on the objects 3920 and 3925.

An object 3930 is not detected in either the first image or the second image.

Figure 40:
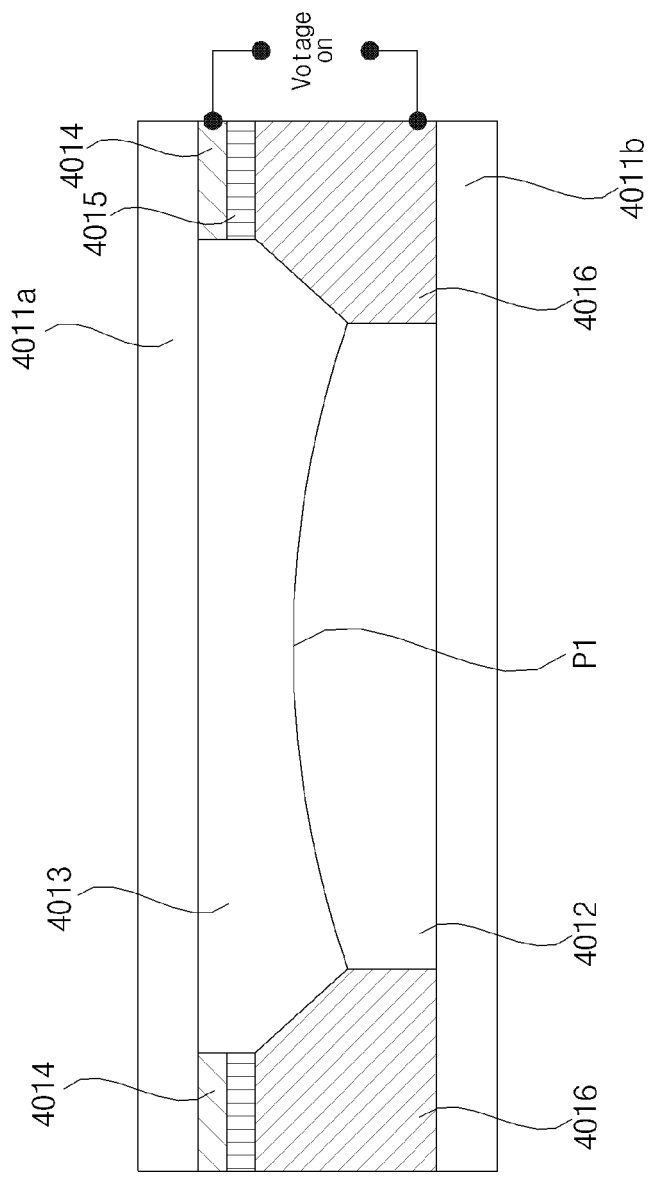
FIG. 40 is a diagram illustrating an example of the variable lens included in the driver assistance apparatus in accordance with an implementation.

FIG. 40 is a view referenced to describe the variable lens included in the driver assistance apparatus in accordance with an implementation.

Referring to FIG. 40, the driver assistance apparatus 400 may include the camera 200 and the processor 470.

The camera 200 may include the image sensor 214 and the variable lens 300.

The variable lens 300 may change the light that is introduced into the image sensor 214 based on variation of the interface between polar fluid and non-polar fluid, which depends on the voltage applied thereto.

The variable lens 300 may be referred to as a wetting lens.

The variable lens 300 may include transparent plates 4011a and 4011b, a first material 4012, a second material 4013, a catalyst member 4014, an insulator member 4015, and a hydrophobic member 4016.

The variable lens 300 may have an approximately cylindrical shape.

The transparent plates 4011a and 4011b may be parallel to each other and may form the upper portion and the lower portion of the cylindrical variable lens 300. The transparent plates 4011a and 4011b may define a space therebetween. The transparent plates 4011a and 4011b may be formed of a hydrophilic material or may be coated with a hydrophilic material.

A drive unit may have a ring shape, and may form the outer peripheral surface of the variable lens 300. The drive unit may include the catalyst member 4014, the insulator member 4015, and the hydrophobic member 4016.

The catalyst member 4014 may be formed of platinum (Pt) or palladium (Pd). The catalyst member 4014 may function as a ground electrode.

The insulator member 4015 is formed between the catalyst member 4014 and the hydrophobic member 4016 and functions to insulate the catalyst member 4014, which functions as the ground function, from the hydrophobic member 4016, which receives power.

The hydrophobic member 4016 may be formed by coating the surface of the electrode with a hydrophobic material. The surface of the hydrophobic member 4016 may be changed to a hydrophilic surface by an electric field created between the hydrophobic member 4016 and the catalyst member 4014 when electricity is supplied.

The first material 4012 and the second material 4013 may be provided in the inner space of the variable lens 300. For example, the first material 4012 may be a polar material, such as water or liquid crystals. The second material 4013 may be a non-polar fluid.

The focal distance of the variable lens 300 may be changed by the potential difference of electricity supplied to both hydrophobic members 4016.

Implementations described above may be implemented as code that may be written on a computer readable medium in which a program is recorded and thus read by a computer. The computer readable medium includes all kinds of recording devices in which data is stored in a computer readable manner. Examples of the computer readable recording medium may include a hard disk drive (HDD), a solid state disk (SSD), a silicon disk drive (SDD), a ROM, a RAM, a CD-ROM, a magnetic tape, a floppy disc, and an optical data storage device. In addition, the computer readable medium is implemented in a carrier wave (e.g., data transmission over the Internet). In addition, the computer may include the processor 470 or the controller 170.

The above detailed description is not limited to the implementations set forth herein. The scope of the present disclosure is determined by the reasonable interpretation of the accompanying claims and all changes in the equivalent range are included.

What is claimed is:

1. A vehicle camera comprising:
an image sensor;
a variable lens comprising a liquid crystal layer that comprises liquid crystal molecules having an arrangement that depends on a voltage applied to the liquid crystal layer,
the variable lens configured to, based on the arrangement of the liquid crystal molecules in the liquid crystal layer, alter light that is introduced into the image sensor;
a housing that defines an external appearance of the vehicle camera, the housing configured to accommodate the image sensor and the variable lens, wherein the housing comprises a holder for supporting the variable lens; and
at least one hot wire configured to supply heat to the variable lens,
wherein the holder of the housing comprises:
a first fixing portion configured to support a first surface of the variable lens, wherein the first fixing portion comprises (i) a first ridged portion comprising at least one ridge and (ii) at least one furrow configured to contact with at least a portion of the first surface of the variable lens; and
a second fixing portion configured to support a second surface of the variable lens, wherein the second fixing portion comprises (i) a second ridged portion comprising at least one ridge and (ii) at least one furrow configured to contact with at least a portion of the second surface of the variable lens, and
wherein the at least one hot wire comprises:
a first hot wire formed on the first ridged portion of the first fixing portion of the holder of the housing; and
a second hot wire formed on the second ridged portion of the second fixing portion of the holder of the housing.

2. The vehicle camera according to claim 1, further comprising at least one lens that is located between the variable lens and the image sensor and that is configured to refract light that is introduced to the image sensor.

3. The vehicle camera according to claim 1, wherein the holder comprises a slot configured to receive at least a portion of the variable lens, and
wherein the at least one hot wire is formed inside the slot.

4. The vehicle camera according to claim 1, wherein the at least one hot wire is arranged to be spaced apart from the variable lens.

5. The vehicle camera according to claim 1, wherein the at least one hot wire is arranged to contact with at least a portion of a rim of the variable lens.

6. The vehicle camera according to claim 3,
wherein the slot that is configured to receive the at least a portion of the variable lens is formed between the first fixing portion and the second fixing portion.

7. The vehicle camera according to claim 6,
wherein the first hot wire is formed between the first fixing portion and the first surface of the variable lens, the first hot wire being spaced apart from the first surface of the variable lens; and wherein the second hot wire is formed between the second fixing portion and the second surface of the variable lens, the second hot wire being spaced apart from the second surface of the variable lens.

8. The vehicle camera according to claim 1, wherein the housing has a thickness that increases with decreasing distance towards the image sensor.

9. The vehicle camera according to claim 1, wherein the variable lens is configured to be slidably movable or rotatably movable.

10. The vehicle camera according to claim 1, wherein the variable lens comprises:
a first substrate; and
a second substrate disposed to face the first substrate, and
wherein the liquid crystal layer of the variable lens is disposed between the first substrate and the second substrate.

11. The vehicle camera according to claim 10, wherein the first substrate or the second substrate of the variable lens comprises the at least one hot wire.

12. The vehicle camera according to claim 10, wherein the first substrate of the variable lens comprises a plurality of electrodes spaced apart from one another, the plurality of electrodes being arranged in an up-down direction or in a left-right direction.

13. The vehicle camera according to claim 12, wherein the plurality of electrodes of the first substrate of the variable lens comprises a plurality of columns of electrodes extending in the up-down direction and a plurality of rows of electrodes extending in the left-right direction, and
wherein at least one capacitor is provided at each of intersections of the plurality of columns of electrodes and the plurality of rows of electrodes.

14. The vehicle camera according to claim 12, further comprising at least one processor configured to control a level of voltage applied to each of the plurality of electrodes of the first substrate of the variable lens.

15. The vehicle camera according to claim 14, wherein the at least one processor is configured to maintain a constant voltage level for each of the plurality of electrodes of the first substrate of the variable lens.

16. The vehicle camera according to claim 14, wherein the at least one processor is further configured to control a voltage level of a first electrode that is located at a central position among the plurality of electrodes to be greater than a voltage level of a second electrode that is located at an outer peripheral location among the plurality of electrodes.

17. The vehicle camera according to claim 14, wherein the at least one processor is further configured to process an image acquired via the image sensor.

18. A vehicle camera comprising:
an image sensor;
a first variable lens comprising a first liquid crystal layer comprising first liquid crystal molecules having a first arrangement that depends on a first voltage applied to the first liquid crystal layer, the first variable lens configured to, based on the first arrangement of the first liquid crystal molecules in the first liquid crystal layer, alter light that is introduced into the image sensor;
a second variable lens disposed between the image sensor and the first variable lens, the second variable lens comprising a second liquid crystal layer comprising second liquid crystal molecules having a second arrangement that depends on a second voltage applied to the second liquid crystal layer, the second variable lens configured to, based on the second arrangement of the second liquid crystal molecules in the second liquid crystal layer, alter light that is introduced into the image sensor, a housing that defines an external appearance of the vehicle camera, the housing configured to accommodate the image sensor, the first variable lens, and the second variable lens, wherein the housing comprises a holder for supporting the first variable lens and the second variable lens; and at least one hot wire configured to supply heat to at least one of the first variable lens or the second variable lens, wherein the holder of the housing comprises:

a first fixing portion configured to support a first surface of the at least one of the first variable lens or the second variable lens, wherein the first fixing portion comprises (i) a first ridged portion comprising at least one ridge and (ii) at least one furrow configured to contact with at least a portion of the first surface of the at least one of the first variable lens or the second variable lens; and a second fixing portion configured to support a second surface of the at least one of the first variable lens or the second variable lens, wherein the second fixing portion comprises (i) a second ridged portion comprising at least one ridge and (ii) at least one furrow configured to contact with at least a portion of the second surface of the at least one of the first variable lens or the second variable lens, and wherein the at least one hot wire comprises:

a first hot wire formed on the first ridged portion of the first fixing portion of the holder of the housing; and a second hot wire formed on the second ridged portion of the second fixing portion of the holder of the housing.

19. The vehicle camera according to claim 18, wherein the first variable lens comprises a first substrate on which a first plurality of electrodes is disposed to be spaced apart from one another, and wherein the second variable lens comprises a third substrate on which a second plurality of electrodes is disposed to be spaced apart from one another.

20. The vehicle camera according to claim 19, wherein the first plurality of electrodes in the first substrate of the first variable lens are arranged to extend in an up-down direction, and wherein the second plurality of electrodes in the third substrate of the second variable lens are arranged to extend in a left-right direction.

21. The vehicle camera according to claim 20, wherein a number of the first plurality of the electrodes in the first substrate of the first variable lens is greater than a number of the second plurality of electrodes in the third substrate of the second variable lens.

22. The vehicle camera according to claim 19, wherein the first plurality of electrodes in the first substrate of the first variable lens are arranged to extend in a left-right direction, and wherein the second plurality of electrodes in the third substrate of the second variable lens are arranged to extend in an up-down direction.

23. A vehicle stereo camera comprising:

a first image sensor;

a first variable lens comprising a first liquid crystal layer comprising first liquid crystal molecules having a first arrangement that depends on a first voltage applied to the first liquid crystal layer, the first variable lens configured to, based on the first arrangement of first liquid crystal molecules in the first liquid crystal layer, alter light that is introduced into the first image sensor;

a second image sensor;

a second variable lens comprising a second liquid crystal layer comprising second liquid crystal molecules having a second arrangement that depends on a second voltage applied to the second liquid crystal layer, the second variable lens configured to, based on the second arrangement of second liquid crystal molecules in the second liquid crystal layer, alter light that is introduced into the second image sensor;

at least one processor configured to process a first image acquired via the first image sensor and a second image acquired via the second image sensor, a housing that defines an external appearance of the vehicle stereo camera, the housing configured to accommodate the first image sensor, the first variable lens, the second image sensor, and the second variable lens, wherein the housing comprises a holder for supporting the first variable lens and the second variable lens; and at least one hot wire configured to supply heat to at least one of the first variable lens or the second variable lens, wherein the holder of the housing comprises:

a first fixing portion configured to support a first surface of the at least one of the first variable lens or the second variable lens, wherein the first fixing portion comprises (i) a first ridged portion comprising at least one ridge and (ii) at least one furrow configured to contact with at least a portion of the first surface of the at least one of the first variable lens or the second variable lens; and a second fixing portion configured to support a second surface of the at least one of the first variable lens or the second variable lens, wherein the second fixing portion comprises (i) a second ridged portion comprising at least one ridge and (ii) at least one furrow configured to contact with at least a portion of the second surface of the at least one of the first variable lens or the second variable lens, and wherein the at least one hot wire comprises:

a first hot wire formed on the first ridged portion of the first fixing portion of the holder of the housing; and a second hot wire formed on the second ridged portion of the second fixing portion of the holder of the housing.

\* \* \* \* \*